United States Patent
Hanschen et al.

(10) Patent No.: US 10,828,862 B2
(45) Date of Patent: Nov. 10, 2020

(54) FILM WITH LAYERED SEGMENTS AND APPARATUS AND METHOD FOR MAKING THE SAME

(71) Applicant: 3M INNOVATIVE PROPERTIES COMPANY, St. Paul, MN (US)

(72) Inventors: Thomas P. Hanschen, Mendota Heights, MN (US); Ronald W. Ausen, St. Paul, MN (US); William J. Kopecky, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/905,309

(22) Filed: Feb. 26, 2018

(65) Prior Publication Data

US 2018/0178481 A1    Jun. 28, 2018

Related U.S. Application Data

(62) Division of application No. 13/782,376, filed on Mar. 1, 2013, now abandoned.

(51) Int. Cl.
*B29C 48/08* (2019.01)
*B29C 48/19* (2019.01)
(Continued)

(52) U.S. Cl.
CPC ............. *B32B 3/14* (2013.01); *B29C 48/08* (2019.02); *B29C 48/19* (2019.02); *B29C 48/21* (2019.02);
(Continued)

(58) Field of Classification Search
CPC ......... B29C 48/07; B29C 48/08; B29C 48/18; B29C 48/19; B29C 48/21; B29C 48/255;
(Continued)

(56) References Cited

U.S. PATENT DOCUMENTS

| 2,031,387 | A | * | 2/1936 | Schwarz | .................. | D01D 5/28 |
| | | | | | | 425/131.5 |
| 3,032,008 | A | * | 5/1962 | Land | ........................ | G03C 7/10 |
| | | | | | | 118/411 |

(Continued)

FOREIGN PATENT DOCUMENTS

| AU | B-73074/91 | 10/1991 |
| DE | 19806452 | 8/1999 |

(Continued)

OTHER PUBLICATIONS

International Search Report from International Application No. PCT/US2014/019350, dated Jun. 24, 2014.

(Continued)

*Primary Examiner* — Xiao S Zhao
*Assistant Examiner* — Joseph S Leyson

(57) ABSTRACT

A film having first segments and second segments arranged across the film's width direction is disclosed. The first and second segments are separated from each other by polymer interfaces. The first segments include a first polymeric composition and the second segments include a second polymeric composition. At least some of the second segments are layered second segments having first and second layers in the film's thickness direction, and one of the first or second layers includes a third polymeric composition different from the second polymeric composition. An extrusion die useful for making the film and a method for making the film using the extrusion die are also disclosed.

20 Claims, 15 Drawing Sheets

(51) Int. Cl.
| | |
|---|---|
| *B29C 48/30* | (2019.01) |
| *B29C 48/49* | (2019.01) |
| *B29C 48/305* | (2019.01) |
| *B32B 3/14* | (2006.01) |
| *B32B 3/16* | (2006.01) |
| *B32B 3/18* | (2006.01) |
| *B29C 48/71* | (2019.01) |
| *B29C 48/255* | (2019.01) |
| *B29C 48/25* | (2019.01) |
| *B32B 5/02* | (2006.01) |
| *B32B 27/30* | (2006.01) |
| *B32B 27/32* | (2006.01) |
| *B32B 5/14* | (2006.01) |
| *B32B 27/12* | (2006.01) |
| *B29C 48/21* | (2019.01) |

(52) U.S. Cl.
CPC ...... *B29C 48/255* (2019.02); *B29C 48/25686* (2019.02); *B29C 48/30* (2019.02); *B29C 48/3001* (2019.02); *B29C 48/307* (2019.02); *B29C 48/49* (2019.02); *B29C 48/71* (2019.02); *B32B 3/16* (2013.01); *B32B 3/18* (2013.01); *B32B 5/022* (2013.01); *B32B 5/142* (2013.01); *B32B 5/145* (2013.01); *B32B 27/12* (2013.01); *B32B 27/302* (2013.01); *B32B 27/306* (2013.01); *B32B 27/32* (2013.01); *B32B 2274/00* (2013.01); *B32B 2307/51* (2013.01); *B32B 2307/514* (2013.01); *B32B 2307/724* (2013.01); *B32B 2535/00* (2013.01); *B32B 2555/00* (2013.01); *B32B 2555/02* (2013.01); *Y10T 428/24752* (2015.01)

(58) Field of Classification Search
CPC .............. B29C 48/25686; B29C 48/30; B29C 48/3001; B29C 48/307; B29C 48/49; B29C 48/71
See application file for complete search history.

(56) References Cited

U.S. PATENT DOCUMENTS

| | | |
|---|---|---|
| 3,204,290 A | 9/1965 | Crompton |
| 3,844,869 A | 10/1974 | Rust, Jr. |
| 4,087,226 A | 5/1978 | Mercer |
| 4,259,399 A | 3/1981 | Hill |
| 4,435,141 A | 3/1984 | Weisner |
| 4,460,364 A | 7/1984 | Chen |
| 4,517,714 A | 5/1985 | Sneed |
| 4,525,407 A | 6/1985 | Ness |
| 4,533,510 A | 8/1985 | Nissel |
| 4,554,191 A | 11/1985 | Korpman |
| 4,725,473 A | 2/1988 | Van Gompel |
| 4,787,897 A | 11/1988 | Torimae |
| 4,917,851 A * | 4/1990 | Yamada ............ B29B 17/0005 264/40.7 |
| 5,017,116 A | 5/1991 | Carter |
| 5,096,532 A | 3/1992 | Neuwirth et al. |
| 5,110,403 A | 5/1992 | Ehlert |
| 5,120,484 A | 6/1992 | Cloeren |
| 5,143,679 A | 9/1992 | Weber |
| 5,151,092 A | 9/1992 | Buell |
| 5,156,793 A | 10/1992 | Buell |
| 5,167,897 A | 12/1992 | Weber |
| 5,196,000 A | 3/1993 | Clear |
| 5,196,247 A | 3/1993 | Wu |
| 5,221,274 A | 6/1993 | Buell |
| 5,344,691 A | 9/1994 | Hanschen |
| 5,366,782 A | 11/1994 | Curro |
| 5,422,172 A | 6/1995 | Wu |
| 5,429,856 A | 7/1995 | Krueger |
| 5,527,304 A | 6/1996 | Buell |
| 5,576,090 A | 11/1996 | Suzuki |
| 5,605,739 A | 2/1997 | Stokes |
| 5,620,780 A | 4/1997 | Krueger |
| 5,674,216 A | 10/1997 | Buell |
| 5,679,379 A | 10/1997 | Fabbricante |
| 5,773,374 A | 6/1998 | Wood et al. |
| 5,800,903 A | 9/1998 | Wood |
| 5,817,199 A | 10/1998 | Brennecke et al. |
| 5,840,412 A | 11/1998 | Wood |
| 5,851,935 A | 12/1998 | Srinivasan |
| 5,861,074 A | 1/1999 | Wu |
| 5,900,306 A | 5/1999 | Stopper |
| 5,993,940 A | 11/1999 | Ouderkirk |
| 6,001,460 A | 12/1999 | Morman |
| 6,030,372 A | 2/2000 | Buell |
| 6,069,097 A | 5/2000 | Suzuki |
| 6,090,234 A | 7/2000 | Barone |
| 6,096,668 A | 8/2000 | Abuto |
| 6,103,152 A | 8/2000 | Gehlsen |
| 6,106,922 A | 8/2000 | Cejka |
| 6,159,544 A | 12/2000 | Liu |
| 6,159,584 A | 12/2000 | Eaton |
| 6,190,758 B1 | 2/2001 | Stopper |
| 6,221,483 B1 | 4/2001 | Hilston |
| 6,245,401 B1 | 6/2001 | Ying |
| 6,476,289 B1 | 11/2002 | Buell |
| 6,669,887 B2 | 12/2003 | Hilston |
| 6,682,514 B1 | 1/2004 | Brunner |
| 6,767,492 B2 | 7/2004 | Norquist |
| 6,902,796 B2 | 6/2005 | Morell |
| 6,949,283 B2 | 9/2005 | Kollaja |
| 6,986,825 B1 | 1/2006 | Squires |
| 7,048,818 B2 | 5/2006 | Krantz |
| 7,172,008 B2 | 2/2007 | Vanbenschoten |
| 7,316,840 B2 | 1/2008 | Neculescu |
| 7,316,842 B2 | 1/2008 | Zhou |
| 7,329,621 B2 | 2/2008 | Collier, IV |
| 7,438,961 B2 | 10/2008 | Steinke |
| 7,625,829 B1 | 12/2009 | Cree |
| 7,651,653 B2 | 1/2010 | Morman |
| 7,678,316 B2 | 3/2010 | Ausen |
| 7,727,207 B2 | 6/2010 | Erdman |
| 7,803,244 B2 | 9/2010 | Siqueira |
| 7,897,078 B2 | 3/2011 | Petersen |
| 7,897,081 B2 | 3/2011 | Ausen |
| 7,968,479 B2 | 6/2011 | Welch |
| 8,222,169 B2 | 7/2012 | Lake |
| 8,257,333 B2 | 9/2012 | Hancock-Cooke |
| 8,758,882 B2 | 6/2014 | Ausen |
| 9,233,500 B2 | 1/2016 | Gorman |
| 9,944,043 B2 | 4/2018 | Hanschen |
| 10,272,655 B2 | 4/2019 | Hanschen |
| 2003/0105446 A1 | 6/2003 | Hutson |
| 2005/0060849 A1 | 3/2005 | Vanbenschoten |
| 2006/0165939 A1 | 7/2006 | Hottner |
| 2007/0108229 A1* | 5/2007 | Fork .................. B05B 9/06 222/129 |
| 2007/0134465 A1 | 6/2007 | Vanbenschoten |
| 2007/0154683 A1 | 7/2007 | Ausen |
| 2007/0298262 A1 | 12/2007 | Quiram |
| 2008/0115882 A1 | 5/2008 | Van Den Aker |
| 2009/0258210 A1 | 10/2009 | Iyad |
| 2009/0306617 A1 | 12/2009 | Tsang |
| 2010/0215923 A1 | 8/2010 | Frost |
| 2011/0147475 A1 | 6/2011 | Biegler |
| 2011/0151171 A1 | 6/2011 | Biegler |
| 2011/0268906 A1 | 11/2011 | Ausen |
| 2012/0022490 A1 | 1/2012 | Marche |
| 2012/0052245 A1* | 3/2012 | Hoium ............... B29C 48/71 428/156 |
| 2012/0172826 A1 | 7/2012 | Ng |
| 2012/0263906 A1 | 10/2012 | Ausen |
| 2013/0004723 A1 | 1/2013 | Ausen |
| 2013/0004729 A1 | 1/2013 | Ausen |
| 2013/0009336 A1* | 1/2013 | Ausen ............... B29C 33/301 264/177.1 |
| 2013/0011600 A1 | 1/2013 | Ausen |

(56) References Cited

U.S. PATENT DOCUMENTS

2017/0022339 A1 1/2017 Hanschen
2017/0174852 A1 6/2017 Hanschen
2017/0182695 A1 6/2017 Hanschen

FOREIGN PATENT DOCUMENTS

| EP | 0191355 | 8/1986 |
| EP | 556766 | 8/1993 |
| EP | 865904 | 9/1998 |
| EP | 872580 | 10/1998 |
| EP | 1757429 | 2/2007 |
| EP | 2340796 | 9/2011 |
| JP | 08187113 | 7/1996 |
| JP | 8-300436 | 11/1996 |
| JP | 9-300436 | 11/1997 |
| WO | WO 99/47590 | 9/1999 |
| WO | WO 2001-45918 | 6/2001 |
| WO | WO 2004-091896 | 10/2004 |
| WO | WO 2009/042556 | 4/2009 |
| WO | WO 2009-140392 | 11/2009 |
| WO | WO 2010-099148 | 9/2010 |
| WO | WO 2010-109087 | 9/2010 |
| WO | WO 2012-038613 | 3/2012 |
| WO | WO 2013-028654 | 2/2013 |
| WO | WO 2013-032683 | 3/2013 |
| WO | WO 2013-052371 | 4/2013 |
| WO | WO 2013-148128 | 10/2013 |

OTHER PUBLICATIONS

Supplementary European Search for Application No. 14757129, dated Nov. 24, 2016, 1 page.

\* cited by examiner

FILM WITH LAYERED SEGMENTS AND APPARATUS AND METHOD FOR MAKING THE SAME

CROSS-REFERENCE TO RELATED APPLICATION

This application is a divisional of U.S. application Ser. No. 13/782,376, filed Mar. 1, 2013, the disclosure of which is incorporated by reference in its entirety herein.

BACKGROUND

Co-extrusion of multiple polymeric components into a single film is known in the art. For example, multiple polymeric flow streams have been combined in a die or feedblock in a layered fashion to provide a top to bottom multilayer film. It is also known to provide co-extruded film structures where the film is partitioned, not as coextensive layers in the thickness direction, but as stripes along the width dimension of the film. This has sometimes been called "side-by-side" co-extrusion. Extruded products with side-by-side oriented stripes are described, for example, in U.S. Pat. No. 6,245,401 (Ying et al.), U.S. Pat. No. 6,669,887 (Hilston et al.), and U.S. Pat. No. 7,897,081 (Ausen et al.), U.S. Pat. App. Pub. No. 2012/0022490 (Marche et al.), and Int. Pat. App. Pub. Nos. WO2011/097436 (Gorman et al.) and WO 2011/119323 (Ausen et al.). Films having multiple segmented flows within a matrix of another polymer are described, for example, in U.S. Pat. No. 5,773,374 (Wood et al.). Films having an arrangement of polymeric segments along the top surface that is different from the arrangement of polymeric segments along the bottom surface of the film are disclosed in Int. Pat. App. Pub. No. WO 2010/099148 (Hoium et al.).

SUMMARY

Although products with side-by-side oriented stripes and extrusion devices for producing them are known, there is still a need for alternatives and improvements to such products and devices. The present disclosure provides a film having first segments and second segments arranged across the width of the film, in which at least the second segments are layered in the film's thickness direction, and an apparatus and method for making the film. In some embodiments, at least portions of the second segments are elastic while the first segments are relatively inelastic.

In one aspect, the present disclosure provides a film with first segments and second segments arranged across the film's width, separated from each other by polymer interfaces. The first segments and second segments each have first major surfaces that collectively form the first major surface of the film. The first segments include a first polymeric composition, and the second segments include a second polymeric composition. At least some of the second segments are layered second segments having first and second layers in the film's thickness direction, wherein one of the first or second layers includes a third polymeric composition different from the second polymeric composition. Neither the second or third polymeric composition extends through the entire thickness of a given layered second segment. At least two of the layered second segments have the second polymeric composition and the third polymeric composition in an identical arrangement. The film has a moisture vapor transmission rate of less than 800 g/m$^2$/day. In embodiments where the first segments are layered in the film's thickness direction, the first major surfaces of the first segments and the first major surfaces of the second segments do not share a common polymeric composition. In embodiments where the layered second segments consist of the first and second layers and the third polymeric composition is the same as the first polymeric composition, the first polymeric composition extends through the entire thickness of the first segments.

In another aspect, the present disclosure provides a film comprising first segments and second segments arranged across the film's width direction and separated from each other by polymer interfaces, the first segments comprising a first polymeric composition and the second segments comprising a second polymeric composition that is more elastic than the first polymeric composition, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, and wherein the first segments have stretch-induced molecular orientation in a direction parallel to their lengths.

In another aspect, the present disclosure provides a film comprising first segments and second segments arranged across the film's width direction and separated from each other by polymer interfaces, the first segments comprising a first polymeric composition and the second segments comprising a second polymeric composition that is more elastic than the first polymeric composition, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, and wherein the time to failure in a hang shear evaluation is at least 100 minutes, wherein the hang shear evaluation is carried out by hanging a 200-gram weight on a 2.54 cm wide by 3.8 cm sample at 38° C. such that the second segments are stretched in the film's width direction.

In another aspect, the present disclosure provides a laminate that includes the aforementioned film according to one or more of the above aspects joined to a fibrous carrier.

In another aspect, the present disclosure provides a film with first segments and second segments arranged across the film's width, separated from each other by polymer interfaces. The first segments include a first polymeric composition, and the second segments include a second polymeric composition that is more elastic than the first polymeric composition. At least some of the second segments are layered second segments having first and second layers in the film's thickness direction, and one of the first or second layers comprises a third polymeric composition different from the second polymeric composition. Neither the second or third polymeric composition extends through the entire thickness of a given layered second segment. The second segments each have a width in the film's width direction of less than one millimeter. The first and second segments each have first major surfaces that collectively form the first major surface of the film. In embodiments where the first segments are layered in the film's thickness direction, the first major surfaces of the first segments and the first major surfaces of the second segments do not share a common polymeric composition.

In another aspect, the present disclosure provides a laminate including a film joined to a fibrous carrier. The film includes first segments and second segments arranged across the film's width direction and separated from each other by polymer interfaces. The first segments include a first polymeric composition, and the second segments include a second polymeric composition that is more elastic than the first polymeric composition. At least some of the second segments are layered second segments having first and second layers in the film's thickness direction, wherein one of the first or second layers including a third polymeric composition different from the second polymeric composition. Neither the second or third polymeric composition extends through the entire thickness of a given layered second segment, and the second segments each have a width in the film's width direction of less than one millimeter.

The films according to any of the foregoing aspects or found in laminates according to any of the foregoing aspects can advantageously be formed by coextrusion of the first and second segments.

Accordingly, in another aspect, the present disclosure provides an extrusion die having at least a first cavity, a second cavity, and a dispensing surface having a dispensing slot. A first fluid passageway within the extrusion die extends from the first cavity to a first slot segment of the dispensing slot, and a second fluid passageway within the extrusion die extends from the second cavity to a second slot segment of the dispensing slot. The second slot segment and first slot segment are arranged side-by-side to provide a combined width. A third fluid passageway within the extrusion die extends from a die cavity within the extrusion die to the second slot segment, and the third fluid passageway meets the second fluid passageway from an area above the second fluid passageway at a point where the second fluid passageway enters the dispensing slot. The third fluid passageway has a width at a point where it meets the second fluid passageway that is less than the combined width of the first and second slot segments. In some embodiments, the fluid passageways are provided by a plurality of sequences of shims. Each sequence of shims includes at least one first shim that provides the first fluid passageway, at least one second shim that provides the second fluid passageway, and at least one third shim that provides the at least one third fluid passageway.

In another aspect, the present disclosure provides a method of extruding a film that includes providing the foregoing extrusion die and extruding a first polymeric composition from the first cavity, a second polymeric composition from the second cavity, and a third polymeric composition from the die cavity, wherein at the point where the second fluid passageway enters the dispensing slot, the third polymeric composition flows on top of the second polymeric composition to form a layer to provide a film having first segments comprising the first polymeric composition and second segments comprising a layer of the third polymeric composition on top of the second polymeric composition. In some embodiments, the third fluid passageway is diverted into branches that meet the second fluid passageway at areas above and below the second fluid passageways at the point where the second fluid passageway enters the dispensing slot.

In another aspect, the present disclosure provides a method of extruding a film according to any of the aspects described above. The method includes providing an extrusion die having at least a first cavity, a second cavity, and a dispensing surface having a dispensing slot and extruding the first, second, and third polymeric compositions from the first, second, and third cavities, respectively, so as to form the film. A first fluid passageway within the extrusion die extends from the first cavity to a first slot segment of the dispensing slot. A second fluid passageway within the extrusion die extends from the second cavity to a second slot segment of the dispensing slot, and a third fluid passageway within the extrusion die extends from a die cavity within the extrusion die to the second slot segment. The third fluid passageway meets the second fluid passageway from an area above the second fluid passageway at a point where the second fluid passageway enters the dispensing slot. The third fluid passageway has a width at a point where it meets the second fluid passageway that is less than the combined width of the first and second slot segments.

Advantageously, the extrusion dies and methods disclosed herein allow the first and second segments to be made simultaneously in a single co-extrusion process. Patterns of first and second segments can also be separated by zones of the first polymeric composition (or a different polymeric composition) that are wider than the first segments. The arrangement of the first and second segments may be an arrangement in which the first and second segments alternate across the width of the film.

In some embodiments, the films according to the present disclosure include a significant amount of material that is relatively inelastic in combination with elastic material, but they still can have useful elongations when stretched in a direction transverse to the longitudinal direction of the first and second segments or in a direction parallel to the longitudinal direction of the first and second segments if stretched to the point of plastic deformation of the more inelastic segments. In these embodiments, relatively expensive elastic materials are used efficiently, and the films disclosed herein can be lower in cost than other elastic films, which typically include higher amounts of elastic materials. In some embodiments, in addition to exploiting efficient utilization of elastic polymeric compositions, the films disclosed herein can also be made to have very desirable hysteresis properties and may not require an "activation" step.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "alternating" as used herein refers to embodiments in which one first segment is disposed between any two consecutive second segments (i.e., the second segments have only one first segment between them) and one second segment is disposed between any two consecutive first segments.

The term "elastic" refers to any material (such as a film that is 0.002 mm to 0.5 mm thick) that exhibits recovery from stretching or deformation. A material, film, or composition that is more elastic than another material, film, or composition exhibits at least one of higher elongation or lower hysteresis (usually both) than another material, film, or composition. In some embodiments, a material may be considered to be elastic if, upon application of a stretching force, it can be stretched to a length that is at least about 25 (in some embodiments, 50) percent of its initial length and can recover at least 40 percent of its elongation upon release of the stretching force.

The term "inelastic" refers to any material (such as a film that is 0.002 mm to 0.5 mm thick) that does not exhibit recovery from stretching or deformation to a large extent. For example, an inelastic material that is stretched to a length that is at least about 50 percent greater than its initial length will recover less than about 40, 25, 20, or 10 percent of its elongation upon release of its stretching force. In some embodiments, an inelastic material may be considered to be a flexible plastic that is capable of undergoing permanent plastic deformation if it is stretched past its reversible stretching region.

"Elongation" in terms of percent refers to {(the extended length–the initial length)/the initial length} multiplied by 100. Unless otherwise defined, when a film or portion thereof is said herein to have an elongation of at least 100 percent, it is meant that the film has an elongation to break of at least 100 percent using the test method described in the Examples, below.

The term "extensible" refers to a material that can be extended or elongated in the direction of an applied stretching force without destroying the structure of the material or material fibers. An extensible material may or may not have recovery properties. For example, an elastic material is an extensible material that has recovery properties. In some embodiments, an extensible material may be stretched to a length that is at least about 5, 10, 15, 20, 25, or 50 percent greater than its relaxed length without destroying the structure of the material or material fibers.

The term "machine direction" (MD) as used above and below denotes the direction of a running, continuous web during the manufacturing of the film disclosed herein. When a portion is cut from the continuous web, the machine direction corresponds to the longitudinal "y" direction of the film. Accordingly, the terms machine direction and longitudinal direction may be used herein interchangeably. The term "cross-direction" (CD) as used above and below denotes the direction that is essentially perpendicular to the machine direction. When a portion of the film disclosed herein is cut from the continuous web, the cross-direction corresponds to the width "x" of the film.

The terms "first", "second", "third", "fourth", "fifth", and "sixth" are used in this disclosure. It will be understood that, unless otherwise noted, these designations are used in their relative sense only. These designations may be applied to the components merely as a matter of convenience in the description of one or more of the embodiments. Likewise, "top", "bottom", "above", and "below" are used in their relative sense only.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
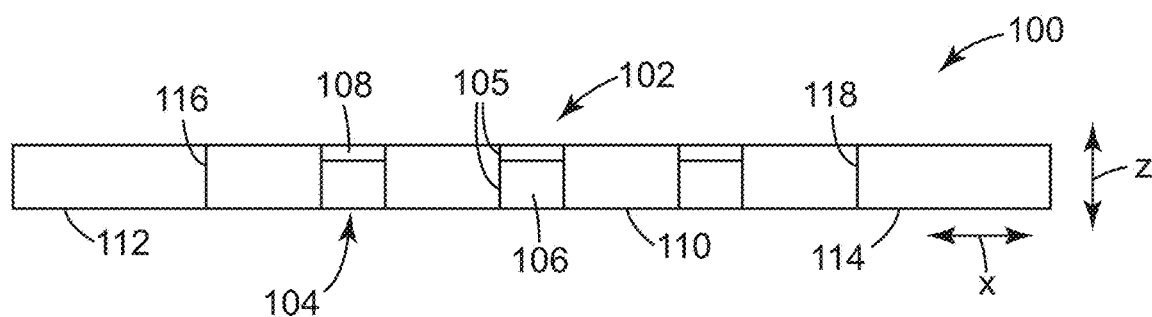
FIG. 1 is an end view of an embodiment of a film having first segments and second segments arranged across the width of the film.

Referring now to FIG. 1, an end view of an embodiment of film article 100 having different segments across its width "x" is shown. The film article 100 has a region 102 which includes first segments 110 arranged side-by-side across the width "x" of the film with second segments 104. Although not shown in the end view of FIG. 1, first segments 110 and second segments 104 typically extend in the machine direction of the film article 100. In the illustrated embodiment, all of the second segments 104 are layered second segments that include first and second layers 106 and 108, respectively, although in other embodiments only some of second segments are layered second segments. In some embodiments, every other second segment is a layered second segment, and the remaining second segments are not layered. Optionally, second regions 112 and 114 may be present on one or both edges of the film article 100. When second regions 112 and/or 114 are present, weld lines 116 and 118 may or may not be visible. The second regions 112 and 114 are zones of the film not having first segments and second segments, at least with any noticeable frequency. Second regions may be regions at the film edges, for example, with a uniform composition for a width, which may be greater than the combined width of the first and second segments. In films in which the first and second segments provide an extensible region of film, the second regions may be non-extensible region.

The first segments 110 include a first polymeric composition, and the second segments 104 include a second polymeric composition in first or second layer 106 or 108. The other layer of the first or second layer 106 or 108 that does not include the second polymeric composition includes a third polymeric composition different from the second polymeric composition. For example, the first layer 106 in FIG. 1 can include the second polymeric composition, and the second layer 108 can include the third polymeric composition. The first and third polymeric compositions may be the same or different. However, in the illustrated embodiment, where the layered second segments consist of the first and second layers (that is, they have only the two layers), if the third polymeric composition is the same as the first polymeric composition, the first polymeric composition extends through the entire thickness "z" of the first segments. In other words, in the illustrated embodiments, if the first and third polymeric compositions are the same, the first polymeric composition extends from the first major surface of the film, through the thickness "z", and to the second major surface of the film. In these embodiments, it may be said that the first segments 110 are generally of uniform composition and that the first segments 110 are not layered segments or multi-layered in the thickness "z" direction.

Figure 2:
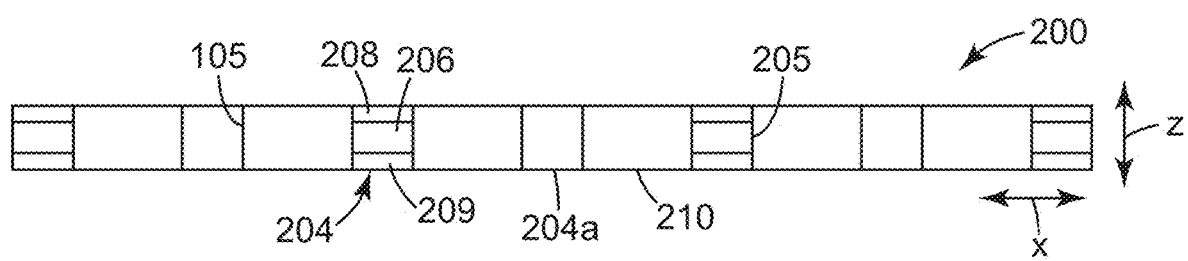
FIG. 2 is an end view of another embodiment of a film having first segments and second segments arranged across the width of the film.

FIG. 2 illustrates an end view of another embodiment of a film 200 having different segments across its width "x" direction. Film 200 includes first segments 210 arranged side-by-side across the width of the film with second segments 204 and 204a. In the illustrated embodiment, every other second segment is a layered second segment 204, and the remaining second segments 204a include only the second polymeric composition. In other embodiments, every second segment may be a layered second segment 204. The layered second segments 204 in film 200 include at least three layers in the film's thickness direction "z". The first layer 206 is a middle layer of the second polymeric composition disposed between the second layer 208 and a third layer 209 at opposite surfaces of the film. In some embodiments, including the illustrated embodiment, the middle, first layer 206 does not form part of the surface of the film. The second layer 208 includes the third polymeric composition, and the third layer 209 includes a fourth polymeric composition. The third and fourth polymeric compositions are generally both different from the second polymeric composition, but they may be the same as or different from each other. In some embodiments, at least one of the third or fourth polymeric compositions is the same as the first polymeric composition. In some of these embodiments, both the third and fourth polymeric compositions are the same as the first polymeric composition. In other embodiments, the third polymeric composition in second layer 208 is the same as the first polymeric composition, but the fourth polymeric composition in third layer 209 is different from the first polymeric composition. In some embodiments, the third and fourth polymeric compositions in second and third layers 208 and 209 are the same as each other but different from the first polymeric composition. In other embodiments, each of the first, second, third, and fourth polymeric compositions in first segments 210 and first, second, and third layers 206, 208, and 209, respectively, is different.

In the embodiment illustrated in FIG. 2, the first polymeric composition extends throughout the thickness "z" of the first segments 210. In other words, the first polymeric composition extends from the first major surface of the film, through the thickness "z", and to the second major surface of the film. It may be said that the first segments 210 are generally of uniform composition and that the first segments 210 are not layered segments or multi-layered in the thickness "z" direction.

In films according to the present disclosure, including in the embodiments shown in FIGS. 1 and 2, neither the second or third polymeric composition extends through the thickness "z" of a given layered second segment. Furthermore, in FIG. 2, the fourth polymeric composition does not extend through the thickness "z" of a given layered second segment. It may be understood from the illustrated embodiments that none of the polymeric compositions in the second and third layers 108, 208, and 209 forms a boundary separating the first and second polymeric compositions in the first and second segments 104, 110, 204, and 210. It may also be understood that none of third or fourth polymeric compositions in the second segments surrounds the second polymeric composition.

Figure 3:
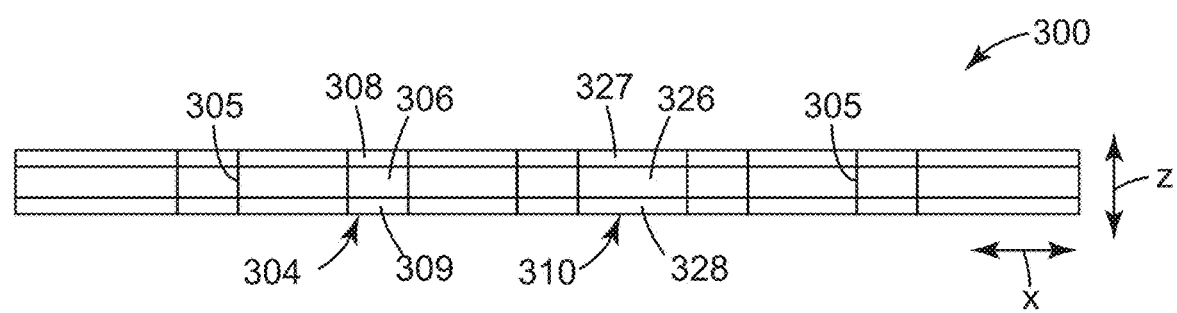
FIG. 3 is an end view of yet another embodiment of a film having first segments and second segments arranged across the width of the film.

FIG. 3 illustrates an end view of another embodiment of a film 300 having different segments across its width "x" direction. The embodiment shown in FIG. 3 is similar to the embodiment shown in FIG. 2 in that the second segments 304 include a middle first layer 306 and second and third layers 308 and 309 on opposing surfaces of the film. However, the first segments 310 in FIG. 3 are different from the first segments 210 shown in FIG. 2. At least some of the first segments 310 are layered first segments that include at least fourth and fifth layers 326 and 327, respectively, in the film's thickness "z" direction. One of the fourth or fifth layers 326 and 327 includes a fifth polymeric composition different from the first polymeric composition. In the illustrated embodiment, fourth layer 326 is a middle layer of the first polymeric composition disposed between fifth and sixth layers 327 and 328 on opposing surfaces of the film. In some embodiments, including the illustrated embodiment, the middle, fourth layer 326 does not form part of the surface of the film. The fifth layer 327 includes a fifth polymeric composition, and the sixth layer 328 includes a sixth polymeric composition. The fifth and sixth polymeric compositions are generally both different from the first polymeric composition, but they may be the same as or different from each other. The fifth polymeric composition in the fifth layer 327 is also different from the third polymeric composition in the second layer 308, and the sixth polymeric composition in the sixth layer 328 is different from the fourth polymeric composition in the third layer 309 in the illustrated embodiment. In some embodiments, in at least one of the fifth or sixth layers 327, 328, the fifth or sixth polymeric composition is the same as the second polymeric composition. In some of these embodiments, the fifth and sixth are both the same as the second polymeric composition. In some embodiments, the fifth and sixth polymeric compositions in fifth and sixth layers 327 and 328 are the same as each other but different from the second polymeric composition. In some embodiments, each of the first, second, third, fourth, fifth, and sixth polymeric compositions in fourth, first, second, third, fifth, and sixth layers 326, 306, 308, 309, 327, and 328, respectively, is different.

None of the first, fifth, or sixth polymeric composition, when present, extends through the thickness "z" of a given layered first segment. It may be understood from the embodiment illustrated in FIG. 3 that none of the polymeric compositions in the second, third, fifth, and sixth layers 308, 309, 327, and 328 separates the first and second polymeric compositions in the first and second segments 304 and 310. It may also be understood that none of fifth or sixth polymeric compositions in the first segments surrounds the first polymeric composition.

Figure 4:
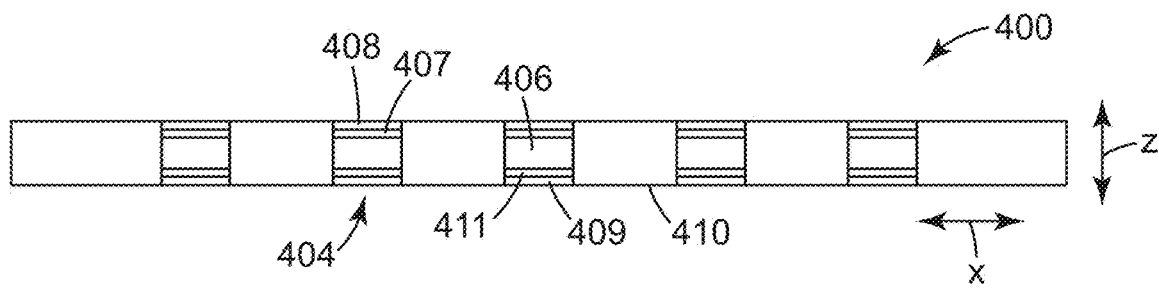
FIG. 4 is an end view of yet another embodiment of a film having first segments and second segments arranged across the width of the film.

FIG. 4 illustrates an end view of another embodiment of a film 400 having different segments across its width "x" direction. The embodiment shown in FIG. 4 is similar to the embodiment shown in FIG. 2 in that the second segments 404 include a middle first layer 406 and second and third layers 408 and 409 on opposing surfaces of the film. However, the illustrated embodiment also has another layer 407 disposed between the top layer 408 and the middle first layer 406 and another layer 411 disposed between the bottom layer 409 and the middle first layer 406. Layers 407 and 411 can include polymeric compositions that are different from the second, third, and fourth polymeric compositions. The polymeric compositions in layers 407 and 411 may be the same as or different from each other. In some embodiments, at least one of the polymeric compositions in layers 407 and 411 is the same as the first polymeric composition. In some of these embodiments, both the polymeric compositions in layers 407 and 411 are the same as the first polymeric composition. In other embodiments, the polymeric composition in layer 407 is the same as the first polymeric composition, but the polymeric composition in layer 411 is different from the first polymeric composition. In some embodiments, the polymeric compositions in layers 407 and 411 are the same as each other but different from the first polymeric composition. In other embodiments, each of the polymeric compositions in first segments 410 and layers 408, 407, 406, 411, and 409, respectively, is different. It may be understood from the embodiment illustrated in FIG. 4 that none of the polymeric compositions in the layers 408, 407, 411, and 409 separates the first and second polymeric compositions in the first and second segments 404 and 410. It may also be understood that none of the polymeric compositions in layers 407 or 411 surrounds the second polymeric composition.

As can be seen in the embodiments of FIGS. 1 to 4, the first and second segments each have first major surfaces that collectively form the first major surface of the film. When the first segments are layered first segments (that is, they have layers in the film's thickness direction), the first major surfaces of the first segments and the first major surfaces of the second segments do not share a common polymeric composition. This feature distinguishes the films disclosed herein from a side-by-side coextruded film provided with a skin layer of one composition that extends over the first major surface of the film. While a portion of the first and/or second layers 106 and 108 (or second and third layers 208 and 209) can extend over the first regions 110 (or 210), they do not cover the entire first regions 110 (or 210). Also, when it is said that the first major surfaces of the first segments and the first major surfaces of the second segments do not share a common polymeric composition, it may be understood that the first and second layers 106 and 108 and the second and third layers 208 and 209 each have a width that is shorter than the combined width of the first and second segments in the width "x" direction of the film. In the embodiment illustrated in FIG. 3, the fifth polymeric composition in the fifth layer 327 is different from the third polymeric composition in the second layer 308, and the sixth polymeric composition in the sixth layer 328 is different from the fourth polymeric composition in the third layer 309 as stated above. The result, in embodiments in which the first segments are layered first segments, is that there is an arrangement, in the width "x" direction, of different polymer compositions on both the first major surface of the film and the second major surface of the film.

The first and second segments are arranged across the film's width "x" and are separated by polymer interfaces 105, 205, and 305, as shown in FIGS. 1 to 3. The interfaces are not necessarily linear as illustrated but may be curved. The polymer interfaces can be considered to be through the film thickness "z". The film thickness "z" need not be the same in the first and second segments, but interfaces can still be considered to separate the first and second segments for the extent of the thinner segments. In an embodiment in which a portion of the first and second layers 106 and 108 (or second and third layers 208 and 209) extend over the first regions 110 (or 210), the first and second segments may have wider and narrower portions but may still be considered to be separated by polymer interfaces. Therefore, in general, none of the at least first and second layers is continuous across the film's width. For example, in the embodiment shown in FIG. 2 having first, second, and third layers (206, 208, and 209), none of these layers is continuous across the film's width. The film does not have a continuous middle layer or continuous skin layers on either major surface of the film. For any film having a continuous layer that forms a skin layer over side-by-side coextruded stripes, the continuous layer prevents the side-by-side regions from being separated by polymeric interfaces. In the embodiment shown in FIG. 2, for example, second and third layers 208 and 209 do not form continuous layers over the first and second major surfaces of the film, respectively. Similarly, for any film having a continuous layer that extends through a center portion (not at the first or second major surface) of the thickness of the film or undulates continuously from the top to the bottom surface of the film, that continuous layer prevents the segments from being separated by polymeric interfaces.

The first and second segments may be overlapping or non-overlapping in the width "x" direction of the film. In some embodiments, for at least a portion of the film, the polymer interface separating the first and second segments is an interdigitated interface between the first and second polymeric compositions or other polymeric compositions in the first and second segments. In some embodiments, for at least a portion of the film, the polymeric interface separating the first and second segments is not an interdigitated interface between the first and second polymeric compositions. As described above, a portion of the first and/or second layers can extend over the first regions at one of the major surfaces of the film, but in some embodiments, a portion of the second polymeric composition does not intermix with the first polymeric composition to form a tip that is sandwiched between two portions of the first polymeric composition. While the polymer interfaces between the first and second segments may be linear or curved, generally the polymer interfaces are not formed by two linear segments that meet at a point.

The arrangement in the width "x" direction of polymer compositions on the first and second major surfaces of the film may be the same or different. In the embodiments shown in FIGS. 2-4, the first and second major surfaces of the film may be identical and may be considered mirror images. However, this is not a requirement. In most embodiments, at least two of the layered second segments have the second polymeric composition and the third polymeric composition in an identical arrangement. That is, at least two of the layered segments are made from the same at least second and third polymeric compositions, and the position of the second and third polymeric compositions in the layered second segments is the same. Two adjacent second segments may be identical to each other in their arrangement of the second and third polymeric compositions, or every other second segment may be identical, as shown in FIG. 2. In some embodiments, at least 3, 5, or 10 layered second segments across the film are identical in their arrangement of the second and third polymeric compositions. In some embodiments, every layered second segment in the film is identical in its arrangement of the second and third polymeric compositions. In some of these embodiments, each of the first segments is identical in its arrangement of polymeric compositions to every other first segment. In some embodiments, at least 2, 3, 5, or 10 layered first segments across the film are identical in their arrangement of polymeric compositions. In some embodiments, even if the first and second major surfaces of the film are not identical, the pattern at the first and second major surfaces can be the same with the exception that the corresponding layers at the first and second major surfaces are made from different polymeric compositions. For example, the first major surface of the film may have an ABABABAB pattern, and the bottom surface of the film may have a CBCBCBCB pattern.

Generally, the first and second segments are arranged side-by-side. Typically, each first segment is bonded alongside at least one second segment, and each second segment is bonded alongside at least one first segment. The arrangement in the width "x" direction of first and second segments may also include other, different segments. For example, the first and second segments may be arranged with a third segment to provide, for example, an ABCABCABC pattern on the first and optionally the second surface of the film. The film may also have four or more different segments that at least partially repeat across the film's width "x". For some of these embodiments in which one first segment is disposed between any two consecutive second segments and one second segment is disposed between any two consecutive first segments, the films may be considered alternating with respect to the first and second segments. It is also possible that two first segments, both including the first polymeric composition and having the same arrangement of layers in the thickness direction if more than one layer is present, may be co-extruded side-by-side and arranged with the second segments. In these embodiments, a weld line or polymer interface may be visible, particularly upon stretching the film in the width direction, depending on the loading of pigment or other factors. In some of these embodiments, the film can have an AABAABAAB pattern on the first and optionally the second surface of the film.

As shown in the embodiments illustrated in FIGS. 1 to 4, each of the layers in the layered second and first segments does not have the same thickness, although this is not a requirement. In some embodiments where there are only two layers in the layered second segments, the second polymeric composition in the layered second segments extends at least about 75 percent of the thickness between the first major surface and the second major surface. In some embodiments that contain layered first segments, in particularly in embodiments where the layered first segments include only fourth and fifth layers, the first polymeric composition extends at least about 75 percent of the thickness between the first major surface and the second major surface in the first regions.

In films according to the present disclosure, including in the embodiments shown in FIGS. 1 to 4, each of the layers may be considered monolithic (that is, having a generally uniform film composition) and would not be considered fibrous. Particularly, none of the layers would be considered nonwoven materials. Generally, the polymeric compositions making up the segments and layers are co-extruded and melt bonded together.

In some embodiments, films according to the present disclosure have moisture vapor transmission rates of less than 800 g/m$^2$/day. In some embodiments, both the first segments and the second segments of the film have moisture vapor transmission rates of less than 700 g/m$^2$/day, 600 g/m$^2$/day, 500 g/m$^2$/day, 400 g/m$^2$/day, 300 g/m$^2$/day, 200 g/m$^2$/day, or 100 g/m$^2$/day. Moisture vapor transmission rates can be measured according to the method provided in the Examples, below, which is based on ASTM E96-80. In these embodiments, the films as extruded have moisture vapor transmission rates of less than 800 g/m$^2$/day, which typically means they are not microporous. Microporosity may be observed, for example, by optical microscopy. It should be understood also that the films have moisture vapor transmission rates of less than 800 g/m$^2$/day before and after stretching the film. The films are not designed to become microporous upon stretching. However, in some embodiments, the film may be apertured after it is extruded, for example, when it is laminated to a fibrous web as described below. Thus, the moisture vapor transmission rates of less than 800 g/m$^2$/day applies to the films before any post-extrusion aperturing.

The films disclosed herein in any of their embodiments can conveniently be prepared by an extrusion die and/or method according to the present disclosure. The extrusion die according to the present disclosure has a variety of passageways from cavities within the die to a dispensing slot. The dispensing slot has a width, which is the dimension that corresponds to the width "x" of the resulting extruded film, and a thickness, which is the dimension that corresponds to the thickness "z" of the resulting extruded film. The extrusion die includes a first fluid passageway that extends from a first cavity to a first slot segment of the dispensing slot and a second fluid passageway that extends from a second cavity to a second slot segment of the dispensing slot. The first and second slot segments are arranged side-by-side along the width of the dispensing slot and have a combined width. A third fluid passageway within the extrusion die extends from a die cavity within the extrusion die to the second slot segment and meets the second fluid passageway from an area above the second fluid passageway at a point where the second fluid passageway enters the dispensing slot. That is, at least a portion of the third fluid passageway is on top of the second fluid passageway in the thickness direction at the point where the second fluid passageway enters the dispensing slot. The die cavity where the third fluid passageways begin may be the same cavity as the first cavity, or a third, different cavity may be useful depending on the desired construction of the film. The fluid passageways are capable of physically separating the polymers from the first and second cavities and optionally any further die cavities within the extrusion die until the fluid passageways enter the dispensing slot. The shape of the different passageways within the die may be identical or different. Examples of passageway cross-sectional shapes include round, square, and rectangular shapes.

In many embodiments, there are multiple first segments and multiple second slot segments arranged along the width of the dispensing slot. In some of these embodiments, the first and second slot segments alternate such that one first slot segment is disposed between any two adjacent second slot segments. Similarly, one second slot segment can be disposed between any two adjacent first slot segments. It should be understood that for multiple first slot segments, each is fed by a first passageway that extends from the same first cavity. Likewise, for multiple second slot segments, each is fed by a second passageway that extends from the same second cavity and a third passageway that extends from the same die cavity within the extrusion die. Although the second slot segments allow for polymeric compositions, one from the second cavity and one from the die cavity to which the third fluid passageways are connected, to be layered in the thickness "z" direction, the second slot segments are not further divided in the width "x" direction. That is, multiple fluid passageways do not enter the second slot segments of the dispensing slot in a side-by-side arrangement. Accordingly, the layered second segments of the film extruded from the second slot segments are uniform in composition across their widths.

The combined width of the first and second slot segments should be understood to be the width of the first slot segment added to the width of the second slot segment. The width of the third fluid passageway at a point where it meets the second fluid passageway is less than the combined width of the first and second slot segments. The third fluid passageway is therefore distinguished from a fluid passageway that extends across the width of the dispensing slot to provide, for example, a continuous skin layer of generally uniform composition on top of a side-by-side coextruded film. In some embodiments, the width of the third fluid passageway at a point where it meets the second fluid passageway is about the same as the width of the second slot segments.

The die may conveniently be comprised of a plurality of shims. The shims can include at least one first shim that provides the first fluid passageway and at least one second shim that provides the second fluid passageway. The shim that provides the second fluid passageway may also provide at least one third fluid passageway. Each of the shims in the plurality of shims typically defines a portion of the dispensing slot. In some embodiments, the plurality of shims comprises a plurality of sequences of shims that includes shims where each sequence provides at least first and second fluid passageways between a first and a second cavity and the dispensing slot. In some of these embodiments, there will be additional shims that provide a passageway between a third (fourth, fifth, sixth, etc.) cavity and the dispensing slot. A subsequence of shims can form a layered second segment, which is bonded to a first segment on one or both sides. Some examples of useful shim sequences and subsequences will be discussed with more particularity below in connection with FIGS. 10, 11, 18, and 18A.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. In one embodiment, a twelve-shim sequence that when properly provided with molten polymer forms a segment of film of a single-material alternating with a layered segment is described below in connection with FIGS. 10 and 11.

In some embodiments, the shims that provide a passageway between one cavity and the dispensing slot might have a flow restriction compared to the shims that provide a passageway between another cavity and the dispensing slot. The width of the distal opening within, for example, different shims of the sequence of shims, may be identical or different. For example, the portion of the dispensing opening provided by the shims that provide a passageway between one cavity and the dispensing slot could be narrower than the portion of the dispensing opening provided by the shims that provide a passageway between another cavity and the dispensing slot.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks although the ordinary artisan may perceive other alternatives for assembling the extrusion die. In some embodiments, the at least one end block has an inlet port for introduction of fluid material into one or more of the cavities.

In some embodiments, the assembled shims (conveniently bolted between the end blocks) further comprise a manifold body for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of the first, second, and third cavities), and such that the expansion seal allows a conduit between the manifold and the cavity.

In some embodiments, the shims for dies described herein have thicknesses (in the narrowest dimension of the shim) in the range from 50 micrometers to 125 micrometers. Typically, the fluid passageways have dimension in the width direction of the extrusion die in a range from 50 micrometers to 750 micrometers, and heights in the thickness dimension less than 5 mm (with generally a preference for smaller heights for decreasingly smaller passageway widths), although widths and heights outside of these ranges may also be useful. In some embodiments, the fluid passageways can have heights in a range from 10 micrometers to 1.5 millimeters. For fluid passageways with large widths or diameters, several smaller thickness shims may be stacked together, or single shims of the desired passageway width may be used. Widths of the first and second slot segments can correspond to the widths of the fluid passageways described above. The first and second slot segments may have widths within 10 percent of the widths of the fluid passageways.

The shims are tightly compressed to prevent gaps between the shims and polymer leakage. For example, 12 mm (0.5 inch) diameter bolts are typically used and tightened, at the extrusion temperature, to their recommended torque rating. It may be desirable to press the shims together with force while tightening the bolts. Also, the shims are aligned to provide uniform extrusion out the dispensing slot, as misalignment can lead to first and second segments extruding at an angle out of the die which may inhibit bonding between these segments. To aid in alignment, an indexing groove can be cut into the shims to receive a key. Also, a vibrating table can be useful to provide a smooth surface alignment of the extrusion tip.

The size of the various segments and layers in the film can be adjusted, for example, by the composition of the extruded polymers (e.g., materials, melt viscosities, additives, and molecular weight), pressure in the cavities, flow rate of the polymer stream, and/or the dimensions of the passageways.

In practicing methods described herein, the polymeric compositions might be solidified simply by cooling. This can be conveniently accomplished by, for example, quenching the extruded film or article on a chilled surface (e.g., a chilled roll). In some embodiments, it is desirable to maximize the time to quenching to increase the weld line strength.

A plurality of shims that is useful for providing a layered second segment in which layers on the first and second major surfaces are fed from the same cavity is shown in FIGS. 5 to 11. Such sequences can include shims that provide a second fluid passageway between a second cavity and the dispensing slot, shims that provide a third fluid passageway extending from another cavity within the die along either longitudinal side of the second fluid passageway. In the illustrated embodiment, the polymer in the third fluid passageway does not enter the dispensing slot alongside the second fluid passageway. Instead, upstream from the dispensing slot, the third fluid passageway and the polymer within is diverted into branches that meet the second fluid passageway at areas above and below the second fluid passageway at the point where the second fluid passageway enters the dispensing slot. That is, the third fluid passageway turns in the cross-web or cross-die direction upstream from the dispensing slot. While flow of the polymeric composition from the third fluid passageway alongside the polymeric composition from the second fluid passageway is prevented in the dispensing slot, the branches redirect the polymeric composition from the third fluid passageway to above and below the polymeric composition entering the dispensing slot from the second passageway.

Figure 5:
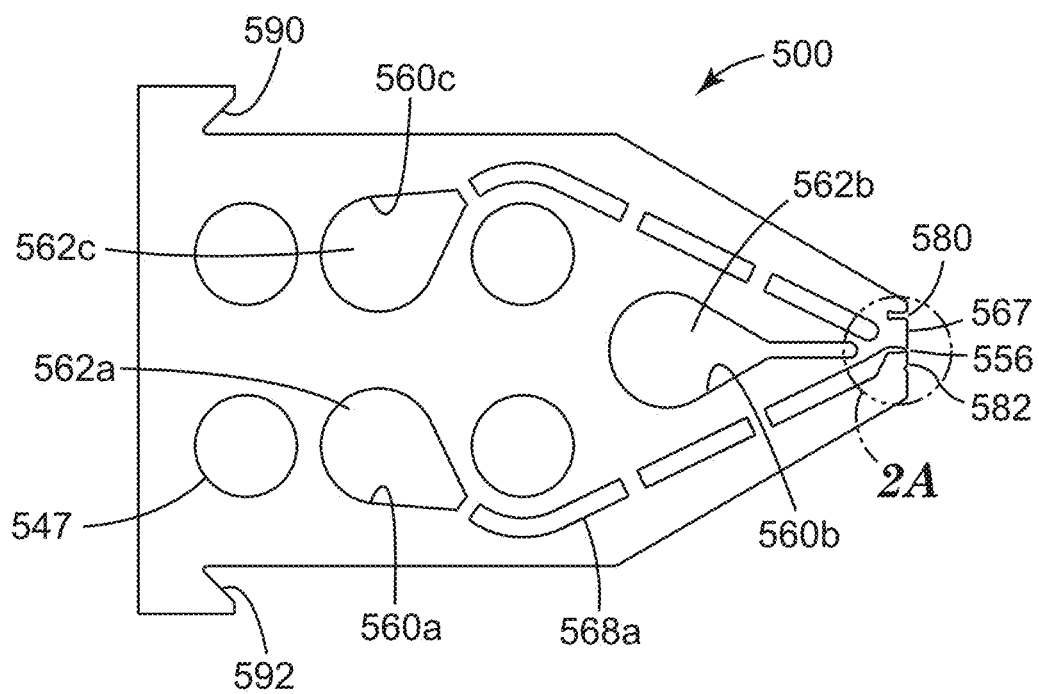
FIG. 5 is a plan view of an embodiment of a shim suited to form a sequence of shims capable of forming a film, for example, as shown in the end views of FIG. 1, 2, or 4.
Figure 10:
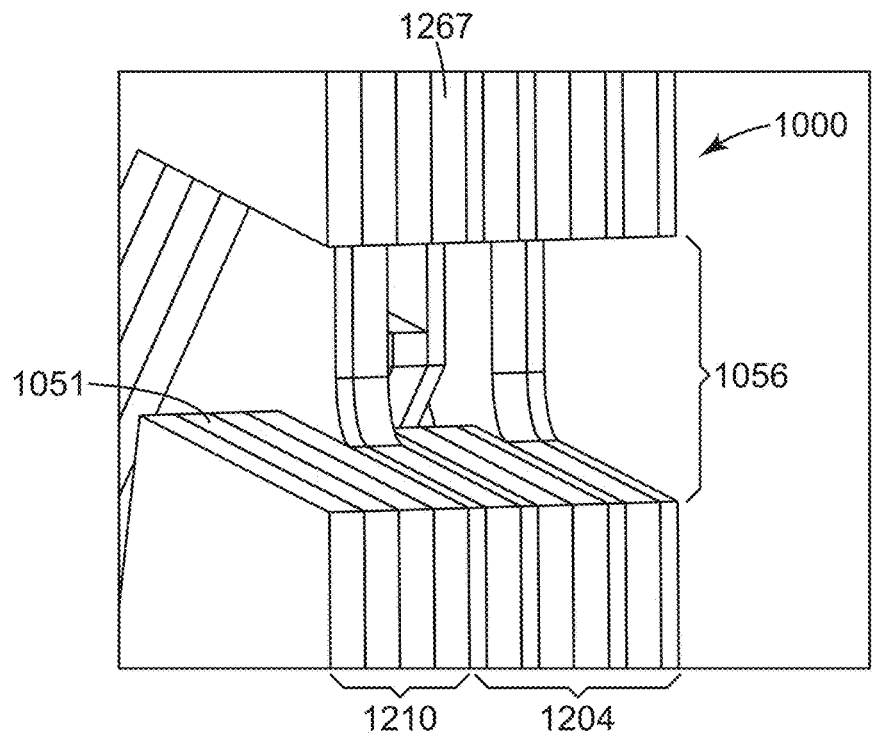
FIG. 10 is a perspective assembly drawing of a sequence of shims employing the shims of FIGS. 5-9 configured to form a portion of the film as depicted in FIG. 2.
Figure 11:
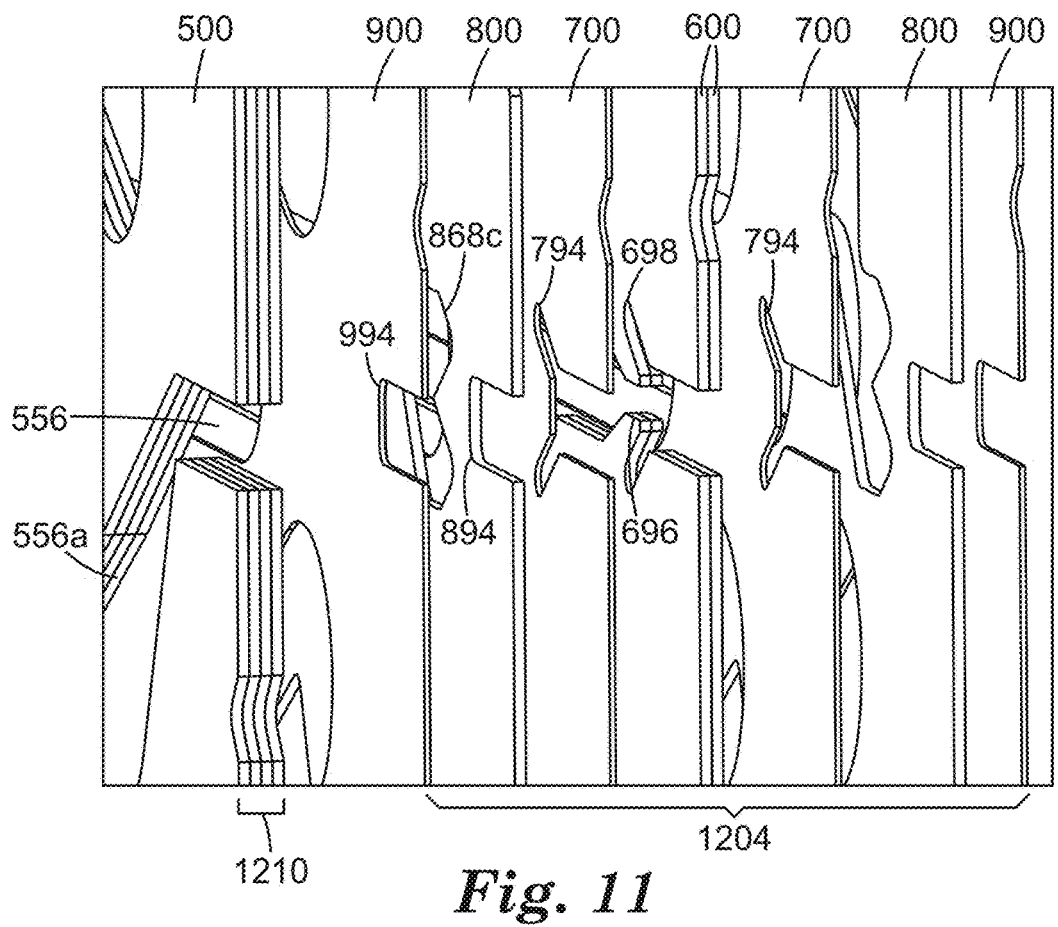
FIG. 11 is a partially exploded perspective view where a subsequence of shims that forms the layered second segments in FIG. 2, which is shown together in FIG. 10, is shown separated to reveal the individual shims.

Referring now to FIG. 5, a plan view of shim 500 is illustrated. Shim 500 is useful in a sequence of shims shown in FIGS. 10 and 11. Other shims useful in this sequence are shown in FIGS. 6 to 9. Shim 500 has first aperture, 560*a*, second aperture 560*b*, and third aperture 560*c*. When shim 500 is assembled with others as shown in FIGS. 10 and 11, aperture 560*a* will help define first cavity 562*a*, aperture 560*b* will help define second cavity 562*b*, and aperture 560*c* will help define third cavity 562*c*. As will be discussed with more particularity below, molten polymer in cavities 562*b* and 562*c* can be extruded in layered second segments, and molten polymer in cavity 562*a* can be extruded as a first segment between those layered second segments so as to form a portion of the film, for example, illustrated in FIG. 2.

Figure 5A:
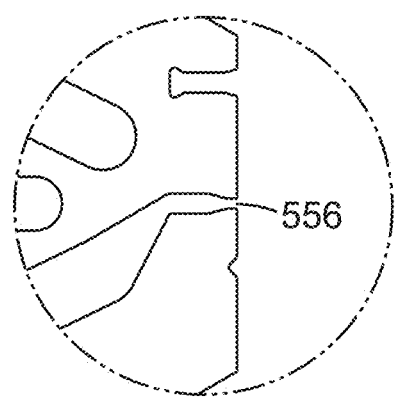
FIG. 5A is an expanded region near the dispensing surface of the shim shown in FIG. 5.

Shim 500 has several holes 547 to allow the passage of, for example, bolts to hold shim 500 and others to be described below into an assembly. Shim 500 has dispensing opening 556 in dispensing surface 567. Dispensing opening 556 may be more clearly seen in the expanded view shown in FIG. 5A. It might appear that there is no path from cavity 562*a* to dispensing opening 556, via, for example, first passageway 568*a*, but the flow has a route in the perpendicular-to-the-plane-of-the-drawing dimension when the sequence of FIGS. 10 and 11, for example, is completely assembled. In the illustrated embodiment, dispensing surface 567 has indexing groove 580 which can receive an appropriately shaped key to facilitate assembling diverse shims into a die. The shim may also have identification notch 582 to help verify that the die has been assembled in the desired manner. This embodiment of the shim has shoulders 590 and 592, which can assist in mounting the assembled die in a manner which will be made clear below in connection with FIG. 12.

Figure 6:
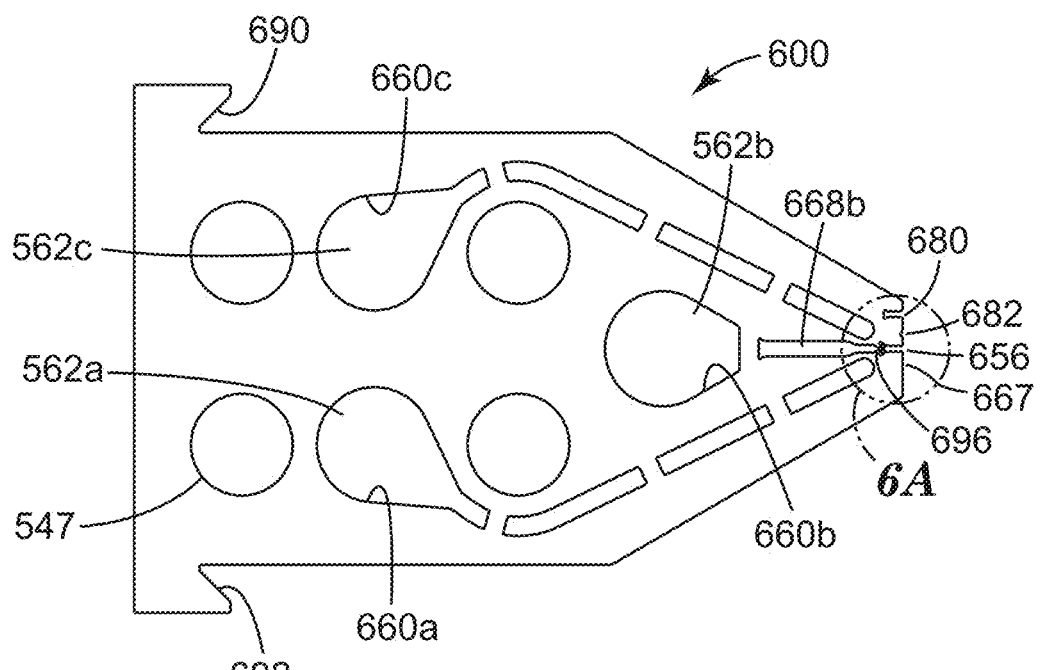
FIG. 6 is a plan view of another embodiment of a shim suited to form a sequence of shims capable of forming a film, for example, as shown in the end views of FIGS. 1 to 4.
Figure 6A:
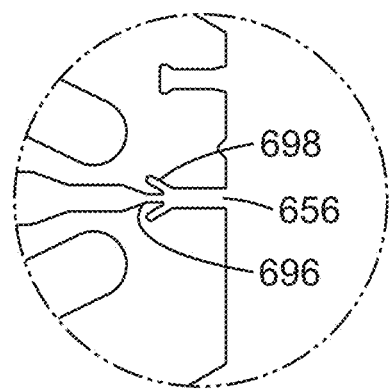
FIG. 6A is an expanded region near the dispensing surface of the shim shown in FIG. 6.

Referring now to FIG. 6, a plan view of shim 600 is illustrated. Shim 600 has first aperture, 660*a*, second aperture 660*b*, and third aperture 660*c*. When shim 600 is assembled with others as shown in FIGS. 10 and 11, aperture 660*a* will help define first cavity 562*a*, aperture 660*b* will help define second cavity 562*b*, and aperture 660*c* will help define third cavity 562*c*. Analogous to shim 500, shim 600 has dispensing surface 667, and in this particular embodiment, dispensing surface 667 has indexing groove 680 and identification notch 682. Also analogous to shim 500, shim 600 has shoulders 690 and 692. It might appear that there is no path from cavity 562*b* to dispensing opening 656, via, for example, second passageway 668*b*, but the flow has a route in the perpendicular-to-the-plane-of-the-drawing dimension when the sequence of FIGS. 10 and 11 is completely assembled. Second passageway 668*b* includes branches 698 that accept the flow of the third polymeric composition from the third fluid passageway as described in further detail below. It will be noted that second passageway 668*b* includes constriction 696 upstream from dispensing opening 656, which may be more clearly seen in the expanded view of FIG. 6A. The constriction may allow for easier machining of the branches 698.

Figure 7:
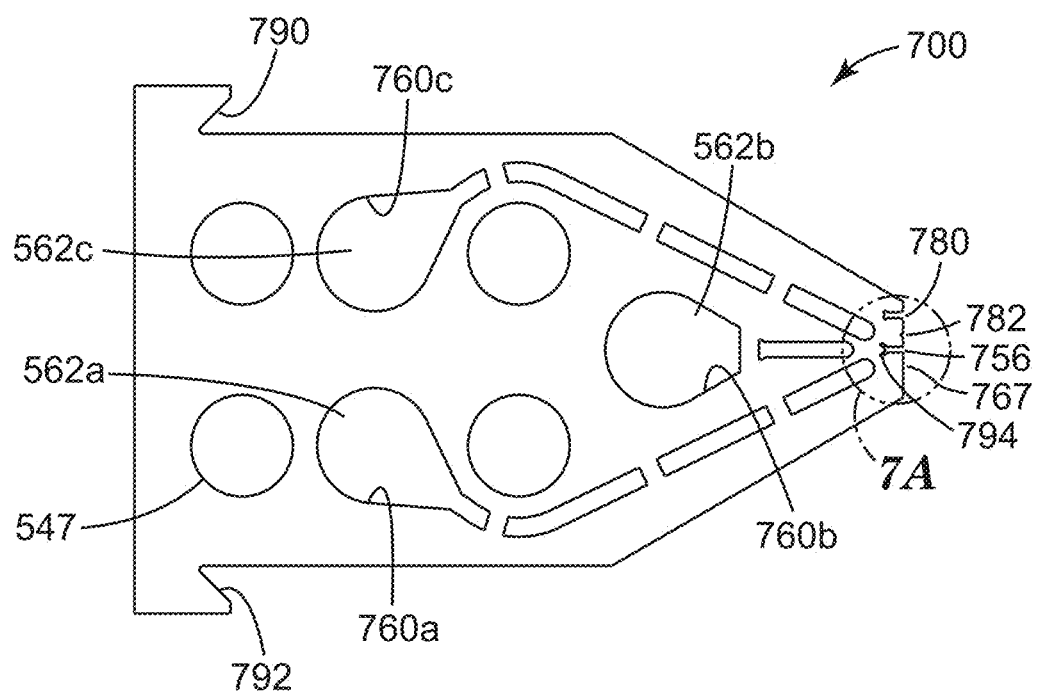
FIG. 7 is a plan view of yet another embodiment of a shim suited to form a sequence of shims capable of forming a film, for example, as shown in the end views of FIGS. 1 to 4.
Figure 7A:
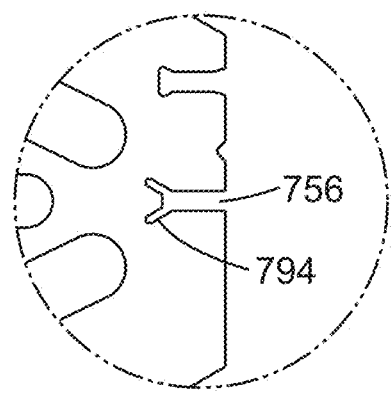
FIG. 7A is an expanded region near the dispensing surface of the shim shown in FIG. 7.

Referring now to FIG. 7, a plan view of shim 700 is illustrated. Shim 700 has first aperture 760*a*, second aperture 760*b*, and third aperture 760*c*. When shim 700 is assembled with others as shown in FIGS. 10 and 11, aperture 760*a* will help define first cavity 562*a*, aperture 760*b* will help define second cavity 562*b*, and aperture 760*c* will help define third cavity 562*c*. Analogous to shim 500, shim 700 has dispensing surface 767, and in this particular embodiment, dispensing surface 767 has indexing groove 780 and an identification notch 782. Also analogous to shim 500, shim 700 has shoulders 790 and 792. Shim 700 has dispensing opening 756, but it will be noted that this shim has no connection between dispensing opening 756 and any of the cavities 562*a*, 562*b*, or 562*c*. As will be appreciated more completely in the discussion below in the discussion with shim 800, blind recess 794 behind dispensing openings 756 provides a path that to allows the change in the direction of the flow of material in the third fluid passageways so that it can meet the second fluid passageways. Blind recess 794 is bifurcated to direct material from passageways 868c into top and bottom layers on either side of the middle layer provided by second polymeric composition emerging from second cavity 562b. Blind recess 794 and dispensing opening 756 may be more clearly seen in the expanded view shown in FIG. 7A.

Figure 8:
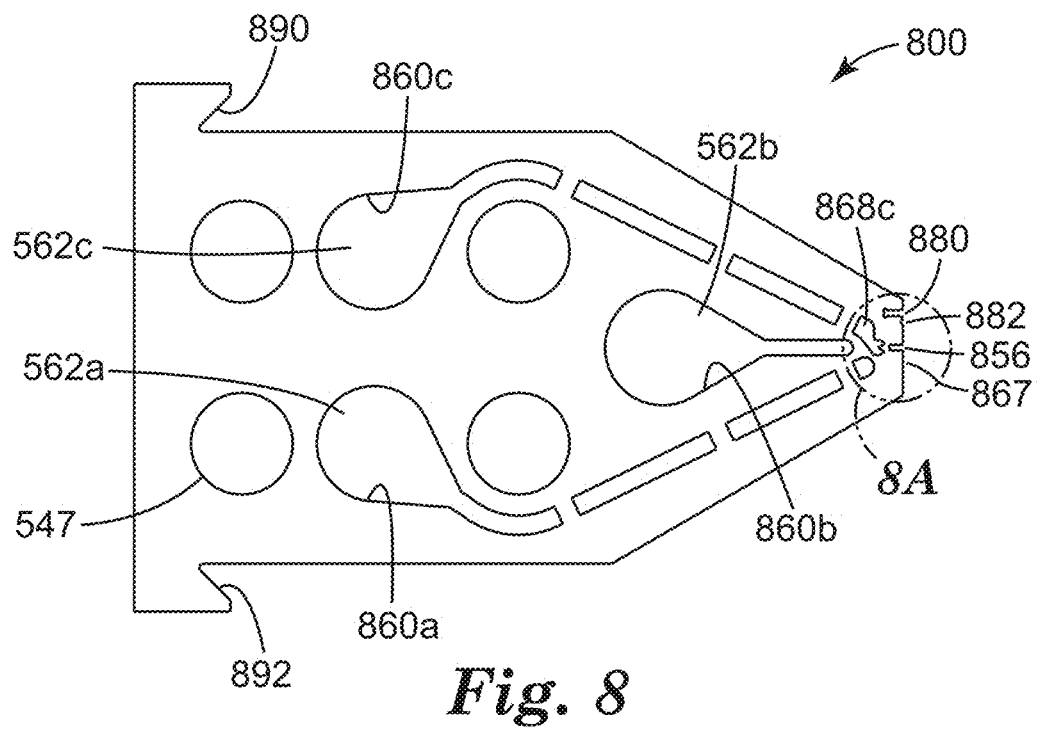
FIG. 8 is a plan view of yet another embodiment of a shim suited to form a sequence of shims capable of forming a film, for example, as shown in the end views of FIGS. 1 to 4.
Figure 8A:
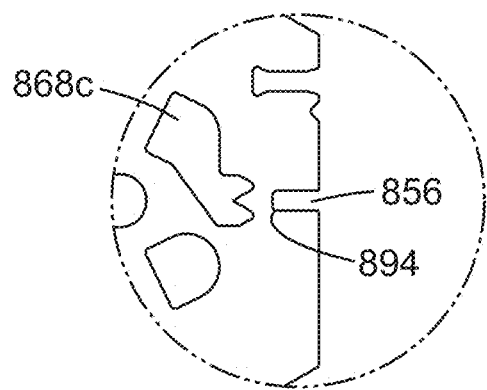
FIG. 8A is an expanded region near the dispensing surface of the shim shown in FIG. 8.

Referring now to FIG. 8, a plan view of shim 800 is illustrated. Shim 800 has first aperture 860a, second aperture 860b, and third aperture 860c. When shim 800 is assembled with others as shown in FIGS. 10 and 11, aperture 860a will help define first cavity 562a, aperture 860b will help define second cavity 562a, and aperture 860c will help define third cavity 562c. Analogous to shim 500, shim 800 has dispensing surface 867, and in this particular embodiment, dispensing surface 867 has indexing groove 880 and an identification notch 882. Also analogous to shim 500, shim 800 has shoulders 890 and 892. Shim 800 has dispensing opening 856, but it will be noted that this shim has no connection between dispensing opening 856 and any of the cavities 562a, 562b, or 562c. There is no connection, for example, from cavity 562c to dispensing opening 856, via, for example, third passageway 868c, but the flow has a route in the perpendicular-to-the-plane-of-the-drawing dimension when shim 800 is assembled with shims 700 and 600. Third passageway 868c in shim 800 has a bifurcated terminus where material from cavity 562c is redirected into the two branches of blind recess 794 of shim 700 and further to branches 698 of fluid passageway 668b of shim 600 to provide top and bottom layers of the third polymeric composition emerging from third cavity 562c above and below the middle layer provided by second polymeric composition emerging from second cavity 562b. Because of terminus of the third passageway upstream from the dispensing slot, flow from the third cavity is prevented alongside the second polymeric composition at the dispensing slot. Instead, flow is redirected above and below the second polymeric composition as it enters the dispensing slot. Passageway 868c and dispensing opening 856 may be more clearly seen in the expanded view shown in FIG. 8A.

Figure 9:
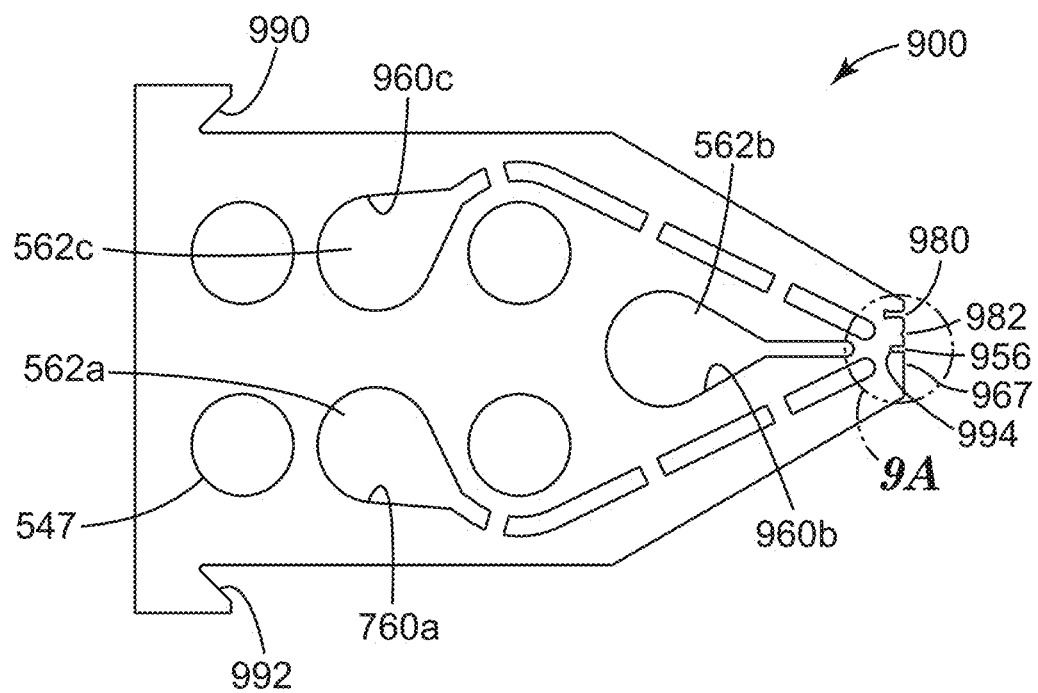
FIG. 9 is a plan view of yet another embodiment of a shim suited to form a sequence of shims capable of forming a film, for example, as shown in the end views of FIGS. 1 to 4.
Figure 9A:
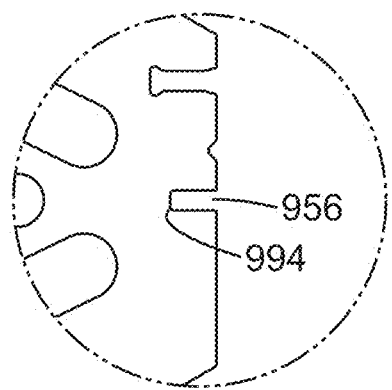
FIG. 9A is an expanded region near the dispensing surface of the shim shown in FIG. 9.

Referring now to FIG. 9, a plan view of shim 900 is illustrated. Shim 900 has first aperture 960a, second aperture 960b, and third aperture 960c. When shim 900 is assembled with others as shown in FIGS. 10 and 11, aperture 960a will help define first cavity 562a, aperture 960b will help define second cavity 562b, and aperture 960c will help define third cavity 562c. Analogous to shim 500, shim 900 has dispensing surface 967, and in this particular embodiment, dispensing surface 967 has indexing groove 980 and identification notch 982. Also analogous to shim 500, shim 900 has shoulders 990 and 992. Shim 900 has dispensing opening 956, but it will be noted that this shim has no connection between dispensing opening 956 and any of the cavities 562a, 562b, or 562c. Blind recess 994 allows the flows of molten polymer from dispensing openings in shims on either side of it to contact each other to form a coherent film. Blind recess 994 and dispensing opening 956 may be more clearly seen in the expanded view shown in FIG. 9A. In other positions where shim 900 appears, it may serve to manipulate the resistance of the dispensing slot within a region to extruded flow. This will also be discussed in more detail below.

Referring now to FIG. 10, a perspective assembly drawing of a sequence of shims, collectively 1000, employing the shims of FIGS. 5-9 so as to produce the first and second segments as shown in FIG. 2, is shown. It should be noted in FIG. 10 that the dispensing slot 1056, formed by the dispensing openings 556, 656, 756, 856, and 956 collectively in the plurality of shims, is a continuous opening across the die. There are no shims without dispensing openings. Referring now to FIG. 11, one subsequence of shims from FIG. 10 is exploded to reveal some individual shims. Specifically, the sequence of shims that forms first, second, and third layers in the second segments is shown exploded. Proceeding left to right, die zone 1210 comprises a sequence of four shims 500 that can extrude first segments 210. Die zone 1204 includes a sequence of eight shims that can extrude layered second segments 204. The first slot segment in the extrusion die corresponds to the portion of the dispensing slot 1056 in die zone 1210, and the second slot segment corresponds to the portion of the dispensing slot 1056 in die zone 1204. Die zone 1204 is shown to comprise one instance of shim 900, one instance of shim 800, one instance of shim 700, two instances of shim 600, one instance of shim 700, one instance of shim 800, and one instance of shim 900, making eight shims total. In this view, it is easier to appreciate how the layered second segment 204 (seen in FIG. 2) is formed. A third polymeric composition flowing from two third passageways 868c in the two instances of shim 800 is prevented from reaching dispensing slot 894. Instead, the third polymeric composition flows through branches in blind recesses 794 in shims 700 and then to the branches 698 where it is directed above and below the flow of the second polymeric composition exiting from the constriction 696 in the second fluid passageway. In the dispensing slot, the second segment 204 is bonded to first segments 210 (seen in FIG. 2), which emerges from dispensing openings 556 in the four instances of shim 500.

Extrusion dies according to the present disclosure, which are useful for extruding the films disclosed herein, have a dispensing slot. The embodiment of FIG. 10 illustrates an example of a dispensing slot in an extrusion die comprising a plurality of shims. In FIG. 10, dispensing slot 1056 is a cavity recessed back from dispensing surface 1267, formed from dispensing surfaces 567, 667, 767, 867, and 967 of shims 500, 600, 700, 800, and 900, respectively. Dispensing slot 1056 has a land 1051, where the confluence of the various extruded polymeric compositions is allowed to melt bond together. In the illustrated embodiment, the land 1051 is a flat surface, but this is not a requirement. The shims may be designed to have a textured surface, or the height of the dispensing openings of the different shims 500-900 may be different as desired for a particular film. Also in the illustrated embodiment, the land 1051 length is shorter at the position of the confluence of the second and third polymeric compositions from the second and third passageways than at the position formed by the dispensing openings 556 in shims 500, but this is also not a requirement. The length of land 1051 should typically be long enough to establish the flow of the polymer extrudate and allow melt-bonding between the various polymeric compositions, which typically requires that the length of the land over the height of the polymer is in a range from 1 to 10. If the length of the land 1051 is too long, for example, longitudinal segments at the edges of the polymer extrudate may become distorted. It can also be desirable to have the recessed cavity taper in width, for example, after the flowstreams combine.

Figure 12:
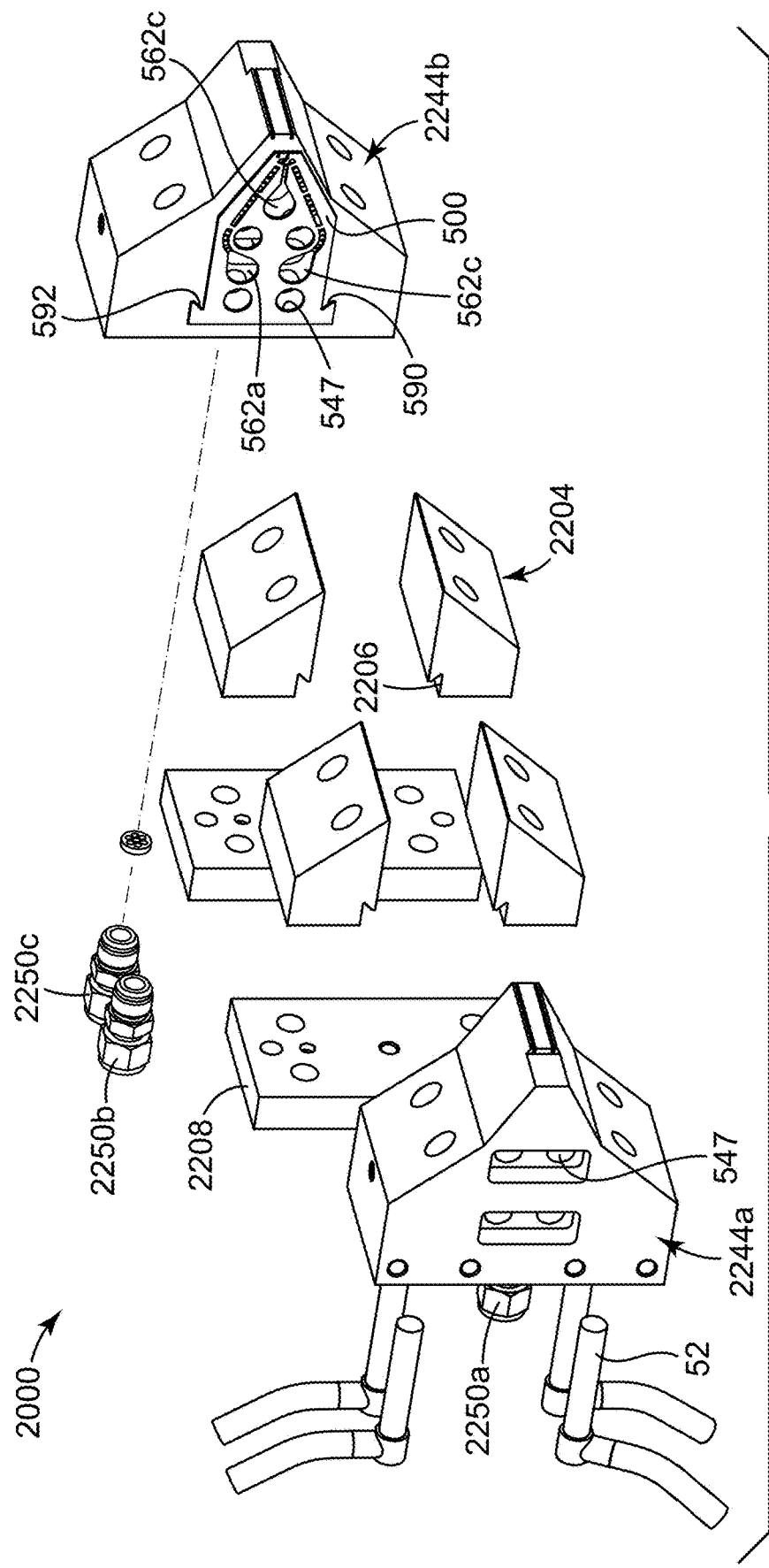
FIG. 12 is an exploded perspective view of an example of a mount suitable for an extrusion die composed of multiple repeats of the sequence of shims of FIGS. 10 and 11 or FIG. 18.

Referring now to FIG. 12, an exploded perspective view of a mount 2000 suitable for an extrusion die composed of multiple repeats of the sequence of shims of FIGS. 10 and 11, for example, is illustrated. Mount 2000 is particularly adapted to use shims 500, 600, 700, 800, and 900 as shown in FIGS. 5 through 9. However for visual clarity, only a single instance of shim 500 is shown in FIG. 12. The multiple repeats of the sequence of shims of FIGS. 10 and 11 are compressed between two end blocks 2244a and 2244b. Conveniently, through bolts can be used to assemble the shims to the end blocks 2244a and 2244b, passing through holes 547 in shims 500, 600, 700, 800, and 900.

In this embodiment, inlet fittings 2250a, 2250b, and 2250c provide a flow path for three streams of molten polymer through end blocks 2244a and 2244b to cavities 562a, 562b, and 562c. Compression blocks 2204 have a notch 2206 that conveniently engages the shoulders on the shims (e.g., 590 and 592 on 500). When mount 2000 is completely assembled, compression blocks 2204 are attached by, e.g. machine bolts to backplates 2208. Holes are conveniently provided in the assembly for the insertion of cartridge heaters 52.

Figure 13:
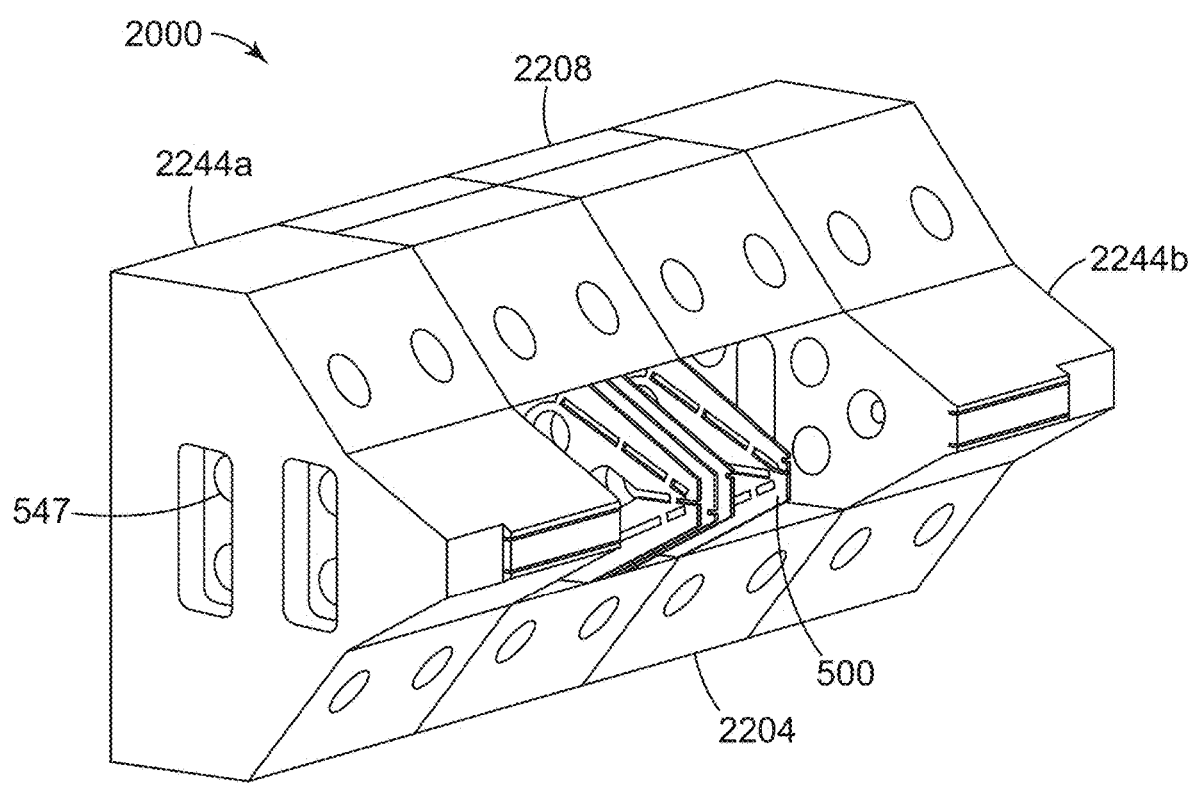
FIG. 13 is a perspective view of the mount of FIG. 12 in an assembled state.

Referring now to FIG. 13, a perspective view of mount 2000 of FIG. 12 is illustrated in a partially assembled state. A few shims (e.g., 500) are in their assembled positions to show how they fit within mount 2000, but most of the shims that would make up an assembled die have been omitted for visual clarity.

Figure 15:
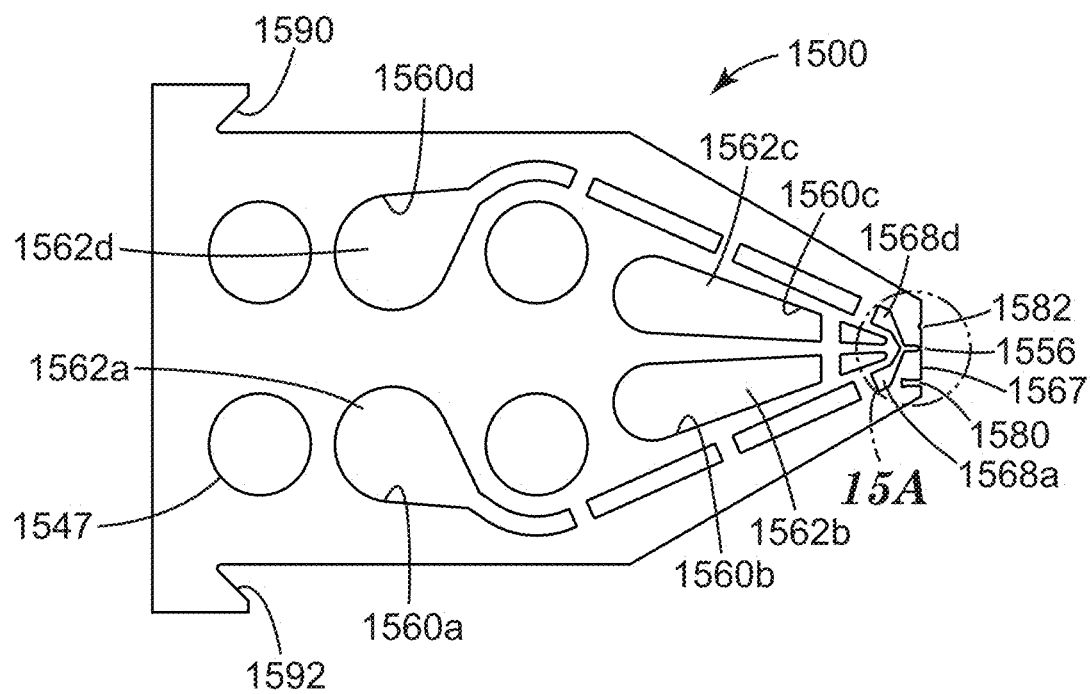
FIG. 15 is a plan view of an embodiment of a shim suited to form a sequence of shims useful in an extrusion die according to the present disclosure and/or useful for making a film according to the present disclosure.
Figure 16:
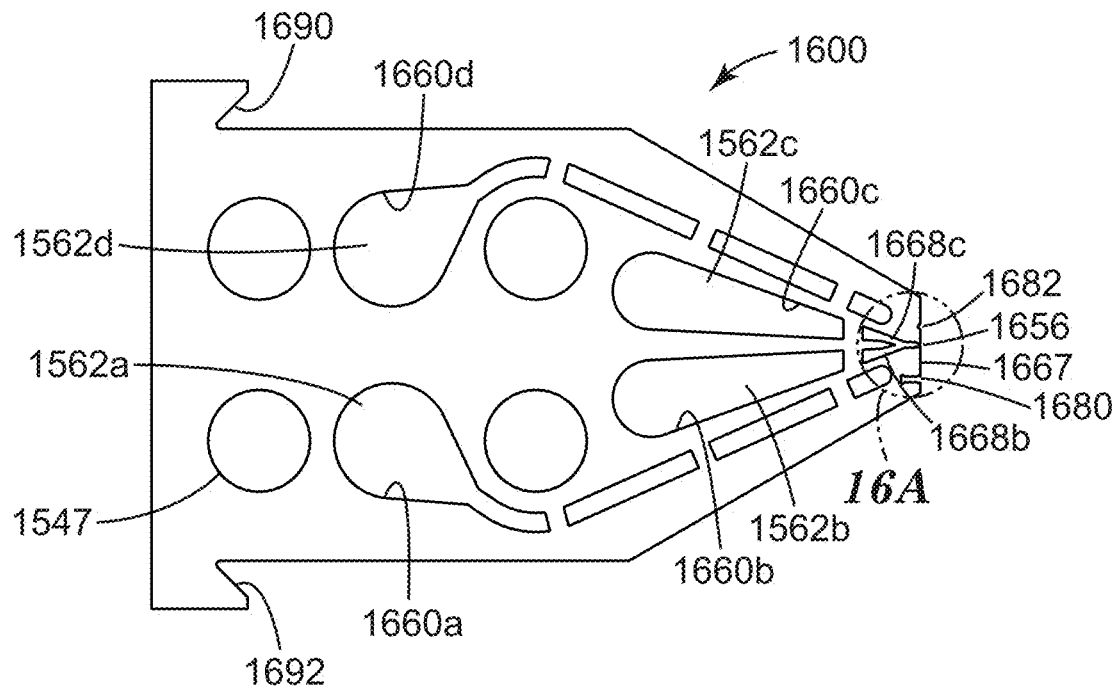
FIG. 16 is a plan view of another embodiment of a shim suited to form a sequence of shims useful in an extrusion die according to the present disclosure and/or useful for making a film according to the present disclosure.
Figure 17:
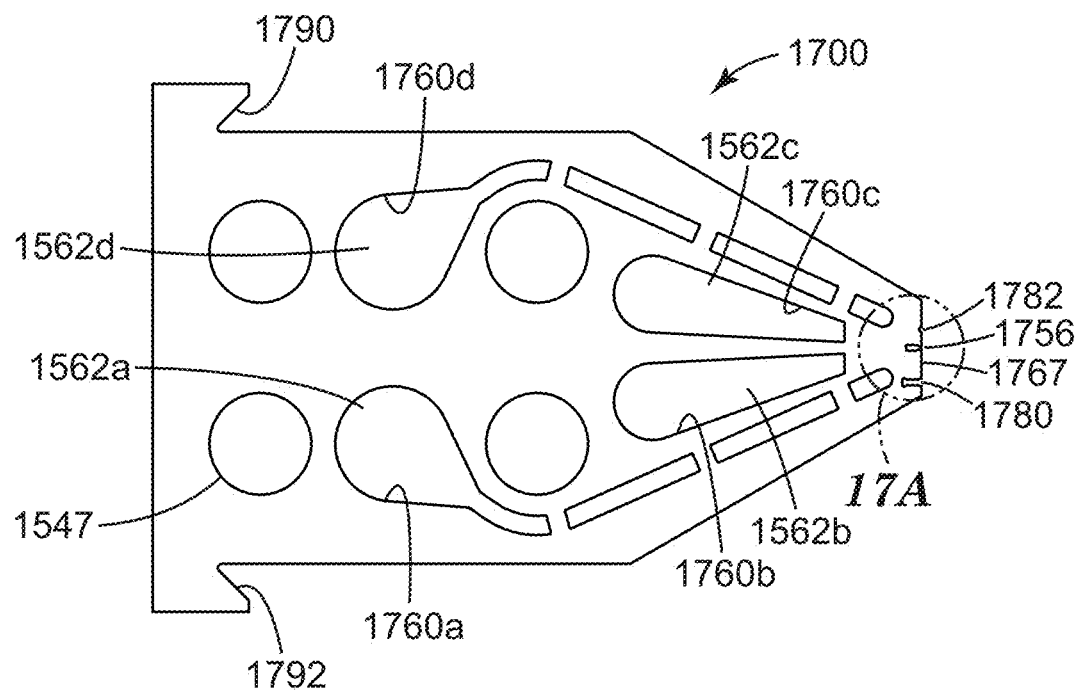
FIG. 17 is a plan view of yet another embodiment of a shim suited to form a sequence of shims useful in an extrusion die according to the present disclosure and/or useful for making a film according to the present disclosure.
Figure 18:
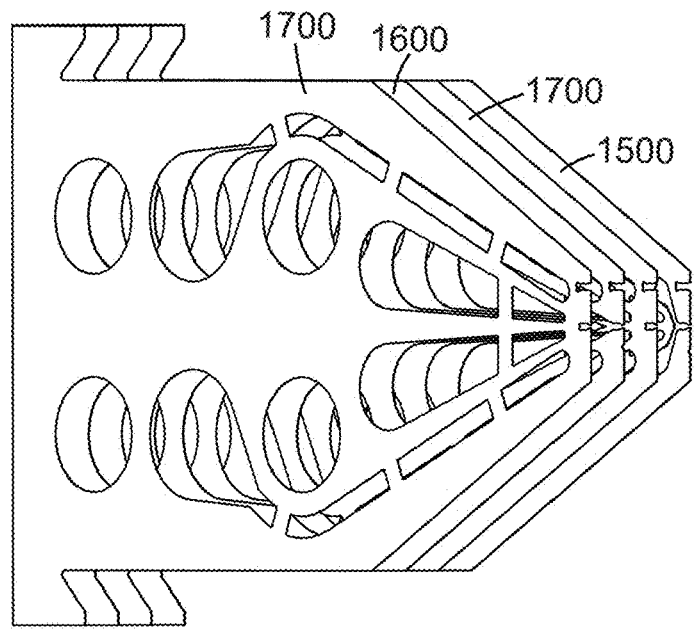
FIG. 18 is a perspective drawing of a sequence of shims employing the shims of FIGS. 15-17 configured to form a portion of a film according to some embodiments of the present disclosure.
Figure 18A:
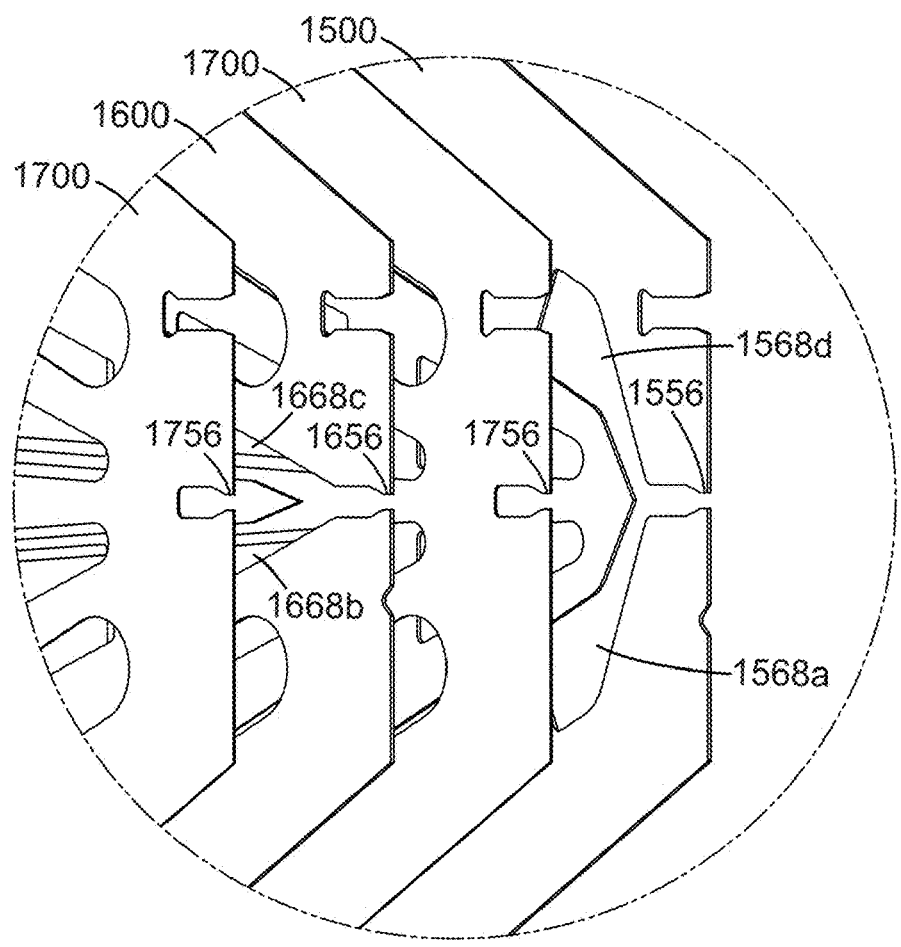
FIG. 18A is an expanded region near the dispensing surfaces of the shims shown in FIG. 18.

Another embodiment of a plurality of shims useful for an extrusion die according to the present disclosure is illustrated in FIGS. 15 to 18. A film in which the first segments and the second segments each have first and second layers (e.g., with each layer in each of the first and second segments being of a different polymeric composition) can conveniently be extruded from this extrusion die. Referring now to FIG. 15, a plan view of shim 1500 is illustrated. Shim 1500 is useful in a sequence of shims shown in FIGS. 18 and 18A. Other shims useful in this sequence are shown in FIGS. 16 and 17. Shim 1500 has first aperture, 1560a, second aperture 1560b, a third aperture 1560c, and a fourth aperture 1560d. When shim 1500 is assembled with others as shown in FIGS. 18 and 18A, first aperture 1560a will help define first cavity 1562a, second aperture 1560b will help define second cavity 1562b, third aperture 1560c will help define third cavity 1562c, and fourth aperture 1560d will help define fourth cavity 1562d. As will be discussed with more particularity below, molten polymer in cavities 1562a and 1562d can be extruded in layered first segments, and molten polymer in cavities 1562b and 1562c can be extruded in layered second segments between those layered first segments, and so as to form a film, for example, similar to the film shown in FIG. 1 but having layered first segments as well as layered second segments.

Figure 15A:
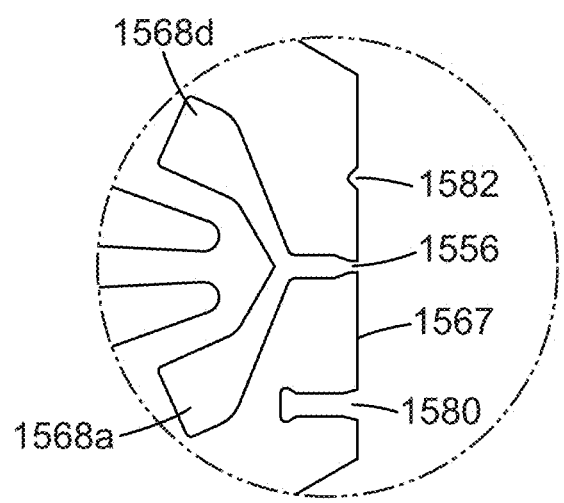
FIG. 15A is an expanded region near the dispensing surface of the shim shown in FIG. 15.

Shim 1500 has several holes 1547 to allow the passage of, for example, bolts to hold shim 1500 and others to be described below into an assembly. Shim 1500 has dispensing opening 1556 in dispensing surface 1567. Dispensing opening 1556 may be more clearly seen in the expanded view shown in FIG. 15A. It might appear that there are no paths from cavities 1562a and 1562d to dispensing opening 1556, via, for example, passageways 1568a and 1568d, but the flow has a route in the perpendicular-to-the-plane-of-the-drawing dimension when the sequence of FIGS. 18 and 18A, for example, is completely assembled. In the illustrated embodiment, dispensing surface 1567 has indexing groove 1580 which can receive an appropriately shaped key to facilitate assembling diverse shims into a die. The shim may also have identification notch 1582 to help verify that the die has been assembled in the desired manner. This embodiment of the shim has shoulders 1590 and 1592, which can assist in mounting the assembled die as described above in connection with FIG. 12.

Figure 16A:
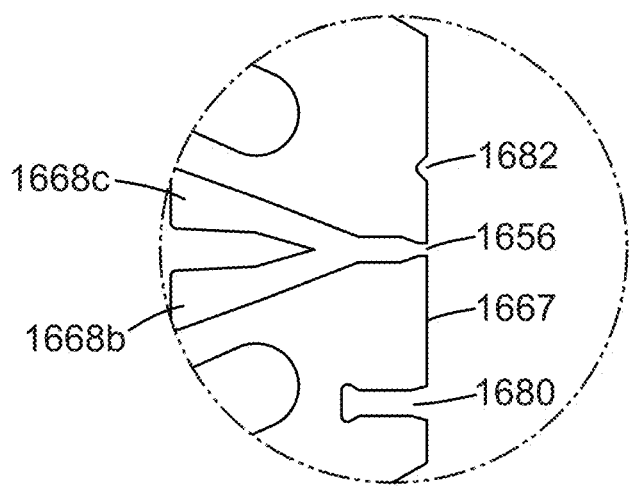
FIG. 16A is an expanded region near the dispensing surface of the shim shown in FIG. 16.

Referring now to FIG. 16, a plan view of shim 1600 is illustrated. Shim 1600 has first aperture, 1660a, second aperture 1660b, third aperture 1660c, and fourth aperture 1660d. When shim 1600 is assembled with others as shown in FIGS. 18 and 18A, first aperture 1660a will help define first cavity 1562a, second aperture 1660b will help define second cavity 1562b, third aperture 1660c will help define third cavity 1562c, and fourth aperture 1660d with help define fourth cavity 1562d. Analogous to shim 1500, shim 1600 has dispensing surface 1667, and in this particular embodiment, dispensing surface 1667 has indexing groove 1680 and identification notch 1682. Also analogous to shim 1500, shim 1600 has shoulders 1690 and 1692. It might appear that there are no paths from cavities 1562b and 1562c to dispensing opening 1656, via, for example, passageway 1668b and 1668c, respectively, but the flow has a route in the perpendicular-to-the-plane-of-the-drawing dimension when the sequence of FIGS. 18 and 18A, for example, is completely assembled. Dispensing opening 1656 may be more clearly seen in the expanded view shown in FIG. 16A.

Figure 17A:
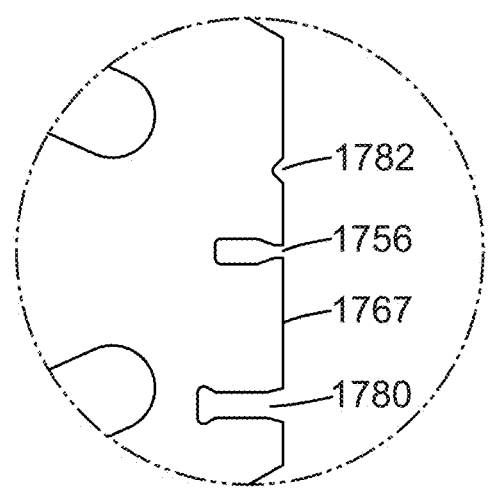
FIG. 17A is an expanded region near the dispensing surface of the shim shown in FIG. 17.

Referring now to FIG. 17, a plan view of shim 1700 is illustrated. Shim 1700 has first aperture 1760a, second aperture 1760b, third aperture 1760c, and fourth aperture 1760d. When shim 1700 is assembled with others as shown in FIGS. 18 and 18A, first aperture 1760a will help define first cavity 1562a, second aperture 1760b will help define second cavity 1562b, third aperture 1760c will help define third cavity 1562c, and fourth aperture 1760d with help define fourth cavity 1562d. Analogous to shim 1500, shim 1700 has dispensing surface 1767, and in this particular embodiment, dispensing surface 1767 has indexing groove 1780. Also analogous to shim 1500, shim 1700 has shoulders 1790 and 1792. Shim 1700 has dispensing opening 1756, but it will be noted that this shim has no connection between dispensing opening 1756 and any of the cavities 1562a, 1562b, 1562c, or 1562d. Blind recess 1794 behind dispensing opening 1756 allows the flows of molten polymer from dispensing openings 1556 and 1656 to contact each other to form a coherent film. Blind recess 1794 and dispensing opening 1756 may be more clearly seen in the expanded view shown in FIG. 17A.

Referring now to FIG. 18, a perspective assembly drawing of a sequence of shims employing the shims of FIGS. 15-18 so as to produce layered first and second segments is shown. Shims 1500 and 1600 can be separated by shims 1700 to produce separate layered first and second segments. More particularly, proceeding from left to right in FIGS. 18 and 18A, a first die zone can include one instance of shim 1700 and one instance of a shim 1600, and a second die zone can include one instance of shim 1700 and one instance of a shim 1500. More than one of each of shims 1600 and 1500 may be used together in a sequence depending on the thickness of the shims and the desired width of the layered first and second segments. For example, one instance of shim 1700 can be followed by a number of shims 1600 in the first die zone, and one instance of shim 1700 can be followed by the same or different number of shims 1500 in the second die zone. It should be noted in FIGS. 18 and 18A that the dispensing slot formed by the dispensing openings 1556, 1656, and 1756 collectively in the plurality of shims is a continuous opening across width of the die. There are no shims without dispensing openings. The first slot segment in an extrusion die including the shims shown in FIGS. 18 and 18A can be considered to be the portion formed by dispensing opening 1556, and the second slot segment can be considered to be the portion formed by dispensing opening 1656.

Modifications of the shims shown in FIGS. 5 to 11 and 15 to 18 can be useful for making other embodiments of films according to the present disclosure. For example, the shims shown in FIGS. 5 to 11 can be modified to have only two cavities, and the first passageways 568a and third passageways 868c can be modified to extend from the same cavity. With this modification, a film having first segments 210 and second segments 204 as shown in FIG. 2, where the first segments 210 and second and third layers 208 and 209 all include the same polymeric composition, can be made. In another embodiment, the shims shown in FIGS. 5 to 8 can be modified to include four cavities and instances of shims 800, 700, and 600 modified to make the first segments 310 having fifth and sixth layers 327 and 328 made from the same polymeric composition. Such a modification can be useful for making a film 300 (shown in FIG. 3) in which four different polymeric compositions are used to make fourth layers 326 of the first segments 310, first layers 306 of the second segments 304, second and third layers 308 and 309 of the second segments 304, and fifth and sixth layers 327 and 328 of the first segments 310, respectively. In another embodiment, shims such as those shown in FIGS. 15 to 17 can be modified to have only three cavities with a shim such as 500 used in a sequence with a modified shim 1600 to make a film 100 such as that shown in FIG. 1, where 3 different polymeric compositions are used to make first segments 110 and first and second layers 106 and 108 of second segments 104. In yet another embodiment, shims such as those shown FIGS. 15 to 17 can be modified to have six cavities and passageways to make 3-layer first and second segments 310 and 304, such as those shown in FIG. 3, with each of the layers made from a different polymeric composition. In yet another embodiment, a modification of the shims shown in FIGS. 5 to 11 can be modified to have four cavities, for example, and modified versions of shims 800 and 700 having wider spaced branches in passageways such as 868c and blind recesses such as 794, respectively. Shim 600 can be modified to have a second set of bifurcations like branches 698 that are wider spaced and meet the main second passageway 668b at a location closer to dispensing surface 667. Such a modification may be useful, for example, for making a film 400 such as that shown in FIG. 4, where four different polymeric compositions are used to make first segments 410, first layers 406 of second segments 404, second and third layers 408 and 409 of second segments 404, and layers 407 and 411 of second segments 404, respectively.

Extrusion dies that include a repeating sequence of the shims shown in FIGS. 10 and 18, for example, may also include other shims to create additional die zones useful for extruding zoned films with different properties in different zones. A passageway leading from a one die cavity to the dispensing slot, where the passageway is wider in the width "x" direction than the combined width of the first and second slot segments, may form a zone in a film with different extensibility from a zone formed by different polymers extruded from separate slot segments in the die. For example, at the side edges of the die, which edges may be adjacent end blocks 2244a and 2244b in FIG. 12, for example, a plurality of shims that can extrude optional second regions 112 and 114 such as those shown in FIG. 1, which have a uniform composition, may be useful. To extrude such a region, a plurality of shims such as shim 500 shown in FIG. 5 may be useful. Or a repeating sequence of shims including shims such as 500 and shims such as 900 shown in FIG. 9 may be useful. A repeating sequence can include, for example, three instances of shim 500 followed by 1 instance of shim 900, and the sequence can be repeated as many times as desired to provide the desired width of the second region 112 or 114. Shims such as 500 can provide flow from first cavity 562a through passageways 568a to the dispensing slot formed by dispensing openings 556 in the shims 500. Blind recess 994 in a shim such as 900 allows the flowstream to be dispensed from dispensing opening 956, but a shim such as 900 can serve to restrict the flow of the polymeric composition because it is not connected to the first cavity 562a. A reduction in caliper of the film may result in the portions of the second region 112 or 114 that are extruded from dispensing opening 956. It may be useful for the film in the second region 112 or 114 to be thicker immediately adjacent the weld lines (116 and 118 shown in FIG. 1).

While each of FIGS. 5 to 11 and 15 to 18 illustrate at least a portion of an apparatus for extrusion that includes a plurality of shims, it is also envisioned that an extrusion die could be machined to have the same passageways from various cavities within the extrusion without using a plurality of shims. The passageways may be machined into various regions of a die or into blocks, for example, that can be assembled to make a die. Such blocks can have a dimension in the width "x" direction of the extrusion die of up to about 5 centimeters or more. Any of these constructions may be useful for making the films disclosed herein.

In some embodiments of the film or the method of making the film according to the present disclosure, the film may be stretched in at least one direction. When the film or extruded article disclosed herein is a web of indefinite length, for example, monoaxial stretching in the machine direction, which is typically the direction parallel to the longitudinal direction of the first and second segments, can be performed by propelling the web over rolls of increasing speed. Means such as diverging rails and diverging disks are useful for cross-direction stretching, which is typically the film width "x" direction. A versatile stretching method that allows for monoaxial, sequential biaxial, or simultaneous biaxial stretching of a thermoplastic web employs a flat film tenter apparatus. Such an apparatus grasps the thermoplastic web using a plurality of clips, grippers, or other film edge-grasping means along opposing edges of the thermoplastic web in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Monoaxial and biaxial stretching can be accomplished, for example, by the methods and apparatus disclosed in U.S. Pat. No. 7,897,078 (Petersen et al.) and the references cited therein. Flat film tenter stretching apparatuses are commercially available, for example, from Brückner Maschinenbau GmbH, Siegsdorf, Germany.

Films according to and/or made according to the present disclosure may have stretch-induced molecular orientation (e.g., in the first segments) after being stretched in at least one of the machine direction or cross-direction. Whether the first or second segments or other portions of the film have stretch-induced molecular orientation can be determined by standard spectrographic analysis of the birefringent properties of the oriented polymer forming the segments. The first or second segments or other portions of the film having stretch-induced molecular orientation may also be said to be birefringent, which means that the polymer in the oriented portion of the film has different effective indexes of refraction in different directions. In the present application, whether the first or second segments or other portions of the film have stretch-induced molecular orientation is measured with a retardance imaging system available from Lot-Oriel GmbH & Co., Darmstadt, Germany, under the trade designation "LC-PolScope" on a microscope available from Leica Microsystems GmbH, Wetzlar, Germany, under the trade designation "DMRXE" and a digital CCD color camera available from QImaging, Surrey, BC, Canada, under the trade designation "RETIGA EXi FAST 1394". The microscope is equipped with a 546.5 nm interference filter obtained from Cambridge Research & Instrumentation, Inc., Hopkinton, Mass., and a 10x/0.25 objective. The degree of birefringence in an oriented film portion is typically observed to be higher in a film that has been stretched to the point of plastic deformation than in a film that only has melt-induced orientation in the machine direction. The difference in degree of birefringence between stretch-induced molecular orientation and melt-induced orientation would be understood by a person skilled in the art.

The extrusion die according to the present disclosure may be useful for making a variety of film constructions including, for example, two, three, or more different polymeric compositions. A variety of different polymeric compositions may be selected to provide first segments in side-by-side arrangement with second segments where the first segments and first and second layers of the second segments are each made, for example, from different polymeric compositions. The different polymeric compositions may be selected for their surface properties or their bulk properties (e.g., tensile strength, elasticity, color, etc). Furthermore, polymeric compositions can be selected to provide specific functional or aesthetic properties in the extruded article such as elasticity, softness, hardness, stiffness, bendability, roughness, colors, textures, or patterns.

In some embodiments, the extrusion die disclosed herein is useful for making film constructions including two different polymeric compositions. In some embodiments, the same polymeric composition may be in two different cavities. For example, in the apparatus illustrated in FIGS. 5 to 11, with reference to the film 200 of FIG. 2, the same polymeric composition may be used in both cavities 562a and 562c to provide a film in which the first layers 206 of second segments 204 are made from the second polymeric composition and the second and third layers 208 and 209 of second segments 204 and the first segments 210 are made from the first polymeric composition. Using this die and method, a film may be made that has segments of a first polymeric composition alternating with seconds segments of, for example, the second polymeric composition covered by the first polymeric composition on the major surfaces of the film. In these embodiments in which the first segments 210 and second and third layers 208 and 209 of the second segments 204 are made from the same polymeric composition, it is typically still possible to detect a boundary between the first and second segments because of the different flow velocities in the flow channels for the first segments and the second and third layers. Thus, the second and third layers 208 and 209 may be considered to be separated from the first segments 210 by polymer interfaces and may not be considered to be continuous across the width of the film. The flow velocity for the second and third layers 208 and 209 is typically much lower than that of the first segments 210 because of the size of the flow channels for the second layers (e.g., formed by shims 600, 700, and 800 shown in FIG. 11) and the throughput of third and fourth polymeric compositions. The layered material typically accelerates more at the dispensing opening causing it to have more molecular orientation, and as a result, a higher degree of birefringence as described above, than first segments that are not layered. Thus, there is typically a difference in molecular orientation between the first segments 210 and the second and third layers 208 and 209 of the second segments 204 that can be detected by measuring birefringence. Depending on the length of time the first and second segments are allowed to remain in the molten state after they are merged, a weld line can be formed between the second and third layers 208 and 209 and the first segments 210. A weld line between the second layer and the first segments in the film according to and/or made according to the present disclosure is can be visible, for example, when the film is stretched in the film's width direction "x" depending on the level of pigment loading and other factors.

In some instances, it may be useful to reduce the flow channel sizes in the third fluid passageways, for example, so that the flow velocity for the second and third polymeric compositions is more similar to the flow velocity of the first polymeric composition, which exits from flow channels formed by shims 500 shown in FIG. 11. However, this is not a requirement.

A variety of polymeric compositions are useful for practicing the present disclosure. The mass flow (or volume flow) of the different polymeric compositions can be equal or unequal as they are respectively extruded. In some embodiments, it is desirable for the melt strengths of the different polymeric compositions to be similar. Polymeric compositions useful for the first segments and first and second layers of the second segments may be selected, for example, based on their compatibility and mutual adhesion properties.

In some embodiments, the polymeric compositions that may be extruded in the die disclosed herein are thermoplastic polymeric compositions (e.g., polyolefins (e.g., polypropylene, polypropylene copolymers, polyethylene, and polyethylene copolymers), polyvinyl chloride, polystyrenes and polystyrene block copolymers, nylons, polyesters (e.g., polyethylene terephthalate), polyurethanes, polyacrylates, silicone polymers, and copolymers and blends thereof). However, the die and method according to the present disclosure may also be useful for co-extruding polymeric materials that can be crosslinked (e.g., by heat or radiation). When a heat curable resin is used, the die can be heated to start the cure so as to adjust the viscosity of the polymeric material and/or the pressure in the corresponding die cavity.

The first segments in a film according to and/or made according to the present disclosure include a first polymeric composition. In some embodiments, any combination of the second layers of the layered second segments, at least a portion of the first segments, or a second region of the film (not having second segments side-by-side with first segments) are made from the first polymeric composition. In some embodiments, the first polymeric composition in the films according to the present disclosure is relatively less elastic than the second polymeric composition in the second segments. The first polymeric composition can also be inelastic as defined above. The first polymeric composition can be formed, for example, of semicrystalline or amorphous polymers or blends. Inelastic polymers can be polyolefinic, formed predominantly of polymers such as polyethylene, polyethylene copolymers, polypropylene, polypropylene copolymers, polybutylene, or polyethylene-polypropylene copolymers. In some embodiments, the first polymeric composition comprises polypropylene, polyethylene, polypropylene-polyethylene copolymer, or blends thereof.

In some embodiments of the films according to and/or made according to the present disclosure, the second polymeric composition in the second segments is relatively more elastic than the first polymeric composition described above. In some embodiments, the first segments are made from a first polymeric composition, the second layers of the layered second segments are made from a third polymeric composition, and the first layer of the layered second segments is made from a second polymeric composition that is more elastic than either the first or third polymeric composition. Examples of elastic polymeric compositions useful in the second segments include thermoplastic elastomers such as ABA block copolymers, polyurethane elastomers, polyolefin elastomers (e.g., metallocene polyolefin elastomers), olefin block copolymers, polyamide elastomers, ethylene vinyl acetate elastomers, and polyester elastomers. An ABA block copolymer elastomer generally is one where the A blocks are polystyrenic, and the B blocks are prepared from conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

As described above, the first and second polymeric compositions can be selected based at least partially on their compatibility and mutual adhesion properties. Compatibility and adhesion between segments can be evaluated by a hang shear evaluation as described in the Examples, below. The hang shear evaluation is carried out by hanging a 200-gram weight on a 2.54 cm long sample (measured in the longitudinal direction of the segments) having 3.8 cm exposed sample in the width direction. The evaluation is carried out at 100° F. (38° C.), and the time until the static load breaks the film is determined. The film is positioned so that the load is applied in the film width or cross-direction (that is, in a direction transverse to the longitudinal direction of the first and second segments). In some embodiments, the time to failure in a hang shear evaluation is at least 100 minutes, in some embodiments, at least 500 minutes, and in some embodiments, at least 1000 minutes. The time to failure in a hang shear evaluation may be influenced by a variety of factors. For example, for different first polymeric compositions, the second polymeric compositions that will provide the desired hang shear strength may be different. The presence of any plasticizers or compatibilizers may affect the hang shear strength. At least for these reasons, it is impractical to describe each composition that may provide a hang shear time of at least 100 minutes although guidance is provided in the following description and in the Examples, below. A time to failure in a hang shear evaluation of at least 100 minutes (in some embodiments at least 500 or 1000 minutes) may be useful for evaluating, for example, films according to the present disclosure which are designed to be extended in the width or cross-direction of the film during use. However, lower time to failure may be useful in films, for example, which are designed to be extended in the longitudinal direction of the film after the film undergoes plastic deformation of relatively inelastic segments as described in further detail below.

For some embodiments, the first polymeric composition comprises polypropylene, and the second polymeric composition is selected such that it bonds well to polypropylene. In some of these embodiments, the second polymeric composition is a thermoplastic elastomer, for example, an ABA triblock copolymer elastomer or an ABAD tetrablock copolymer. In some embodiments, the second polymeric composition is an ABA triblock copolymer of styrene or substituted styrene as the A blocks and hydrogenated polybutadiene, hydrogenated polyisoprene, or a combination of hydrogenated polybutadiene and polyisoprene as the B block. The hydrogenated B block can therefore include polyethylene, polypropylene, and polybutylene moieties. Typically the time to failure in a hang shear evaluation of a film having second segments including such a second polymeric composition and first segments comprising polypropylene is at least 100 minutes (in some embodiments at least 500 or 1000 minutes). The polystyrene units in the ABA triblock copolymer may be present in a range from 20 to 60 percent or in a range from 25 to 45 percent by weight, based on the total weight of the ABA triblock copolymer. The hydrogenated conjugated diene units in the ABA triblock copolymer may be present in a range from 40 to 80 percent or in a range from 55 to 75 percent by weight, based on the total weight of the ABA triblock copolymer. The hydrogenated polyisoprene, when present, may be present in an amount up to 15, 10, or 5 percent by weight, based on the total weight of the ABA triblock copolymer. The weight average molecular weight of the ABA triblock copolymer may be in a range from 75,000 to 250,000 grams per mole, or 150,000 to 220,000 grams per mole. The number average molecular weight of the ABA triblock copolymer may be in a range from 50,000 to 200,000 grams per mole, or 120,000 to 200,000 grams per mole. Weight and number average molecular weights can be measured, for example, by gel permeation chromatography (i.e., size exclusion chromatography) using techniques known to one of skill in the art.

A third polymeric composition, which may be at one or both major surfaces of the second segments, may be the same as or different from the first polymeric composition. In embodiments in which the second polymeric composition is more elastic than the first polymeric composition, the third polymeric composition may be selected so that the second polymeric composition is also more elastic than the third polymeric composition. The third polymeric composition can be useful, for example, for protecting the elastic, second polymeric composition during manufacture or use and/or providing a less tacky surface on the elastic polymeric composition. If the third polymeric composition is selected such that it is softer than the first polymeric composition, the force required to initially stretch the film in the width "x" direction may be less than when the third polymeric compositions is a relatively more inelastic matrix. For example, as shown in Examples 5 and 7, the initial load at 50% elongation in a film having third polymeric composition comprising a mixture of an elastic resin and polypropylene (Example 7) was lower than the initial load at 50% elongation in a film having a third polymeric composition comprising polypropylene resin and no elastic resin (Example 5).

In embodiments of the film or method disclosed herein that include a first polymeric composition, a second polymeric composition, and a third polymeric composition that is different from the first polymeric composition, blending may be useful for making a third polymeric composition that is relatively more elastic than the first polymeric composition but relatively less elastic than the second polymeric composition from which at least the first layers of the layered second segments are made. In some embodiments, the third polymeric composition comprises a blend of the first polymeric composition and the second polymeric composition. In these embodiments, the third polymeric composition generally has good compatibility with and good adhesion to both the first polymeric composition and the second polymeric composition. In some embodiments, the third polymeric composition may be a blend of an elastic resin and an inelastic resin but may not contain the resins in the first or second polymeric compositions.

In some embodiments, compatibilizers added to at least one of the second or third polymeric compositions may be useful. A compatibilizer may be useful, for example, for increasing the elongation of an elastic film, lowering the force required to stretch the film, and modifying the thicknesses of the second segments. Examples of suitable compatibilizers include hydrogenated cycloaliphatic resins, hydrogenated aromatic resins, and combinations thereof. For example, some compatibilizers are hydrogenated C9-type petroleum resins obtained by copolymerizing a C9 fraction produced by thermal decomposition of petroleum naphtha, hydrogenated C5-type petroleum resins obtained by copolymerizing a C5 fraction produced by thermal decomposition of petroleum naphtha, or hydrogenated C5/C9-type petroleum resins obtained by polymerizing a combination of a C5 fraction and C9 fraction produced by thermal decomposition of petroleum naphtha. The C9 fraction can include, for example, indene, vinyltoluene, alpha-methylstyrene, beta-methylstyrene, or a combination thereof. The C5 fraction can include, for example, pentane, isoprene, piperine, 1,3-pentadiene, or a combination thereof. Other compatibilizers include hydrogenated poly (cyclic olefin) polymers. Examples of hydrogenated poly(cyclic olefin) polymers include hydrogenated petroleum resins; hydrogenated terpene-based resins (for example, resins commercially available under the trade designation "CLEARON", in grades P, M and K, from Yasuhara Chemical, Hiroshima, Japan); hydrogenated dicyclopentadiene-based resins (for example, those available from Kolon Industries, South Korea, under the trade designation "SUKOREZ"; a hydrogenated C5-type petroleum resin obtained by copolymerizing a C5 fraction such as pentene, isoprene, or piperine with 1,3-pentadiene produced through thermal decomposition of petroleum naphtha available, for example, from Exxon Chemical Co., Irving, Tex., under the trade designations "ESCOREZ 5300" or "ESCOREZ 5400"; and from Eastman Chemical Co., Kingsport, Tenn., under the trade designation "EASTOTAC H"); partially hydrogenated aromatic modified dicyclopentadiene-based resins commercially available, for example, from Exxon Chemical Co. under the trade designation "ESCOREZ 5600"; resins resulting from hydrogenation of a C9-type petroleum resin obtained by copolymerizing a C9 fraction such as indene, vinyltoluene and α- or β-methylstyrene produced by thermal decomposition of petroleum naphtha available, for example, from Arakawa Chemical Industries Co., Ltd. under the trade designations "ARCON P" or "ARCON M"; and resins resulting from hydrogenation of a copolymerized petroleum resin of the above-described C5 fraction and C9 fraction available, for example, from Idemitsu Petrochemical Co., Tokyo, Japan, under the trade designation "IMARV". In some embodiments, the hydrogenated poly(cyclic olefin) is a hydrogenated poly(dicyclopentadiene). Other examples of useful compatibilizers can be found in U.S. Pat. No. 4,787,897 (Torimae et al.) and U.S. Pat. No. 6,669,887 (Hilston et al.). The compatibilizer is typically amorphous and has a weight average molecular weight up to 5000 grams per mole to preserve compatibility with the elastomeric resin. The molecular weight is often up to 4000 grams per mole, 2500 grams per mole, 2000 grams per mole, 1500 grams per mole, 1000 grams per mole, or up to 500 grams per mole. In some embodiments, the molecular weight is in the range of 200 to 5000 gram per mole, in the range of 200 to 4000 grams per mole, in the range of 200 to 2000 grams per mole, or in the range of 200 to 1000 gram per mole. When present, the compatibilizer may be in the second or third polymeric composition in a range from 15 percent to 30 percent by weight (in some embodiments, 15 to 25 percent by weight) based on the total weight of the second or third polymeric composition.

The second polymeric composition for use in the second segments may be selected such that a film of the second polymeric composition (such as a film that is 0.002 mm to 0.5 mm thick) has an elongation of at least 200 percent at room temperature. The third polymeric composition for use in the second segments, when it is different from the first polymeric composition, may be selected such that a film (e.g., 0.002 mm to 0.5 mm thick) of the third polymeric composition, which may be a blend of polymers, has an elongation of at least 5% at room temperature. In some embodiments, the first, second, and third polymeric compositions may be selected such that the force required to stretch the second segments in the film's width "x" direction is less that the force required to stretch the first segments.

In some embodiments, at least one of the third, fourth, fifth, or sixth polymeric composition is a hot melt adhesive. In some embodiments of the second segments, at least one of the second or third layers comprises a hot melt adhesive. In some embodiments, the first segments include fourth, fifth, and optionally sixth layers, and at least one of the fifth or sixth layers is a hot melt adhesive. Including a hot melt adhesive on the second segments that are relatively more elastic than the first segments may serve to protect the elastic and provide bondability, for example, to fibrous carriers. Hot melt adhesives are typically non-tacky at room temperature, and use of hot melts can decrease contamination on equipment during the handling of the film and lamination. Including a hot melt adhesive on segments that are relatively less elastic than other segments in the film may allow for selective bonding (e.g., to fibrous carriers) in these regions. In some of these embodiments, the first polymeric composition in the first segments may be more elastic than the second polymeric composition in the second segments. The second segments may have first, second, and optionally third layers in which at least one of the second or third layers is a hot melt adhesive. The first segments may be elastic segments that may be uniform in composition from the first major surface to the second major surface. In other words, in these embodiments, the first segments may not be layered segments.

Suitable hot melt adhesives include those based on ethylene-vinyl acetate copolymers, ethylene-acrylate copolymers, polyolefins, polyamides, polyesters, polyurethanes, styrene block copolymers, polycaprolactone, and polycarbonates and may include a variety of tackifying resins, plasticizers, pigments, fillers, and stabilizers. Examples of suitable hot melt adhesives include those available from 3M Company, St. Paul, Minn., under the trade designation "3M SCOTCH-WELD" hot melt adhesives (e.g., products 3731 B and 3764 PG).

In some embodiments, polymeric materials used to make films described herein may comprise a colorant (e.g., pigment and/or dye) for functional (e.g., optical effects) and/or aesthetic purposes (e.g., each has different color/shade). Suitable colorants are those known in the art for use in various polymeric compositions. Examples of colors imparted by the colorant include white, black, red, pink, orange, yellow, green, aqua, purple, and blue. In some embodiments, it is desirable level to have a certain degree of opacity for one or more of the polymeric compositions. The amount of colorant(s) to be used in specific embodiments can be readily determined by those skilled in the art (e.g., to achieve desired color, tone, opacity, transmissivity, etc.). The polymeric compositions such as the first, second, and third polymeric compositions may be formulated to have the same or different colors. In some embodiments, the first segments and at least portions of the second segments are different colors. In some of these embodiments, the first segments the first layer of the second segments are different colors. In some embodiments, each of the first segments and the first and second layers in the second segments are different colors.

In some embodiments, the films may be provided with apertures after they are extruded, which may be useful, for example, for increasing the breathability of the film. In some embodiments, the first segments may include apertures. In some embodiments in which the film includes a second region that does not have second segments side-by-side with first segments, the second region includes apertures. Apertures can be made in the film by a variety of methods including needle-punching, vacuum forming, die cutting, laser techniques, or other methods to introduce apertures into the film after it is extruded. The film may also be provided with apertures during lamination as described in further detail, below.

Films disclosed herein are typically extensible in the film's width "x" direction (which is typically transverse to the direction of the first and second segments). In some embodiments, the film disclosed herein has an elongation of at least 75 (in some embodiments, at least 100, 200, 250, or 300) percent and up to 1000 (in some embodiments, up to 750 or 500) percent in the film's width direction. In some embodiments, films disclosed herein will sustain only small permanent set following deformation and relaxation (in some embodiments, less than 25, 20, or even less than 10 percent) of the original length after 100% elongation at room temperature. As used herein, elongation and permanent set are determined using the test method described in the Examples, below.

In some embodiments, the widths of the second segments, which may include an elastic polymeric composition, in films disclosed herein are less than 1 millimeter (mm) (in some embodiments, up to 750 micrometers, 650 micrometers, 500 micrometers, or 400 micrometers). The width of the first and second segments is typically at least 100 micrometers (in some embodiments, at least 150 micrometers or 200 micrometers). For example, the second segments may be in a range from 100 micrometers to less than 1 mm, 100 micrometers to 750 micrometers, 150 micrometers to 750 micrometers, 150 micrometers to 500 micrometers, or 200 micrometers to 600 micrometers wide.

In some embodiments, the films disclosed herein have first segments with widths up to 2 mm (in some embodiments, up to 1.5 mm, 1 mm or 750 micrometers). In some embodiments, the first segments are at least 250 micrometers, 350 micrometers, 400 micrometers, or 500 micrometers wide. For example, the first segments may be in a range from 250 micrometers to 1.5 mm, 250 micrometers to 1 mm, or 350 micrometers to 1 mm wide. As used herein, the width of the first and second segments is the dimension measured in the film's width direction "x".

While the apparatus and method according to the present disclosure are capable of extruding segments with widths up to 2 mm or 1 mm, such films could not practically be achieved by extrusion from apparatuses having continuous width flow channels up to 2 mm or 1 mm wide and at least 5 cm or 7.5 cm in length such as those described in Int. Pat. App. Pub. No. WO 2010/099148 (Hoium et al.). The pressure drop at the dispensing edge would limit the extrusion rates to less than 0.1 meters per minute, at least ten times slower than the extrusion rates achievable from the apparatus and method disclosed herein.

In some embodiments of the film disclosed herein, the distance between midpoints of two first segment separated by one second segment is up to 3 mm, 2.5 mm, or 2 mm. In some embodiments, the distance between midpoints of two first segments separated by one second segment is at least 300 micrometers, 350 micrometers, 400 micrometers, 450 micrometers, or 500 micrometers. In some embodiments, the distance between midpoints of two first segments separated by one second segment is in a range from 300 micrometers to 3 mm, 400 micrometers to 3 mm, 500 micrometers to 3 mm, 400 micrometers to 2.5 mm, or 400 micrometers to 2 mm.

Figure 14A:
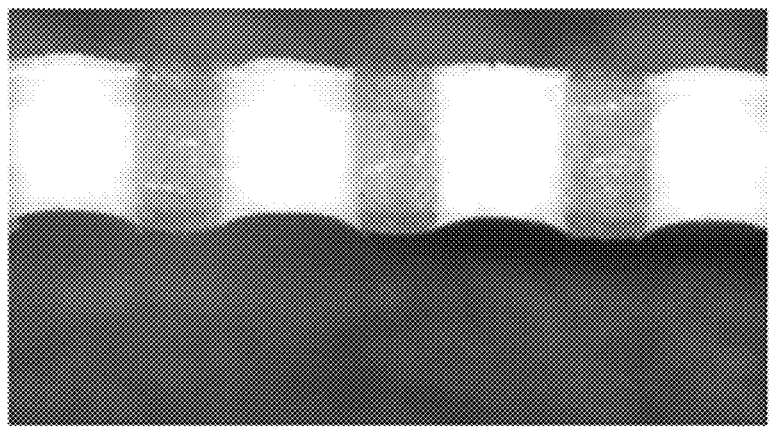
FIG. 14A is photomicrograph of an end view of a film as prepared in Example 2 as it appears as it exits the dispensing slot.
Figure 14B:
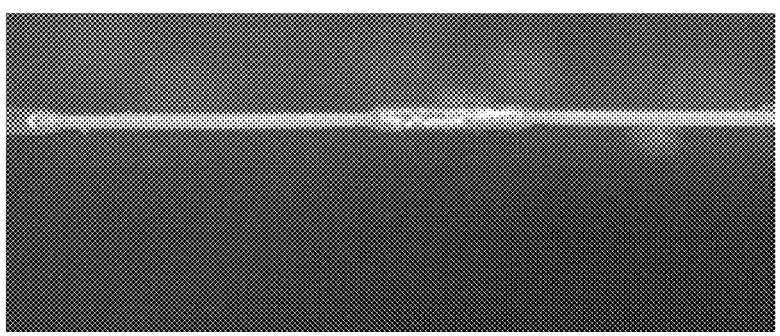
FIG. 14B is a photomicrograph of an end view of the film of Example 2 after it is drawn at 24.4 meters per minute.

The films disclosed herein may have a variety of useful thicknesses, depending on the desired use. In some embodiments, the film may be up to about 250 micrometers, 200 micrometers, 150 micrometers, or 100 micrometers thick. In some embodiments, the film may be at least about 10 micrometers, 25 micrometers, or 50 micrometers thick. For example, the thickness of the film may be in a range from 10 micrometers to 250 micrometers, from 10 micrometers to 150 micrometers, or from 25 micrometers to 100 micrometers thick. In some embodiments, the thickness of the first segments is within about 20%, 10%, or 5% of the thickness of the second segments. In these cases, the first segments may be said to have substantially the same thickness as the second segments. This may be useful, for example, for lowering the force to initially stretch the film, to maximize the elongation, and to lower the hysteresis of the film. In other embodiments, particularly embodiments in which the second polymeric composition is more elastic than the first polymeric composition, the thickness of the second segments may be at least 50%, 100%, 150%, or more higher than the first segments. This may be useful, for example, to provide a pleasing tactile ribbed texture to the film surface. Variations in the thicknesses of the first and second segments in a film according to the present disclosure can be seen in the photomicrograph of FIG. 14A, which is a cross-section view of the film of Example 2 as it looks when it exits the dispensing slot. The photomicrograph of FIG. 14A was taken at 100× magnification. Much more pronounced differences in thickness between the first and second segments are also possible. For example, FIG. 14B is a photomicrograph of the Example 2 film after it is drawn at 24.4 meters per minute. The photomicrograph of FIG. 14B was taken at 200× magnification. The second segments are almost twice as thick as the first segments. The melt viscosities and/or die swells of the selected resins influence the thicknesses of the first and second segments. Resins may be selected for their melt viscosities, or, in some embodiments, a tackifier or other viscosity-reducing additive may be useful to decrease the melt viscosity of the resin, for example, the third polymeric composition. Die designs may also produce varying thicknesses of the film (e.g., by having a dispensing orifice that varies in size).

In the layered segments, including the layered second segments or the layered first segments, the second, third, fifth, and sixth layers, when present, may be in a range from 0.2 micrometers to 20 micrometers, from 1 micrometers to 15 micrometers, or from 3 micrometers to 10 micrometers thick. Layers at the major surfaces of the second segments, for example, having these dimensions may be useful, for example, to allow facile elongation of the film according to the present disclosure. In some embodiments, the thicknesses of these layers are not uniform across the width of the layered segments.

In some embodiments of the films disclosed herein, the density of the second segments, which may include a relatively more elastic polymeric composition, can vary across the web. This can be accomplished, for example, if sequences of shims in the die described herein include varying frequency of shim sequences providing the second segments. In some embodiments, it may be desirable to have a higher density of such second segments toward the center of the film. In other words, the distance between midpoints of successive first segments may or may not be identical. Measuring the distance between midpoints between successive first segments is convenient; however, distance could also be measured between any point of one first segment to a corresponding point in the next first segment of the film. In some embodiments, across a film there is an average of distances between midpoints of two first segments separated by one second segment, and for any two given first segments separated by one second segment, the distance is within 20 (in some embodiments, 15, 10, or 5) percent of the average of these distances across the film.

Measurements of the widths and/or thicknesses of first and second segments (e.g., including the first, second, and optionally third layers) or distances between two corresponding points on successive first or second segments may be made, for example, by optical microscopy. Optical microscopy is also useful to determine volume percentage of the first and second segments. In some embodiments, the first segments make up a higher volume percentage than the second segments. In some embodiments, the first segments make up a range of about 51% to 85% of the volume of the film, and the second segments make up a range of about 15% to 49% of the volume of the film. In some embodiments, the first segments make up a range of about 55% to 80% of the volume of the film, and the second segments make up a range of about 20% to 45% of the volume of the film.

Films according to and/or prepared using the method according to the present disclosure can be made with a variety of basis weights. For example, the basis weight of the film may be in a range from 15 grams per square meter to 100 grams per square meter. In some embodiments, the basis weight of the film is in a range from 20 grams per square meter to 60 grams per square meter. It is useful that in these films, elastomeric polymers can make a relatively low contribution to the basis weight and yet useful elastic properties are achieved in the films and film articles. In some embodiments, the elastomeric polymers contribute up to 25, 20, 15, or 10 grams per square meter to the basis weight of the film. In some embodiments, elastomeric polymers contribute in a range from 5 to 10 grams per square meter to the basis weight of the film. The typically low amount of elastomeric polymer in the films and film articles described herein provides a cost advantage over elastic films in which elastomeric polymers make a higher contribution to the basis weight of the films.

In some embodiments of the films disclosed herein, the first segments, which contain the first polymeric composition that is relatively less elastic than the second polymeric composition, have molecular orientation resulting from stretching. In some of these embodiments, the first segments have stretch-induced molecular orientation in a width direction "x" caused by permanent plastic deformation. To achieve the permanent deformation, the film may be stretched to at least 500 (in some embodiments, at least 600 or 750) percent, depending on the elongation of the film. In these embodiments, the films disclosed herein can provide a "dead-stop" elastic film, in which the force required for extension rises rapidly during the last portion of extension.

In some embodiments, the films disclosed herein are stretched-activated in the longitudinal direction of the first and second segments. In some of these embodiments, the first segments have stretch-induced molecular orientation in a longitudinal direction "y" caused by permanent plastic deformation. To achieve the permanent deformation, the film may be stretched to at least 200 (in some embodiments, at least 300, 400, or 500) percent or more. When the elastic second segments relax after stretching, the stretched first segments are shined to form a textured surface. Such texture may eliminate the need for laminating the elastic film to a fibrous (e.g., nonwoven) carrier, especially if soft-feeling resins are used to make the film. Accordingly, in some embodiments, the film disclosed herein is not joined to a carrier. Furthermore, after stretching in the "y" direction, the films are remarkably strong in this direction. The process of stretching the relatively inelastic first segments in the machine direction can orient or tensilize those segments, offering strength and robustness during manufacturing line processing and in the end-use applications of the films.

In some embodiments where the film disclosed herein is not joined to a carrier, particles may be applied to one or both major surfaces of the film to provide a matte finish. In some embodiments, the film disclosed herein may be flocked with a fibrous material, such as any of those described below, to give the film a soft feeling without joining it to a carrier. In other embodiments, pattern-embossing the film on one or both major surfaces can provide an appearance or feeling of a fibrous material.

In laminates according to the present disclosure, the film disclosed herein is joined to a carrier. One or both major surfaces of the film may be joined to a carrier. The method disclosed herein further comprises joining a surface of the film to a carrier or joining both major surfaces of the film to a carrier. The carrier on opposite sides of the film may be the same or different. The film may be joined to a carrier, for example, by lamination (e.g., extrusion lamination), adhesives (e.g., hot melt or pressure sensitive adhesives), or other bonding methods (e.g., ultrasonic bonding, thermal bonding, compression bonding, or surface bonding).

The film and the carrier may be substantially continuously bonded or intermittently bonded. "Substantially continuously bonded" refers to being bonded without interruption in space or pattern. Substantially continuously bonded laminates can be formed by laminating a carrier to a substantially continuous film upon extrusion of the film; passing the film and the fibrous web between a heated smooth surfaced roll nip if at least one of them is thermally bondable; or applying a substantially continuous adhesive coating or spray to one of the film or carrier before bringing it in contact with the other of the film or carrier. "Intermittently bonded" can mean not continuously bonded and refers to the film and the carrier being bonded to one another at discrete spaced apart locations or being substantially unbonded to one another in discrete, spaced apart areas. Intermittently bonded laminates can be formed, for example, by passing the film and the carrier through a heated patterned embossing roll nip if at least one of them is heat bondable, or by applying discrete, spaced apart areas of adhesive to one of the film or the carrier before bringing it into contact with the other of the film or the carrier. An intermittently bonded laminate can also be made by feeding an adhesively coated aperture ply or scrim between the film and the carrier.

In some embodiments, the chemical compositions in the first and second segments differ at the surface of the film. The ability to select different compositions for the second and third layers of the second segments, for example, and the first segments offers the ability to bond selectively to either the first or second segments as desired. For example, a hot melt adhesive in at least one of the second and third layers in the second segments or fifth and sixth layers of the first segments can offer selective bonding to the desired segments. In some embodiments, the carrier is bonded predominantly to the first segments, which may be relatively less elastic than the first segments. When a carrier is said to bond predominantly to either the first or second segments, it means that greater than 50, 60, 75, or 90 percent of the bonded area of the film is found in one of these locations but not in the other. Bonding predominantly to the first segments can be achieved, for example, through the selected materials for the first and second segments, through the geometry of the first and second segments, or a combination of these. The first polymeric composition may be selected, for example, to have a similar chemical composition and/or molecular weight as the carrier to be bonded. Matching chemical composition and/or molecular weight for the bonding of two materials may be useful, for example, for thermal bonding, ultrasonic bonding, and compression bonding methods among others. An additive to the second or third layers in the second segments could be used to make it less receptive to bonding. For example, extrudable release materials, or lower surface energy materials than in the first segments, could be employed. In some embodiments, the first segments include fifth and sixth layers comprising a hot melt adhesive, and the second segments include second and third layers comprising a material that may be a non-adhesive or a material resistant to bonding (e.g., a soft polypropylene). The ability to preferentially bond to either the first or second segments using selection of materials is not possible in films, for example, in which multiple strands of one polymer are embedded within a continuous matrix of another polymer.

In laminates according to the present disclosure, the carrier may comprise a variety of suitable materials including woven webs, non-woven webs (e.g., spunbond webs, spunlaced webs, airlaid webs, meltblown web, and bonded carded webs), textiles, nets, and combinations thereof. In some embodiments, the carrier is a fibrous material (e.g., a woven, nonwoven, or knit material). The term "nonwoven" when referring to a carrier or web means having a structure of individual fibers or threads which are interlaid, but not in an identifiable manner as in a knitted fabric. Nonwoven fabrics or webs can be formed from various processes such as meltblowing processes, spunbonding processes, spunlacing processes, and bonded carded web processes. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer.

Fibrous materials that provide useful carriers may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material.

Useful carriers may have any suitable basis weight or thickness that is desired for a particular application. For a fibrous carrier, the basis weight may range, e.g., from at least about 5, 8, 10, 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness. In some embodiments in which both major surfaces of the film are bonded to a fibrous carrier, it is sometimes advantageous if one fibrous carrier has a higher basis weight than the other.

Lamination of a film disclosed herein to one or more carriers may be carried out while the film is being stretched in its width "x" direction, while the film is being stretched in its longitudinal "y" direction, or while not being stretched. Stretching the film may be carried out according to any of the methods described above. In some embodiments, machine direction stretching is carried out with differential speed rolls operating at increasingly greater speeds the further downweb they are located. Any number of two or more rolls may be useful. The speed may increase linearly or nonlinearly from one roll to the next. In other embodiments, differential speed rolls may deliver pulsed stretching. For example, a center roll may operate at a slower speed than rolls upweb and downweb, causing the film to go through sequences of stretch and recovery. The distance between adjacent rolls can be the same or different although the horizontal gap between rolls must be greater than the thickness of the film. The diameters of differential speed rolls can be the same or different. Upon stretching, lamination can be used to join one or two fibrous layers. Stretching films with side-by-side elastic and relatively inelastic segments beyond a point of plastic deformation just before lamination several advantages. It is only when such films are stretched beyond the plastic deformation limit of the inelastic segments that the film can become elastic. As long as the tension on the films disclosed herein on a manufacturing line is below that required to exceed the deformation limit, the film is not likely to prematurely stretch on the manufacturing line. Also, the process of stretching the relatively inelastic first segments in the machine direction can orient or tensilize those segments, offering strength and robustness during manufacturing line processing and in the end-use applications of the laminates.

In some embodiments, including those embodiments described above that include stretching before lamination, laminates according to the present disclosure are prepared by ultrasonic bonding. Ultrasonic bonding generally refers to a process performed, for example, by passing layers between a sonic horn and a patterned roll (e.g., anvil roll). Such bonding methods are well-known in the art. For instance, ultrasonic bonding through the use of a stationary horn and a rotating patterned anvil roll is described in U.S. Pat. No. 3,844,869 (Rust Jr.) and U.S. Pat. No. 4,259,399 (Hill). Ultrasonic bonding through the use of a rotary horn with a rotating patterned anvil roll is described, for example, in U.S. Pat. No. 5,096,532 (Neuwirth, et al.); U.S. Pat. No. 5,110,403 (Ehlert); and U.S. Pat. No. 5,817,199 (Brennecke, et al.). Other ultrasonic bonding techniques may also be useful. In embodiments in which the film is stretched using differential speed rolls as described above, the patterned roll and furthest downweb differential speed roll may operate at the same speed. Or, in other embodiments, the patterned roll acts as an extension of the differential speed rolls, for example, and operate at an increased speed than the differential speed rolls.

In some embodiments, ultrasonic bonding is used to join two fibrous carriers through a film according to the present disclosure, creating an extensible laminate in which the film is apertured but the nonwoven layers are not. This configuration may be useful in applications requiring breathability. In other embodiments, ultrasonic bonding can be useful to provide laminates in which apertures are created at the bond sites that extend through the film and both fibrous carriers. In some embodiments, a single fibrous carrier is laminated to the film. In embodiments in which the film has side-by-side elastic and relatively inelastic segments and has been stretched in the machine direction beyond the point of plastic deformation, an extensible laminate having a fibrous carrier on one side and the shirred texture of the relaxed film on the other can be provided. The non-laminated surface can be non-tacky and soft to the touch if soft-feeling resins are used to make the film. In yet another embodiment, a single fibrous carrier is laminated to the films disclosed herein by any of the above-mentioned lamination processes where the films are colored, multi-colored and/or contain a print pattern. The films disclosed herein can be colored by the addition of pigments and/or dyes to one or more segments and layers. A print pattern can be added to the films disclosed herein using a variety of known printing processes.

In some embodiments of laminates disclosed herein, the film according to the present disclosure is joined to a fibrous web carrier using surface bonding or loft-retaining bonding techniques. The term "surface-bonded" when referring to the bonding of fibrous materials means that parts of fiber surfaces of at least portions of fibers are melt-bonded to a surface of the film in such a manner as to substantially preserve the original (pre-bonded) shape of the film surface, and to substantially preserve at least some portions of the film surface in an exposed condition, in the surface-bonded area. Quantitatively, surface-bonded fibers may be distinguished from embedded fibers in that at least about 65% of the surface area of the surface-bonded fiber is visible above the film surface in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the film surface bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the film surface bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto the film surface while the continuous web is moving; and contacting the first surface of the fibrous web with the film surface so that the first surface of the fibrous web is melt-bonded (e.g., surface-bonded or bonded with a loft-retaining bond) to the film surface. Impinging heated gaseous fluid onto the first surface of the fibrous web and impinging heated gaseous fluid on the film surface may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments of the laminates according to the present disclosure, the carrier is a fibrous web activated by mechanical activation. Mechanical activation processes include stretching with diverging disks or incremental stretching methods such as ring-rolling, structural elastic film processing (SELFing), which may be differential or profiled, in which not all material is strained in the direction of stretching, and other means of incrementally stretching webs as known in the art. An example of a suitable mechanical activation process is the ring-rolling process, described in U.S. Pat. No. 5,366,782 (Curro). Specifically, a ring-rolling apparatus includes opposing rolls having intermeshing teeth that incrementally stretch and thereby plastically deform the fibrous web or a portion thereof forming the outer cover, thereby rendering the outer cover stretchable in the ring-rolled regions. Activation performed in a single direction (for example the cross direction) yields an outer cover that is uniaxially stretchable. Activation performed in two directions (for example the machine and cross directions or any two other directions maintaining symmetry around the outer cover centerline) yields an outer cover that is biaxially stretchable.

In some embodiments of the laminates according to the present disclosure, where the laminate includes a film disclosed herein in any of the aforementioned embodiments and an incrementally activated fibrous web, the distance between the midpoints between two first segments separated by one second segment is smaller than the pitch of the activation of the fibrous web. Activation pitch of the incrementally activated fibrous web is defined as the distance between the midpoints of two adjacent areas of higher deformation the fibrous web. Areas of higher deformation may be observed as areas of higher breakage, thinning, or higher elongation in the fibrous web. In some embodiments, areas of higher deformation may be observed as areas of a greater degree of shining of the fibrous web. The activation pitch is typically equivalent to the pitch of the intermeshing surfaces in the apparatus used for incremental stretching. The pitch of the intermeshing surfaces is defined as the distance between two peaks of one of the intermeshing surfaces separated by one valley. The peaks can be defined as the apexes of outward pointing ridges of corrugated rolls (e.g., as described in U.S. Pat. No. 5,366,782 (Curro)) when such apparatuses are used. The peaks can also be defined as the peripheral surfaces (or center portion thereof) of discs used for incremental stretching such as those shown, for example, in U.S. Pat. No. 4,087,226 (Mercer). In other incremental stretching apparatuses, the peaks of one of the intermeshing surfaces would be readily identifiable to a person skilled in the art. In some embodiments of incrementally activated laminates according to the present disclosure, advantageously the first segments of the film, which include a first polymeric composition that is relatively less elastic than the second polymeric composition, are not plastically deformed in the laminate. Plastic deformation of the first segments can occur when the distance between the midpoints of two first segments separated by one second segment is larger than the activation pitch since the first segments can bridge between two peaks on one of the intermeshing surfaces. The plastically deformed regions can appear non-uniform resulting in a less aesthetically pleasing laminate, or the plastic deformation can result in breakage. In contrast, in embodiments of the laminate disclosed herein in which the distance between the midpoints between two first segments separated by one second segment is smaller than the pitch of the activation, the position and size of the first and second segments allow the second segments to stretch during incremental stretching of the laminate to take up the activation displacement without plastically deforming the first segments.

In some embodiments of the laminates according to the present disclosure, one or more zones of the carrier or the entire carrier may comprise one or more elastically extensible materials extending in at least one direction when a force is applied and returning to approximately their original dimension after the force is removed. In some embodiments, the extensible carrier is a nonwoven web that can be made by any of the nonwoven processes described above. The fibers for the nonwoven web may be made from elastic polymers, for example, any of those described above in connection core regions of the film disclosed herein. In some embodiments, the carrier may be extensible but inelastic. In other words, the carrier may have an elongation of at least 5, 10, 15, 20, 25, 30, 40, or 50 percent but may not recover to a large extent from the elongation (e.g., up to 40, 25, 20, 10 or 5 percent recovery). Suitable extensible carriers may include nonwovens (e.g., spunbond, spunbond meltblown spunbond, spunlace, or carded nonwovens). In some embodiments, the nonwoven may be a high elongation carded nonwoven (e.g., HEC). In some embodiments, the carrier may form pleats after it is extended. In some embodiments, the carrier is not pleated.

In some embodiments in which the laminate includes a fibrous web (e.g., a nonwoven web) that is extensible, a film or film article disclosed herein can be selected such that it has a relative low force to initially stretch the film. As described above, such a film can have, for example, second and optionally third layers in the second segments that are made from a softer, lower modulus material than the first segments and can have a geometry in which the thicknesses of the first and second segments are similar (e.g., within about 20%, 10%, or 5%). In these embodiments, the laminates may be considered not to require "activation", and the ease of initially stretching the laminate would be apparent to the user.

Laminates of an extensible fibrous web and a film according to the present disclosure can advantageously be made by bonding under pressure discontinuously at discrete bond locations. The bonding can be carried out by a patterned embossing roll in which the pattern (that is, raised area) of the embossing roll provides up to about 30%, 25%, or 20% of the surface of the embossing roll. It is possible, but not required, that the pattern may be aligned with at least some of the first segments of the film. We have unexpectedly found that patterned bonding can be carried out in a nip at a temperature of up to 60° C., 55° C., 50° C., 40° C., 30° C., or even 25° C. using a pressure of at least one megapascal (MPa) (in some embodiments, 1.1, 1.2, 1.3, or 1.35 MPa).

If desired, lamination of the film according to the present disclosure to one or two fibrous carriers can be carried out such that certain zones are subjected to high heat and high pressure sufficient to create a non-stretchable zone in the laminate.

After laminates according to the present disclosure are prepared according to any of the methods described above, the laminate can be stored in roll form for incorporation into an article (e.g., those described below) in a separate process. In embodiments in which the film is stretched in at least one direction during lamination, the laminate can be stored in roll form in the stretched state and recovered at a later time. It is also possible to combine the method of making a laminate with a downline process of manufacturing an article. In embodiments in which the film is stretched in at least one direction during lamination, the laminate may be maintained in a stretched state and incorporated into an article in a downline process before allowing the web laminate to recover.

In some embodiments of the laminates disclosed herein, wherein the carrier is an elastic or extensible fibrous web, a tensile elongation at maximum load of the film is up to 250 percent of the tensile elongation at maximum load of the extensible fibrous web. In embodiments in which the film undergoes plastic deformation before breaking, the tensile elongation at maximum load of the film is the elongation at the point where the film begins to undergo plastic deformation. This extension is readily recognizable as a shoulder in a stress strain curve measured as described in the Examples, below. In embodiments in which the film does not undergo plastic deformation before breaking, the tensile elongation at maximum load is the tensile elongation at break. The tensile elongation at maximum load of the fibrous web is generally the tensile elongation at break. In some embodiments, a tensile elongation at maximum load of the film is in a range from 25 percent to 250 percent, 50 percent to 225 percent, 75 percent to 200 percent, or 75 percent to 150 percent of the tensile elongation at maximum load of the extensible fibrous web. It is useful in laminates disclosed herein for the tensile elongation at maximum load of the film and the fibrous web to be comparable. In these laminates, there is not a large amount of unused elasticity in the film. For example, if an elastic film made completely of elastic polymers as described above has tensile elongation at maximum load of 800%, but an extensible fibrous web to which it is bonded only has a tensile elongation of about 200%, there is a large amount of elasticity in the film that is unused. Since more elastic polymers are typically more expensive than less elastic polymers, the unused elasticity translates to unnecessary expense. In the laminates according to the present disclosure, the first and second segments in the film allow for a lower amount of elastic polymers to be used while maintaining elongations that are comparable to extensible fibrous webs. On the other hand, the distribution of first and second segments across the film allow for more uniform extension than, for example, if only one region of elasticity was used in the film. This distribution of first and second segments better utilizes the extensible potential of the extensible fibrous web. Furthermore, when the tensile elongation of the extensible fibrous web and the film are this similar, delamination of the extensible fibrous web and the film is less likely to occur than when, for example, the elastic film is much more extensible than the fibrous web.

In some embodiments of the laminates disclosed herein, a recoverable elongation of the laminate is at least 50% of the recoverable elongation of a comparative film after elongation of 100%. The laminate may be made from an extensible fibrous web, or the laminate by be incrementally activated as described above. The recoverable elongation can be understood to be the maximum elongation that provides the film or laminate with a permanent set of up to 20%, in some embodiments, up to 15% or 10%. As used herein, recoverable elongation is determined using the test method described in the Examples, below. The comparative film is the same as the film comprising first and second segments except that it is not laminated to a carrier. The comparative film may be a film that is removed from the laminate, for example, by submerging the laminate in liquid nitrogen and peeling apart the carrier and the film. Or the comparative film may be a sample made identically to the film comprising first and second segments but never laminated to a carrier. In some embodiments, a recoverable elongation of the laminate is at least 75%, 80%, 85%, 90% or 95% of the recoverable elongation of a comparative film at after elongation of 100%. Again, in any of these embodiments, there is not a large amount of unused elasticity in the elastic film. Also, in embodiments in which the carrier is an extensible fibrous web, the distribution of first and second regions better utilizes the recoverable elongation of the extensible fibrous web as described above. Also, where the comparative film is a sample made identically to the film comprising first and second segments but never laminated to an extensible fibrous web and subsequently incrementally stretched, when the recoverable elongation of the laminate is at least 50% (in some embodiments, 75%, 80%, 85%, 90%, or 95%) of the recoverable elongation of a comparative film after elongation of 100%, it is an indication that the incremental stretching did not plastically deform the first segments of the film.

Films disclosed herein have a variety of uses, including wound care and other medical applications (e.g., elastic bandage-like material, surface layer for surgical drapes and gowns, and cast padding), booties, tapes (including for medical applications), and absorbent articles (e.g., diapers, training pants, adult incontinence devices, and feminine hygiene products).

In absorbent articles, the film according to the present disclosure may be useful as a layer(s) within the articles and/or as part of an attachment system for the articles or elastic components. In some embodiments, a non-extensible region attached to the extensible region of the film can be used to attach the film article to the absorbent article or provide a fingerlift. In some embodiments, the non-extensible region can be formed with molded hooks to provide attachment to a loop. However, in some embodiments, the first segments or segments made from a relatively less elastic polymeric composition are not formed with male fastening elements (e.g., hooks) or may not be formed with surface structure in general. Examples of disposable absorbent articles comprising films according to and/or made according to the present disclosure include disposable absorbent garments such as infant diapers or training pants, products for adult incontinence, and feminine hygiene products (e.g., sanitary napkins and panty liners). A typical disposable absorbent garment of this type is formed as a composite structure including an absorbent assembly (including, e.g., cellulosic fluff pulp, tissue layers, highly absorbent polymers (so called superabsorbents), absorbent foam materials, or absorbent nonwoven materials) disposed between a liquid permeable body side liner (e.g., nonwoven layers, porous foams, apertured plastic films) and a liquid impermeable outer cover (e.g., a thin plastic film, a nonwoven coated with a liquid impervious material, a hydrophobic nonwoven material which resists liquid penetration, or laminates of plastic films and nonwoven materials). These components can be combined with films disclosed herein and other materials and features such as further elastic components or containment structures to form the absorbent article.

Figure 19:
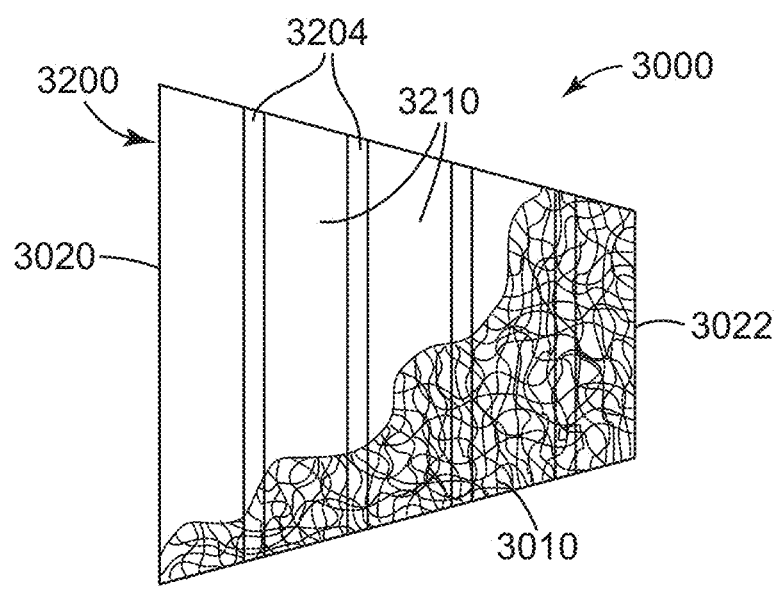
FIG. 19 is a top view of an embodiment of a laminate according to the present disclosure.

In some embodiments, the film according to the present disclosure may be laminated to a fibrous (e.g., nonwoven) web. In some of these embodiments, the resulting laminate may be a fastening tab, for example, for an absorbent article. In some embodiments, the resulting laminate may be an extensible ear, for example, for an absorbent article. In some of these embodiments, the laminate may be in the shape of a trapezium, for example, as shown in FIG. 19. In FIG. 19, laminate 3000 includes fibrous web 3010 and film 3200 having alternating first segments 3210 and second segments 3204. The direction of the first segments 3210 and second segments 3204 is generally parallel to the parallel sides 3020 and 3022 of the trapezoid. While it has been observed that in a typical extensible ear shaped to have a narrower end (e.g., for a hook fastener) and a wider end (e.g., for attachment to an absorbent article), the majority of the stretch occurs at the narrow end of the ear. This can result in unused elastomeric potential, weaker tensile properties or breakage, or delamination of the fibrous web if narrow end stretches beyond the fibrous web's extension capability. In contrast, we have observed that a film having alternating first and second segments as described herein stretches substantially evenly across the entire width of the extensible ear, even when having a trapezoid shape as in FIG. 19.

Some Embodiments of the Disclosure

In a first embodiment, the present disclosure provides a film comprising first segments and second segments arranged across the film's width direction and separated from each other by polymer interfaces, the first segments comprising a first polymeric composition and the second segments comprising a second polymeric composition, wherein the first segments and second segments each have first major surfaces that collectively form the first major surface of the film, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, wherein at least two of the layered second segments have the second polymeric composition and the third polymeric composition in an identical arrangement, wherein the film has a moisture vapor transmission rate of less than 800 g/m²/day, wherein when the first segments are layered in the film's thickness direction, the first major surfaces of the first segments and the first major surfaces of the second segments do not share a common polymeric composition, and wherein when the layered second segments consist of the first and second layers and the third polymeric composition is the same as the first polymeric composition, the first polymeric composition extends through the entire thickness of the first segments.

In a second embodiment, the present disclosure provides a film according to the first embodiment, wherein the second polymeric composition is more elastic than the first polymeric composition.

In a third embodiment, the present disclosure provides a film comprising first segments and second segments arranged across the film's width direction and separated from each other by polymer interfaces, the first segments comprising a first polymeric composition and the second segments comprising a second polymeric composition that is more elastic than the first polymeric composition, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, and wherein the second segments each have a width in the film's width direction of less than one millimeter. Typically the first and second segments each have first major surfaces that collectively form the first major surface of the film, and wherein when the first segments are layered in the film's thickness direction, the first major surfaces of the first segments and the first major surfaces of the second segments do not share a common polymeric composition.

In a fourth embodiment, the present disclosure provides a film comprising first segments and second segments arranged across the film's width direction and separated from each other by polymer interfaces, the first segments comprising a first polymeric composition and the second segments comprising a second polymeric composition that is more elastic than the first polymeric composition, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, and wherein the time to failure in a hang shear evaluation is at least 100 minutes, wherein the hang shear evaluation is carried out at 38° C. by hanging a 200-gram weight on a sample 2.54 cm in length and such that the second segments in a 3.8 cm-wide portion of the film are stretched in the film's width direction.

In a fifth embodiment, the present disclosure provides the film of any one of the first to fourth embodiments, wherein the layered second segments further comprise a third layer in the film's thickness direction, wherein the first layer is a middle layer of the second polymeric composition disposed between the second layer and the third layer at opposite surfaces of the film, wherein the second layer comprises the third polymeric composition, wherein the third layer comprises a fourth polymeric composition, and wherein the third and fourth polymeric compositions can be identical or different.

In a sixth embodiment, the present disclosure provides the film of the fifth embodiment, wherein the third and fourth polymeric compositions are identical.

In a seventh embodiment, the present disclosure provides the film of any one of the first to sixth embodiments, wherein the third polymeric composition and the first polymeric composition are identical.

In an eighth embodiment, the present disclosure provides the film of any one of the first to seventh embodiments, wherein the first polymeric composition extends throughout the thickness of the first segments.

In a ninth embodiment, the present disclosure provides the film any one of the first to seventh embodiments, wherein at least some of the first segments are layered first segments comprising fourth and fifth layers in the film's thickness direction, wherein one of the fourth or fifth layers comprises a fifth polymeric composition different from the first polymeric composition, and wherein neither the first or fifth polymeric composition extends through the entire thickness of a given layered first segment.

In a tenth embodiment, the present disclosure provides the film of the ninth embodiment, wherein the layered first segments further comprise a sixth layer, wherein the fourth layer is a middle layer of the first polymeric composition disposed between the fifth layer and the sixth layer at opposite surfaces of the film, wherein the fifth layer comprises the fifth polymeric composition, wherein the sixth layer comprises a sixth polymeric composition, and wherein the fifth and sixth polymeric compositions can be identical or different.

In an eleventh embodiment, the present disclosure provides the film of the tenth embodiment, wherein the fifth and sixth polymeric compositions are identical.

In a twelfth embodiment, the present disclosure provides the film of the ninth of tenth embodiment, wherein at least one of the fifth or sixth polymeric compositions is a hot melt adhesive.

In a thirteenth embodiment, the present disclosure provides the film of any one of the ninth to twelfth embodiments, wherein at least one of the third or fourth or at least one of the fifth or sixth polymeric compositions is a hot melt adhesive.

In a fourteenth embodiment, the present disclosure provides the film of any one of the first to thirteenth embodiments, wherein the first segments have stretch-induced molecular orientation in a direction parallel to their lengths. In these embodiments, the present disclosure can provide a film comprising first segments and second segments arranged across the film's width direction and separated from each other by polymer interfaces, the first segments comprising a first polymeric composition and the second segments comprising a second polymeric composition that is more elastic than the first polymeric composition, wherein at least some of the second segments are layered second segments comprising first and second layers in the film's thickness direction, wherein one of the first or second layers comprises a third polymeric composition different from the second polymeric composition, wherein neither the second or third polymeric composition extends through the entire thickness of a given layered second segment, and wherein the first segments have stretch-induced molecular orientation in a direction parallel to their lengths.

In a fifteenth embodiment, the present disclosure provides the film of any one of the first to fourteenth embodiments, wherein the first and second segments do not overlap in the film's width direction to form an interdigitated interface.

In a sixteenth embodiment, the present disclosure provides the film of any one of the first to fifteenth embodiments, wherein the first and second segments provide an extensible region of the film, wherein the film further comprises a non-extensible region. The non-extensible region can comprise the first polymeric composition.

In a seventeenth embodiment, the present disclosure provides a laminate comprising the film of any one of the first to fifteenth embodiments or the film article of the sixteenth embodiment joined to a fibrous carrier.

In an eighteenth embodiment, the present disclosure provides the laminate of the seventeenth embodiment, wherein the fibrous carrier is an extensible fibrous carrier with a tensile elongation at maximum load of at least 50 percent.

In a nineteenth embodiment, the present disclosure provides the laminate of the seventeenth embodiment, wherein the laminate is incrementally activated.

In a twentieth embodiment, the present disclosure provides the laminate of any one of the seventeenth to nineteenth embodiments, wherein the film is discontinuously bonded to the fibrous carrier, and wherein the fibrous carrier is bonded to the film predominantly at one of the first segments or the second segments.

In a twenty-first embodiment, the present disclosure provides an absorbent article comprising the laminate of any one of the seventeenth to twentieth embodiments.

In a twenty-second embodiment, the present disclosure provides a method of making the film of the eleventh embodiment or any one of the twelfth to fifteenth embodiments as dependent on the eleventh embodiment, the method comprising:

providing an extrusion die comprising at least a first cavity, a second cavity, a third cavity, and a fourth cavity, and a dispensing surface having a dispensing slot,
wherein a first fluid passageway within the extrusion die extends from the first cavity to a first slot segment of the dispensing slot;
wherein a second fluid passageway within the extrusion die extends from the second cavity to a second slot segment of the dispensing slot;
wherein a third fluid passageway within the extrusion die extends on one side of the second fluid passageway from the third cavity, wherein upstream from the dispensing slot the third fluid passageway is diverted into branches that meet the second fluid passageway at areas above and below the second fluid passageways at the point where the second fluid passageway enters the dispensing slot;
and wherein a fourth fluid passageway within the extrusion die extends on one side of the first fluid passageway from the fourth cavity, wherein upstream from the dispensing slot the fourth fluid passageway is diverted into branches that meet the first fluid passageway at areas above and below the first fluid passageways at the point where the first fluid passageway enters the dispensing slot; and
extruding the first, second, third, and fifth polymeric compositions from the first, second, third, and fourth cavities, respectively, so as to form the film.

In a twenty-third embodiment, the present disclosure provides a method of making the film of the sixth embodiment or any one of the seventh to fifteenth embodiments as dependent on the fifth embodiment, the method comprising:

providing an extrusion die comprising at least a first cavity, a second cavity, and a dispensing surface having a dispensing slot,
wherein a first fluid passageway within the extrusion die extends from the first cavity to a first slot segment of the dispensing slot;
wherein a second fluid passageway within the extrusion die extends from the second cavity to a second slot segment of the dispensing slot; and
wherein a third fluid passageway within the extrusion die extends on one side of the second fluid passageway from a die cavity within the extrusion die, wherein upstream from the dispensing slot the third fluid passageway is diverted into branches that meet the second fluid passageway at areas above and below the second fluid passageways at the point where the second at the point where the second fluid passageway enters the dispensing slot; and
extruding the first, second, and third polymeric compositions from the first, second, and die cavities, respectively, so as to form the film.

In a twenty-fourth embodiment, the present disclosure provides the method of the twenty-third embodiment, wherein the die cavity is the same cavity as the first cavity.

In a twenty-fifth embodiment, the present disclosure provides the method of the twenty-third embodiment, wherein the die cavity is a third cavity, different from the first and second cavities.

In a twenty-sixth embodiment, the present disclosure provides a method of making the film of any of the first to fifteenth embodiments, the method comprising:

providing an extrusion die comprising at least a first cavity, a second cavity, and a dispensing surface having a dispensing slot,
wherein a first fluid passageway within the extrusion die extends from the first cavity to a first slot segment of the dispensing slot,
wherein a second fluid passageway within the extrusion die extends from the second cavity to a second slot segment of the dispensing slot, wherein the second slot segment and first slot segment are arranged side-by-side to provide a combined width; and
wherein a third fluid passageway within the extrusion die extends from a die cavity within the extrusion die to the second slot segment, wherein the third fluid passageway meets the second fluid passageway from an area above the second fluid passageway at a point where the second fluid passageway enters the dispensing slot, and wherein the third fluid passageway has a width at a point where it meets the second fluid passageway that is less than the combined width of the first and second slot segments; and
extruding the first, second, and third polymeric compositions from the first, second, and die cavities, respectively, so as to form the film.

In a twenty-seventh embodiment, the present disclosure provides the method of any one of the twenty-second to twenty-sixth embodiments, wherein the extrusion die comprises multiple first passageways, multiple second passageways, and multiple third passageways within the die.

In a twenty-eighth embodiment, the present disclosure provides the method of any one of the twenty-second to twenty-seventh embodiments, wherein the extrusion die comprises a plurality of shims, wherein the plurality of shims comprises a plurality of sequences of shims, wherein each sequence comprises at least one first shim that provides the first fluid passageway, at least one second shim that provides the second fluid passageway, and at least one third shim that provides the third fluid passageway.

In a twenty-ninth embodiment, the present disclosure provides the method of the twenty-eighth embodiment, wherein each of the plurality of shims defines a portion of the dispensing slot.

In a thirtieth embodiment, the present disclosure provides an extrusion die comprising at least a first cavity, a second cavity, and a dispensing surface having a dispensing slot, wherein a first fluid passageway within the extrusion die extends from the first cavity to a first slot segment of the dispensing slot, wherein a second fluid passageway within the extrusion die extends from the second cavity to a second slot segment of the dispensing slot, wherein the second slot segment and first slot segment are arranged side-by-side to provide a combined width;

wherein a third fluid passageway within the extrusion die extends from a die cavity within the extrusion die to the second slot segment, wherein the third fluid passageway meets the second fluid passageway from an area above the second fluid passageway at a point where the second fluid passageway enters the dispensing slot, and wherein the third fluid passageway has a width at a point where it meets the second fluid passageway that is less than the combined width of the first and second slot segments.

In a thirty-first embodiment, the present disclosure provides a method of making a film, the method comprising:

providing the extrusion die of the thirtieth embodiment; and extruding a first polymeric composition from the first cavity, a second polymeric composition from the second cavity, and a third polymeric composition from the die cavity, wherein at the point where the second fluid passageway enters the dispensing slot, the third polymeric composition flows on top of the second polymeric composition to form a layer to provide a film having first segments comprising the first polymeric composition and second segments comprising a layer of the third polymeric composition on top of the second polymeric composition.

In a thirty-second embodiment, the present disclosure provides the extrusion die of the thirtieth embodiment or the method of the thirty-first embodiment, wherein the die cavity is the same cavity as the first cavity.

In a thirty-third embodiment, the present disclosure provides the extrusion die of the thirtieth embodiment, wherein a fourth fluid passageway within the extrusion die extends from a cavity within the extrusion die to the first slot segment, wherein the fourth fluid passageway meets the first fluid passageway from an area above or below the first fluid passageway at a point where the first fluid passageway enters the dispensing slot, and wherein the fourth fluid passageway has a width at a point wherein it meets the first fluid passageway that is less than the combined width of the first and second slot segments.

In a thirty-fourth embodiment, the present disclosure provides the extrusion die of the thirty-third embodiment, wherein the cavity is the same cavity as the second cavity.

In a thirty-fifth embodiment, the present disclosure provides the extrusion die of the thirty-third or thirty-fourth embodiments, wherein the fourth fluid passageway extends on one side of the first fluid passageway from a cavity within the extrusion die, wherein upstream from the dispensing slot the fourth fluid passageway is diverted into branches that meet the first fluid passageway at areas above and below the first fluid passageways at the point where the first fluid passageway enters the dispensing slot.

In a thirty-sixth embodiment, the present disclosure provides the extrusion die of the thirty-fifth embodiment as dependent on the thirty-third embodiment, wherein the cavity is a fourth cavity, different from the first and second cavities.

In a thirty-seventh embodiment, the present disclosure provides the extrusion die of any one of the thirtieth or thirty-second to thirty-sixth embodiments, wherein the third fluid passageway extends on one side of the second fluid passageway, wherein upstream from the dispensing slot, the third fluid passageway is diverted into branches that meet the second fluid passageway at areas above and below the second fluid passageways at the point where the second fluid passageway enters the dispensing slot.

In a thirty-eighth embodiment, the present disclosure provides a method of making a film, the method comprising:

providing the extrusion die of the thirty-seventh embodiment; and extruding a first polymeric composition from the first cavity, a second polymeric composition from the second cavity, and a third polymeric composition from the die cavity, wherein at the point where the second fluid passageway enters the dispensing slot, the third polymeric composition flows above and below the second polymeric composition to provide a film having first segments comprising the first polymeric composition and second segments comprising two layers of the third polymeric composition above and below the second polymeric composition.

In a thirty-ninth embodiment, the present disclosure provides a method of making a film, the method comprising:

providing the extrusion die of the thirty-seventh embodiment as dependent on the thirty-sixth embodiment, wherein the die cavity is a third cavity, different from the first, second, and fourth cavities; and extruding a first polymeric composition from the first cavity, a second polymeric composition from the second cavity, a third polymeric composition from the third cavity, and a fifth polymeric composition from the fourth cavity, wherein at the point where the second fluid passageway enters the dispensing slot, the third polymeric composition flows above and below the second polymeric composition to provide a film having first segments comprising two layers of the fifth polymeric composition above and below the first polymeric composition and second segments comprising two layers of the third polymeric composition above and below the second polymeric composition.

In a fortieth embodiment, the present disclosure provides the extrusion die or method of any one of the thirtieth to thirty-ninth embodiments, wherein the extrusion die comprises multiple first passageways, multiple second passageways, and multiple third passageways within the die.

In a forty-first embodiment, the present disclosure provides the extrusion die or method of any one of the thirtieth to fortieth embodiments, wherein the extrusion die comprises a plurality of shims, wherein the plurality of shims comprises a plurality of sequences of shims, wherein each sequence comprises at least one first shim that provides the first fluid passageway, at least one second shim that provides the second fluid passageway, and at least one third shim that provides the third fluid passageway.

In a forty-second embodiment, the present disclosure provides the extrusion die or method of any one of the thirtieth to forty-first embodiments, wherein each of the plurality of shims defines a portion of the dispensing slot.

In a forty-third embodiment, the present disclosure provides the extrusion die or method of the forty-first or forty-second embodiment, wherein each sequence of shims further comprises at least one fourth shim between the at least one second shim and the at least one third shim that provides the branches in the third fluid passageway that lead to the second fluid passageway.

In a forty-forth embodiment, the present disclosure provides the extrusion die or method of any one of the forty-first or forty-third embodiments, wherein each sequence of shims further comprises at least one spacer shim between the at least one first shim and the at least one third shim, wherein the spacer shim has a dispensing opening but lacks a passageway between the dispensing opening and any of the cavities within the die.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

TABLE 1

Materials List

| Trade Designation | Description | Source |
|---|---|---|
| "KRATON G1643M" | Styrene, ethylene/ butylenes, styrene linear triblock copolymer with hydrogenated midblock | Kraton Polymers, Houston, TX |
| "TOTAL POLYPROPYLENE 3376" | Polypropylene homopolymer (discontinued) | Total Petrochemicals, Houston, TX, |
| "KRATON D1114P" | Styrene, isoprene, styrene linear triblock copolymer | Kraton Polymers |
| "KRATON MD6843" | Styrene triblock copolymer with hydrogenated midblock | Kraton Polymers |
| "SUKOREZ SU-110" | Hydrogenated dicyclopentadiene hydrocarbon resin | Kolon Industries, South Korea |
| "TOTAL POLYPROPYLENE 5571" | Polypropylene impact copolymer | Total Petrochemicals |
| "TOTAL POLYPROPYLENE 8650" | Polypropylene random copolymer | Total Petrochemicals |
| "EXXONMOBIL PP1024E4" | Polypropylene homopolymer | ExxonMobil, Houston, TX |
| "EXXONMOBIL PP3155" | Polypropylene homopolymer | ExxonMobil |
| "INFUSE 9107" | Olefin block copolymer | Dow Chemical Company, Midland, MI |
| "VERSIFY 2400" | Propylene-ethylene copolymer | Dow Chemical Company |

The partially hydrogenated styrene triblock copolymer obtained under the trade designation "KRATON MD6843" was analyzed by nuclear magnetic resonance (NMR) spectroscopy in solutions of unknown concentration in deuterated chloroform and deuterated 1,1,2,2-tetrachloroethane (TCE) using a 600 MHz NMR spectrometer obtained from Varian (Palo Alto, Calif.) under the trade designation "INOVA". The spectrometer was equipped with a conventional room temperature inverse probe head. One-dimensional $^1$H-NMR and $^{13}$C-NMR spectra were collected followed by $^1$H/$^{13}$C-NMR gradient heteronuclear single quantum coherence (gHSQC) and homo-nuclear two-dimensional NMR to confirm spectral assignments. The residual proto-solvent resonances were used as secondary chemical shift references in the proton dimension. All of the NMR data were collected with the samples held at 25° C. After analysis, it was concluded that hydrogenated butadiene moieties dominate the mid-block of the triblock copolymer, but minor amounts hydrogenated isoprene moieties were found in the mid-block as well. Integration of the $^1$H-NMR data suggested that polystyrene made up about 24 mole percent (36 weight percent) of the triblock copolymer.

The weight average and number average molecular weights of the partially hydrogenated styrene-butadiene-styrene copolymer obtained under the trade designation "KRATON MD6843" were determined by comparison to linear polystyrene polymer standards using gel permeation chromatography (GPC). The GPC measurements were carried out using a combined autosampler, controller and pump (Alliance Model 2695 Separations Module and Empower 3 data acquisition software obtained from Waters Corporation, Milford, Mass.) controlled to 40° C. and using three 250 millimeter (mm) by 10 mm linear columns of divinylbenzene polymer particles (obtained from Jordi Associates, Inc., Bellingham, Mass., under the trade designation "Jordi GEL") with two columns of pore sizes Mixed Bed and one column of 500 angstroms. A differential refractive index (RI) detector (Waters Model 2414, obtained from Waters Corporation) was used at 40° C. A 20-milligram (mg) sample of the "MD6843" copolymer was diluted with 10 mL of tetrahydrofuran (inhibited with 250 ppm of BHT) into a 20-mL glass vial, capped with a polyethylene—lined cap and slowly rotated until dissolved. The sample solution was filtered through a 0.45-micrometer pore size 13-mm diameter polytetrafluoroethylene (PTFE) syringe filter into a 1.8-mL glass autosampler vial capped with a PTFE/silicone septum cap and placed in the autosampler along with two vials of polystyrene standards and a vial of control solution. At the beginning of the analysis, the tetrahydrofuran (inhibited with 250 ppm of BHT) mobile phase was incrementally brought to a flow rate of 1 mL/minute over six minutes, the reference side of the RI detector was flushed for 10 minutes and was filled with fresh tetrahydrofuran from the mobile phase. The sample was analyzed after 48 minutes of column equilibration, two 55-microliters injections of polystyrene standards and one 99-microliters injection of a control sample, each of 48 minutes duration. A sample volume of 99 microliters was injected onto the column bank and data collected by the Empower 3 software. Molecular weight calibration was performed using 15 narrow dispersity polystyrene standards (obtained from Polymer Standards Service-USA, Inc) with peak molecular weights ranging from $2.13 \times 10^6$ grams per mole to 266 grams per mole. The molecular weight distribution calculations were performed using Empower 3 GPC software using a third order polynomial fit and yielded an R value greater than 0.9995 for the molecular weight calibration curve. Duplicate injections were run and averaged. The weight average molecular weight of the triblock copolymer was found to be 181,600 grams per mole, and its number average molecular weight was found to be 159,000 grams per mole.

Test Methods

Elongation to Break

An "INSTRON" Tensile Tester model "1122", "5500R", "5564HS", or "3345" (Instron, Inc., Norwood Mass.) was used to test all samples. Sample dimensions were 1 inch (2.54 cm) wide by 50 mm gauge length (GL). A crosshead speed of 20 inches (50.8 cm) per minute was used. Evaluations were carried out at 72° F. (22° C.) plus or minus 4° F. (2.2° C.) and 50% relative humidity plus or minus 5% relative humidity. The sample was stretched until it broke. Elongation to Break was measured as a percentage of the unstretched length.

Permanent Set

The "INSTRON" Tensile Tester was used to measure Permanent Set after a two-cycle hysteresis test. A sample as described in the Elongation to Break test was stretched to 100% (twice original length), then returned at a speed of 20 inches (50.8 cm) per minute. There was a one-second hold before the first load (stretch) was applied, a one-second hold before the first unload, a one-second hold before the second load to 100%, and a one-second hold before the second unload. Permanent Set was calculated from the elongation (%) at 0.1 N after the second unload minus the elongation (%) at 0.1 N after the first load.

Load

The "INSTRON" Tensile Tester was used to measure the force required to stretch the sample 50% past the original length during the first load, second load, and at the second unload unless otherwise specified.

Shear

Shear (hang shear) was determined by hanging a 200-gram weight on a sample that was 2.54 cm long in the direction of the segments by 6 to 8 cm wide at 100° F. (38° C.). The weight was positioned such that the second segments were stretched in the film's width direction. Tape was used to cover a portion of the width of the sample so that clips and the weight could be applied. The exposed width of the film subjected to testing was 3.8 cm. Shear is reported as the time (minutes) for film to break.

Moisture Vapor Transmission Rate (MVTR)

MVTR was measured using an upright cup method at 40° C.±1° C. and 20% relative humidity±2%. The upright cup method is considered a dry method since the sample is not contacted with liquid water. A 3.8-cm diameter sample was placed between adhesive-containing surfaces of two foil adhesive rings, each having a 5.1-cm² elliptical opening. The holes of each ring were carefully aligned. Finger pressure was used to form a foil/sample/foil assembly that was flat, wrinkle free, and had no void areas in the exposed sample.

A 120-mL glass jar was filled with approximately 50 grams of tap water. The jar was fitted with a screw-on cap having a 3.8-cm diameter hole in the center thereof and with a 4.45 cm diameter rubber washer having an approximately 3.6-cm hole in its center. The rubber washer was placed on the lip of the jar and foil/sample/foil assembly was placed backing side down on the rubber washer. The lid was then screwed loosely on the jar.

The assembly was placed in a chamber at 40° C. and 20% relative humidity for four hours. At the end of four hours, the cap was tightened inside the chamber so that the sample was level with the cap (no bulging) and the rubber washer was in proper seating position.

The foil sample assembly was removed from the chamber and weighed immediately to the nearest 0.01 gram for an initial dry weight, W1. The assembly was then returned to the chamber for at least 18 hours, the exposure time T1 in hours, after which it was removed and weighed immediately to the nearest 0.01 g for a final dry weight, W2. The MVTR in grams of water vapor transmitted per square meter of sample area per 24 hours was then calculated using the following formula:

$$\text{Upright(Dry)MVTR} = (W1 - W2) \times (4.74 \times 10^4)/T1.$$

Examples 1 to 9

Two 6-inch (150-mm) co-extrusion dies, Die 1 and Die 2, each with three cavities, as generally depicted in FIGS. 5 to 13 were used for Examples 1 to 9. Die 1 was assembled with a shim repeating pattern shown in Table 2. The shim designation (e.g., 500, 600, 700, 800, or 900) refers to the shims depicted in FIGS. 5 through 9. The shim thickness refers to the narrowest dimension of the shim. The Die Structural Element describes to which portion of the die according to the present disclosure the shim contributes. The Film Structural Element refers to the portion of the film according to the present disclosure extruded from the indicated shim. The designations 2×600 and 4×500 means that 2 of shims 600 were placed next to each other and 4 of shims 500 were placed next to each other. The sequence shown in Table 2 was repeated several times to achieve a width of 6 inches (150 mm). Die 2 was assembled with the same shim repeating pattern with the exception that 4 of shims 600 were used to provide the second fluid passageway with a thickness of 406 micrometers. The dispensing openings of the shims were aligned in a collinear arrangement as shown in FIG. 10 to provide a dispensing slot with a height of 0.030 inches (760 micrometers). Shim 500 had a land length of 0.100 inch (2.54 mm). Shims 900 and 800 had a land length of 0.070 inch (1.78 mm), and shims 700 and 600 had a land length of 0.080 inch (2.03 mm). The shim assembly was aligned with an alignment key and compressed between two end blocks using four ½ inch (12.7 mm) bolts.

TABLE 2

| | Die Description | | |
|---|---|---|---|
| Shim | Die Structural Element | Thickness (micrometers) | Film Structural Element Provided |
| | Die 1 | | |
| 900 | spacer | 51 | |
| 800 | $3^{rd}$ fluid passageway | 102 | $3^{rd}$ polymeric composition, $2^{nd}$ and $3^{rd}$ layers of $2^{nd}$ segment |
| 700 | pathway from $3^{rd}$ to $2^{nd}$ passageway | 51 | $3^{rd}$ polymeric composition, $2^{nd}$ and $3^{rd}$ layers of $2^{nd}$ segment |
| 2 × 600 | $2^{nd}$ fluid passageway | 203 | $2^{nd}$ polymeric composition, $1^{st}$ layer of $2^{nd}$ segment |
| 700 | pathway from $3^{rd}$ to $2^{nd}$ passageway | 51 | $3^{rd}$ polymeric composition, $2^{nd}$ and $3^{rd}$ layers of $2^{nd}$ segment |
| 800 | $3^{rd}$ fluid passageway | 102 | $3^{rd}$ polymeric composition, $2^{nd}$ and $3^{rd}$ layers of $2^{nd}$ segment |
| 900 | spacer | 51 | |
| 4 × 500 | 1st fluid passageway | 406 | $1^{st}$ polymeric composition of $1^{st}$ segment |

The inlet fittings on the two end blocks were each connected to conventional single-screw extruders. Compositions of the polymer compositions feeding each extruder and flow rates for each of Examples 1 to 9 (Ex. 1 to 9) are shown in Table 3. Extruder 1 feeding the first cavity leading to the first fluid passageways described in Table 2, above, was loaded with the first polymeric composition. Extruder 2 fed the second cavity leading to the second fluid passageways, and Extruder 3 fed the third cavity leading to the third fluid passageways described in Table 2, above. Extruder 2 was loaded with the second polymeric composition, and Extruder 3 was loaded with the third polymeric composition. The first, second, and third polymeric compositions for each of Examples 1 to 9 are shown in Table 3, which refers to abbreviated names of the materials listed in Table 1. The third polymeric composition for Examples 1 to 3 and 7 also included less than 2% by weight of a red color concentrate in polypropylene, the third polymeric composition for Example 4 included less than 2% by weight of a green color concentrate in polypropylene, and the third polymeric composition for Examples 5 and 6 included less than 2% by weight of a blue color concentrate in polypropylene. The second polymeric composition for Examples 2 to 4 included less than 2% by weight of a pink color concentrate in polypropylene. The first polymeric composition for Examples 1 to 6 included 3% by weight of a white color concentrate in polypropylene. Unless noted in Table 3, all extruders were set to 218° C. The polymeric compositions were extruded from the die at a rate of 1.2 meters per minute (m/min) and then drawn at the rate shown in Table 3, below. A chill roll was positioned adjacent to the dispensing slot of the co-extrusion die to receive the extruded material.

found to be 45.3 micrometers and 40.3 micrometers, respectively. Each of these thicknesses was an average of two measurements. The thicknesses of the second and third layers of the second segments were measured at a magnification of 500× and found to be 2.20 micrometers and 2.53 micrometers, respectively. Each of these thicknesses was an average of two measurements.

For Example 8, at a magnification of 16×, the width of the second segments was 290 micrometers (average of 4 measurements), and the width of the first segments was 709 micrometers (average of 4 measurements). The thicknesses of the first and second segments were measured at a magnification of 50× and found to be 31.0 micrometers and 49.7 micrometers, respectively. Each of these thicknesses was an average of two measurements. The thicknesses of the second and third layers of the second segments were measured at a magnification of 500× and found to be 1.54 micrometers and 1.58 micrometers, respectively. Each of these thicknesses was an average of three measurements.

Examples 1 to 9 (Ex. 1 to 9) were measured for basis weight and bulbosity, which is the ratio of the thickness of the second segments to the thickness of the first segments. Elongations to break, permanent set, load 1, load 2, unload

TABLE 3

Example Compositions

| Ex. | Die | Extruder #3 Material | [kg/hr] | Extruder #2 Material | [kg/hr] | Extruder #1 Material | [kg/hr] | Line Speed (m/min) |
|---|---|---|---|---|---|---|---|---|
| 1 | 1 | 75% "G1643M"/ 25% "PP3376" | 0.41 | "D1114P" | 1.9 | "PP1024E4" | 4.5 | 24.4 |
| 2 | 1 | 75% "G1643M"/ 25% "PP3376" | 0.41 | 81% "MD6843"/ 19% "SU-110" | 2.5 | "PP1024E4" | 4.5 | 24.4 |
| 3[a] | 2 | 75% "G1643M"/ 25% "PP3376" | 0.43 | 81% "MD6843"/ 19% "SU-110" | 2.5 | "PP1024E4" | 4.5 | 24.4 |
| 4[a] | 2 | "PP3155" | 0.18 | 81% "MD6843"/ 19% "SU-110" | 2.5 | "PP8650" | 4.5 | 24.4 |
| 5 | 1 | "PP8650" | 0.43 | 81% "MD6843"/ 19% "SU-110" | 2.5 | "PP5571" | 4.5 | 24.4 |
| 6 | 1 | "PP5571" | 0.19 | "INFUSE 9107" | 1.9 | "PP5571" | 5.4 | 24.4 |
| 7 | 1 | 75% "G1643M"/ 25% "PP3376" | 0.43 | 81% "MD6843"/ 19% "SU-110" | 2.5 | "PP5571" | 4.5 | 21.3 |
| 8 | 1 | "PP3155" | 0.43 | 81% "MD6843"/ 19% "SU-110" | 2.5 | "PP5571" | 4.5 | 24.4 |
| 9[b] | 1 | "VERSIFY 2400" | 0.23 | 77% "MD6843"/ 23% "SU-110" | 2.0 | "PP5571" | 3.8 | 21.3 |

[a]Extruder 1 set at 238° C.
[b]Extruders 2 and 3 set at 238° C.

Using an optical microscope, the widths and thickness of the first and second segments were measured for Examples 4 and 8. The thicknesses of the second and third layers of the second segments were also measured. For Example 4, at a magnification of 16×, the width of the second segments was 403 micrometers (average of 3 measurements), and the width of the first segments was 775 micrometers (average of 3 measurements). The thicknesses of the first and second segments were measured at a magnification of 50× and 2, and hang shear were measured using the test methods described above with each sample being stretched in the cross-direction (direction transverse to the first and second segments). The results are shown in Table 4. Moisture vapor transmission rate (MVTR) was measured according to the test method described above for Examples 1 to 4, 8, and 9. The results are shown in Table 5. Each value reported in Table 5 is an average of 3 replicates.

TABLE 4

Results - cross-direction evaluation

| Ex. | Basis Weight (gsm) | Bulbosity [a] | Elongation to Break (%) | Permanent Set (%) | Load 1 @ 50% (N) | Load 2 @ 50% (N) | Unload 2 @50% (N) | Shear (min) |
|---|---|---|---|---|---|---|---|---|
| 1 | 29.5 | 3.0 | 182 | 15.0 | 3.98 | 1.50 | 0.84 | 26 |
| 2 | 34.1 | 1.8 | 194 | 7.6 | 2.69 | 1.69 | 1.19 | 680 |

TABLE 4-continued

Results - cross-direction evaluation

| Ex. | Basis Weight (gsm) | Bulbosity [a] | Elongation to Break (%) | Permanent Set (%) | Load 1 @ 50% (N) | Load 2 @ 50% (N) | Unload 2 @50% (N) | Shear (min) |
|---|---|---|---|---|---|---|---|---|
| 3 | 31.8 | 1.7 | 195 | 9.7 | 2.87 | 1.58 | 1.03 | 1103 |
| 4 | 31.8 | 1.5 | 347 | 10.4 | 1.89 | 0.78 | 0.53 | 481 |
| 5 | 31.8 | 1.4 | 511 | 11.1 | 2.81 | 0.91 | 0.51 | 349 |
| 6 | 31.8 | 1.4 | 401 | 33.5 | 3.2 | 1.2 | 0.41 | 9 |
| 7 | 41.9 | 1.2 | 515 | 7.3 | 1.81 | 1.29 | 0.95 | 458 |
| 8[a] | 33.4 | 1.1 | 475 | 8.1 | 2.33 | 1.09 | 0.73 | 1321 |
| 9 | 29.5 | 1.7 | 477 | 9.2 | 2.08 | 1.12 | 0.71 | 1110 |

[a]Data were collected from a sample made in a duplicate run of Example 8, described above.

TABLE 5

MVTR Results

| Ex. | Unstretched Film | Stretched 100% and Relaxed |
|---|---|---|
| 1 | 35.11 | 42.13 |
| 2 | 35.11 | 35.11 |
| 3 | 35.11 | 28.09 |
| 4 | 35.11 | 42.13 |
| 8[a] | 49.16 | 28.09 |
| 9 | 42.13 | 42.13 |

[a]Data were collected from a sample made in a duplicate run of Example 8, described above.

The elongation properties of Examples 5, 8, and 9 were also evaluated in the machine direction (direction parallel to the first and second segments) for load and elongation at break using the methods described above. The first load at 5% elongation, first load at 10% elongation, elongation at break, and maximum load were measured. The results are shown in Table 6, below.

TABLE 6

Results of Machine Direction Elongation

| Ex. | Load at 5% (N) | Load at 10% (N) | Elongation at break (%) | Maximum load (N) |
|---|---|---|---|---|
| 5 | 9.17 | 10.31 | 504 | 29.20 |
| 8 | 7.58 | 9.38 | 563 | 27.90 |
| 9 | 7.80 | 9.40 | 488 | 28.27 |

Example 8 was further analyzed for elongation in the machine direction (direction parallel to the first and second segments). A 2-inch (5.08-cm) wide sample was stretched to 400% using a 50 mm gauge length (GL) and a crosshead speed of 20 inches (50.8 cm) per minute. The sample was then allowed to relax for 10 minutes, during which time the sample relaxed to a width of a little greater than one inch (2.54 cm). A one-inch (2.54-cm) sample was then cut from the relaxed sample. A two-cycle hysteresis was carried out using the method described above, with the modification that Permanent Set was calculated from the elongation (%) at 0.05 N after the second unload minus the elongation (%) at 0.05 N after the first load. The following data are averages of three replicates. Load 1 at 10%, 50%, and 100% elongation was 0.17 N, 0.54 N, and 0.74 N, respectively. Load 2 at 50% and 100% elongation was 0.39 N and 0.70 N, respectively, and unload 2 at 75% and 50% was 0.34 N and 0.18 N, respectively. The permanent set was 25.4%.

Example 10

A three layer laminate was made with a film of Example 9 position between outer layers of nonwoven (hydrophobic nonwovens obtained from Fitesa, Simpsonville, S.C., having item number "C1223" and style number "570D"). This structure was placed on a hotplate at 140° C. and pressed with a second plate preheated to 140° C. for 10 seconds at approximately 80 kilopascals. The nonwoven preferentially bonded to the surface of the second segments, as determined by visual inspection. The sample was able to stretch and recover in the CD without an activation step.

Prophetic Examples (PE)

The resins shown in Table 7 may be used to make films according to the present disclosure using any of the methods described above. For each of the Prophetic Examples, the first polymeric composition of the first segments may the same or different from the third polymeric composition in the second layer of the second segments, providing it is capable of forming a bond with the second polymeric composition in the first layer of the second segments.

TABLE 7

Prophetic Examples

| PE | Second Layer of Second Segments | First Layer of Second Segments |
|---|---|---|
| PE-1 | Poly(ethylene terephthalate) | "DUPONT HYTREL" polyester (E. I. DuPont de Nemours and Co., Wilmington, DE) |
| PE-2 | Polycarbonate | "KURARAY LA4285" acrylic elastomer (Kuraray Co., Ltd., Tokyo, Japan) |
| PE-3 | "IROGRAN A60 E 4902" polyurethane, (Huntsman Corporation, Salt Lake City, UT) | "IROGRAN PS440" polyurethane (Huntsman Corporation) |
| PE-4 | "EXXONMOBIL PP1024E4" (ExxonMobil) | "VISTAMAXX 6202" propylene elastomer (ExxonMobil) |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An extrusion die comprising at least a first cavity, a second cavity, and a dispensing surface having a dispensing slot,
   wherein a first fluid passageway within the extrusion die extends from the first cavity to a first slot segment of the dispensing slot, wherein a second fluid passageway within the extrusion die extends from the second cavity to a second slot segment of the dispensing slot, wherein the second slot segment and first slot segment are arranged side-by-side to provide a combined width; and wherein a third fluid passageway within the extrusion die extends from a die cavity within the extrusion die to the second slot segment, wherein the third fluid passageway meets the second fluid passageway from an area above the second fluid passageway at a point where the second fluid passageway enters the dispensing slot, and wherein the third fluid passageway has a width at a point where it meets the second fluid passageway that is less than the combined width of the first and second slot segments, wherein the first, second, and third fluid passageways are provided by a plurality of sequences of shims, wherein each sequence comprises at least one first shim that provides the first fluid passageway, at least one second shim that provides the second fluid passageway, and at least one third shim that provides the at least one third fluid passageway, and wherein each sequence of shims further comprises at least one spacer shim between the at least one first shim and the at least one third shim, wherein the spacer shim has a dispensing opening but lacks a passageway between the dispensing opening and either of the first cavity or the second cavity within the die.

2. The extrusion die of claim 1, wherein a fourth fluid passageway within the extrusion die extends from a cavity within the extrusion die to the first slot segment, wherein the fourth fluid passageway meets the first fluid passageway from an area above or below the first fluid passageway at a point where the first fluid passageway enters the dispensing slot, and wherein the fourth fluid passageway has a width at a point wherein it meets the first fluid passageway that is less than the combined width of the first and second slot segments.

3. The extrusion die of claim 1, wherein the third fluid passageway extends on one side of the second fluid passageway, wherein upstream from the dispensing slot the third fluid passageway is diverted into branches that meet the second fluid passageway at areas above and below the second fluid passageway at the point where the second fluid passageway enters the dispensing slot.

4. The extrusion die of claim 1, wherein each of the shims defines a portion of the dispensing slot.

5. The extrusion die of claim 1, wherein each sequence of shims further comprises at least one fourth shim between the at least one second shim and the at least one third shim that provides branches in the third fluid passageway that lead to the second fluid passageway.

6. A method of making a film, the method comprising:
providing the extrusion die of claim 3, wherein the die cavity is a third cavity, different from the first and second cavities; and
extruding a first polymeric composition from the first cavity, a second polymeric composition from the second cavity, and a third polymeric composition from the die cavity, wherein at the point where the second fluid passageway enters the dispensing slot, the third polymeric composition flows above and below the second polymeric composition to provide a film having first segments comprising the first polymeric composition and second segments comprising two layers of the third polymeric composition above and below the second polymeric composition.

7. The extrusion die claim 2, wherein the cavity from which the fourth fluid passageway extends is the second cavity.

8. The extrusion die of claim 2, wherein the fourth fluid passageway extends on one side of the first fluid passageway from the cavity within the extrusion die, wherein upstream from the dispensing slot the fourth fluid passageway is diverted into branches that meet the first fluid passageway at areas above and below the first fluid passageway at the point where the first fluid passageway enters the dispensing slot.

9. The extrusion die of claim 2, wherein the cavity from which the fourth fluid passageway extends is a different cavity from the first cavity and the second cavity.

10. The extrusion die of claim 1, wherein the extrusion die comprises multiple first fluid passageways, multiple second fluid passageways, and multiple third fluid passageways within the die.

11. The extrusion die of claim 1, wherein the die cavity is the same cavity as the first cavity.

12. A method of making a film, the method comprising:
providing the extrusion die of claim 1; and
extruding a first polymeric composition from the first cavity, a second polymeric composition from the second cavity, and a third polymeric composition from the die cavity, wherein at the point where the second fluid passageway enters the dispensing slot, the third polymeric composition flows on top of the second polymeric composition to form a layer to provide a film having first segments comprising the first polymeric composition and second segments comprising a layer of the third polymeric composition on top of the second polymeric composition.

13. An extrusion die comprising at least a first cavity, a second cavity, and a dispensing surface having a dispensing slot,
wherein a first fluid passageway within the extrusion die extends from the first cavity to a first slot segment of the dispensing slot,
wherein a second fluid passageway within the extrusion die extends from the second cavity to a second slot segment of the dispensing slot, wherein the second slot segment and first slot segment are arranged side-by-side to provide a combined width; and
wherein a third fluid passageway within the extrusion die extends from a die cavity within the extrusion die to the second slot segment, wherein the third fluid passageway meets the second fluid passageway from an area above the second fluid passageway at a point where the second fluid passageway enters the dispensing slot, and wherein the third fluid passageway has a width at a point where it meets the second fluid passageway that is less than the combined width of the first and second slot segments,
wherein the first, second, and third fluid passageways are provided by a plurality of sequences of shims, wherein each sequence comprises at least one first shim that provides the first fluid passageway, at least one second shim that provides the second fluid passageway, and at least one third shim that provides the at least one third fluid passageway, and wherein each sequence of shims further comprises at least one fourth shim between the at least one second shim and the at least one third shim that provides branches in the third fluid passageway that lead to the second fluid passageway.

14. The extrusion die of claim 13, wherein a fourth fluid passageway within the extrusion die extends from a cavity within the extrusion die to the first slot segment, wherein the fourth fluid passageway meets the first fluid passageway from an area above or below the first fluid passageway at a point where the first fluid passageway enters the dispensing slot, and wherein the fourth fluid passageway has a width at a point wherein it meets the first fluid passageway that is less than the combined width of the first and second slot segments.

15. The extrusion die of claim 13, wherein each of the shims defines a portion of the dispensing slot.

16. The extrusion die of claim 13, wherein the third fluid passageway extends on one side of the second fluid passageway, wherein upstream from the dispensing slot the third fluid passageway is diverted into branches that meet the second fluid passageway at areas above and below the second fluid passageway at the point where the second at the point where the second fluid passageway enters the dispensing slot.

17. A method of making a film, the method comprising:
providing the extrusion die of claim 16, wherein the die cavity is a third cavity, different from the first and second cavities; and
extruding a first polymeric composition from the first cavity, a second polymeric composition from the second cavity, and a third polymeric composition from the die cavity, wherein at the point where the second fluid passageway enters the dispensing slot, the third polymeric composition flows above and below the second polymeric composition to provide a film having first segments comprising the first polymeric composition and second segments comprising two layers of the third polymeric composition above and below the second polymeric composition.

18. The extrusion die claim 14, wherein the cavity from which the fourth fluid passageway extends is the second cavity.

19. The extrusion die of claim 14, wherein the fourth fluid passageway extends on one side of the first fluid passageway from the cavity within the extrusion die, wherein upstream from the dispensing slot the fourth fluid passageway is diverted into branches that meet the first fluid passageway at areas above and below the first fluid passageway at the point where the first fluid passageway enters the dispensing slot.

20. The extrusion die of claim 13, wherein the die cavity is the same cavity as the first cavity.

\* \* \* \* \*

UNITED STATES PATENT AND TRADEMARK OFFICE
CERTIFICATE OF CORRECTION

PATENT NO. : 10,828,862 B2
APPLICATION NO. : 15/905309
DATED : November 10, 2020
INVENTOR(S) : Thomas Hanschen et al.

It is certified that error appears in the above-identified patent and that said Letters Patent is hereby corrected as shown below:

In the Claims

Column 56
Line 1, in Claim 7, after "die" insert -- of --.

Column 57
Lines 15-16, in Claim 16, after "the second" delete "at the point where the second".

Column 58
Line 10, in Claim 18, after "die" insert -- of --.

Signed and Sealed this
Tenth Day of May, 2022

Katherine Kelly Vidal
*Director of the United States Patent and Trademark Office*